US012309679B2

(12) United States Patent
Mochizuki et al.

(10) Patent No.: US 12,309,679 B2
(45) Date of Patent: May 20, 2025

(54) COMMUNICATION SYSTEM

(71) Applicant: Mitsubishi Electric Corporation, Tokyo (JP)

(72) Inventors: Mitsuru Mochizuki, Tokyo (JP); Kuniyuki Suzuki, Tokyo (JP); Futoshi Katada, Tokyo (JP); Hirochika Hiraki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/333,866

(22) Filed: May 28, 2021

(65) Prior Publication Data
US 2021/0289335 A1 Sep. 16, 2021

Related U.S. Application Data

(60) Continuation of application No. 16/712,283, filed on Dec. 12, 2019, now Pat. No. 11,051,155, which is a
(Continued)

(30) Foreign Application Priority Data

Aug. 6, 2014 (JP) .................................. 2014-160482

(51) Int. Cl.
*H04W 4/90* (2018.01)
*H04W 4/06* (2009.01)
(Continued)

(52) U.S. Cl.
CPC ............... *H04W 4/90* (2018.02); *H04W 4/06* (2013.01); *H04W 16/06* (2013.01); *H04W 16/32* (2013.01); *H04W 72/04* (2013.01); *H04W 84/10* (2013.01)

(58) Field of Classification Search
CPC ......... H04W 4/90; H04W 4/06; H04W 16/06; H04W 16/32; H04W 72/04; H04W 84/10
(Continued)

(56) References Cited

U.S. PATENT DOCUMENTS 9,548,770 B1 * 1/2017 Pawar .................. H04B 7/0617
10,136,329 B2 11/2018 Mochizuki
(Continued)

FOREIGN PATENT DOCUMENTS

CA 2 806 510 A1 2/2012
CN 101783692 A 7/2010
(Continued)

OTHER PUBLICATIONS

Japanese Office Action issued Mar. 31, 2020 in Japanese Patent Application No. 2016-540215 (with unedited computer generated English translation), 7 pages.
(Continued)

*Primary Examiner* — Nghi H Ly
(74) *Attorney, Agent, or Firm* — PROCOPIO, CORY, HARGREAVES & SAVITCH LLP

(57) ABSTRACT

A communication system is provided that can improve the communication capability of a communication terminal device in the case where a large number of small cells in addition to a macro cell are installed and operated. A communication terminal device (UE) is connected with a macro cell configured by a MeNB and a small cell configured by a SeNB, so that dual connectivity is performed. When receiving information for small cells, for example, emergency information from a CBC via an MME, at least one cell of the macro cell and the small cell notifies the communication terminal device connected with the at least one cell of the information for small cells.

5 Claims, 31 Drawing Sheets

Related U.S. Application Data division of application No. 16/398,604, filed on Apr. 30, 2019, now abandoned, which is a continuation of application No. 16/150,608, filed on Oct. 3, 2018, now Pat. No. 10,327,128, which is a continuation of application No. 15/324,957, filed as application No. PCT/JP2015/071932 on Aug. 3, 2015, now Pat. No. 10,136,329.

(51) Int. Cl.
    *H04W 16/06*     (2009.01)
    *H04W 16/32*     (2009.01)
    *H04W 72/04*     (2023.01)
    *H04W 84/10*     (2009.01)

(58) Field of Classification Search
    USPC ............ 455/451, 456.1, 422.1, 450, 418
    See application file for complete search history.

(56) References Cited

U.S. PATENT DOCUMENTS

| | | | |
|---|---|---|---|
| 10,812,228 B2 * | 10/2020 | Shimoda | H04W 72/042 |
| 2005/0249322 A1 | 11/2005 | Gerlach | |
| 2007/0054664 A1 | 3/2007 | Kim | |
| 2010/0210268 A1 | 8/2010 | Lim | |
| 2011/0110398 A1 * | 5/2011 | Zhang | H04L 5/0051 |
| | | | 370/252 |
| 2011/0190005 A1 * | 8/2011 | Cheon | H04W 24/00 |
| | | | 455/456.1 |
| 2011/0237218 A1 | 9/2011 | Aoyama et al. | |
| 2011/0274087 A1 | 11/2011 | Liang et al. | |
| 2011/0294529 A1 * | 12/2011 | Luo | H04L 5/0048 |
| | | | 455/509 |
| 2011/0310818 A1 * | 12/2011 | Lin | H04L 5/0048 |
| | | | 370/328 |
| 2011/0312355 A1 * | 12/2011 | Cheng | H04J 11/0036 |
| | | | 455/501 |
| 2012/0087265 A1 | 4/2012 | Tamaki et al. | |
| 2012/0120826 A1 * | 5/2012 | Hao | H04L 5/0048 |
| | | | 370/252 |
| 2012/0268729 A1 | 10/2012 | Siomina et al. | |
| 2013/0078913 A1 | 3/2013 | Lea et al. | |
| 2013/0121280 A1 * | 5/2013 | Ouchi | H04W 72/042 |
| | | | 370/329 |
| 2013/0315212 A1 | 11/2013 | Sorrentino | |
| 2013/0329660 A1 * | 12/2013 | Noh | H04L 5/0035 |
| | | | 370/329 |
| 2014/0003262 A1 | 1/2014 | He et al. | |
| 2014/0030999 A1 | 1/2014 | Nagasawa | |
| 2014/0092823 A1 | 4/2014 | Song | |
| 2014/0192740 A1 | 7/2014 | Ekpenyong et al. | |
| 2014/0204819 A1 * | 7/2014 | Ohta | H04W 72/085 |
| | | | 370/311 |
| 2014/0211690 A1 | 7/2014 | Nama et al. | |
| 2015/0119054 A1 | 4/2015 | Morioka | |
| 2015/0237489 A1 | 8/2015 | Aoyagi et al. | |
| 2015/0304983 A1 | 10/2015 | Krening | |
| 2015/0312810 A1 | 10/2015 | Yasuda et al. | |
| 2015/0373559 A1 | 12/2015 | Hong | |
| 2016/0183218 A1 * | 6/2016 | Ioffe | H04L 5/0023 |
| | | | 455/77 |
| 2016/0192268 A1 | 6/2016 | Takeda et al. | |
| 2016/0198346 A1 | 7/2016 | Worrall et al. | |
| 2020/0412493 A1 * | 12/2020 | Shimoda | H04L 25/0226 |
| 2021/0176096 A1 * | 6/2021 | Shimoda | H04L 5/0005 |
| 2022/0026517 A1 * | 1/2022 | Hasegawa | G01S 7/003 |

FOREIGN PATENT DOCUMENTS

| | | |
|---|---|---|
| CN | 102088303 A | 6/2011 |
| CN | 102215589 A | 10/2011 |
| CN | 102365894 A | 2/2012 |
| CN | 102450073 A | 5/2012 |
| CN | 102469613 A | 5/2012 |
| CN | 102932919 A | 2/2013 |
| CN | 102986275 A | 3/2013 |
| CN | 103262638 A | 8/2013 |
| CN | 103476112 A | 12/2013 |
| DE | 60 2005 006 190 T2 | 7/2009 |
| JP | 2013-126047 A | 6/2013 |
| JP | 2013-255061 A | 12/2013 |
| JP | 2014-60509 A | 4/2014 |
| JP | 2014-96664 A | 5/2014 |
| JP | 2014-511602 A | 5/2014 |
| JP | 2014-120940 A | 6/2014 |
| JP | 2014-127769 A | 7/2014 |
| JP | 2015-525023 A | 8/2015 |
| KE | 2014-138386 A | 7/2014 |
| KR | 10-2013-0077883 A | 7/2013 |
| WO | WO 03/017689 A1 | 2/2003 |
| WO | 2012/112455 A1 | 8/2012 |
| WO | 2012/147718 A1 | 11/2012 |
| WO | WO 2013/112711 A1 | 8/2013 |
| WO | 2013/170209 A1 | 11/2013 |
| WO | 2014/022773 A1 | 2/2014 |
| WO | WO 2014/041989 A1 | 3/2014 |
| WO | WO 2014/109603 A1 | 7/2014 |
| WO | WO 2014/112003 A1 | 7/2014 |

OTHER PUBLICATIONS

Office Action issued Oct. 6, 2020 in corresponding Indian Patent Application No. 201747002071 (with English Translation), 6 pages.
International Search Report issued Oct. 6, 2015, in PCT/JP2015/071932 filed Aug. 3, 2015.
3GPP TSG-RAN WG2 Meeting #86, R2-142471, Agenda Item: 7.1.2, Functionalities in MeNB and SeNB, (May 19-23, 2014), 4 pages.
3GPP TS 36.300, V12.1.0, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2", Release 12, (Mar. 2014), 209 pages.
3GPP TS 36.304, V12.0.0, Technical Specification, "3rd Generation Partnership Project; Technical Specification Group Radio Access Network; Evolved Universal Terrestrial Radio Access (E-UTRA); User Equipment (UE) procedures in idle mode", Release 12, (Mar. 2014), 34 pages.
3GPP TSG-SA1 #42, S1-083461, "LS on HNB/HeNB Open Access Mode", Work Item: EHNB, (Oct. 13-17, 2008), 2 pages.
3GPP TSG-RAN WG2, Meeting #62, R2-082899, "LS on CSG cell identification", Work Item: LTE, (May 5-9, 2008), 2 pages.
3GPP TR 36.814, V9.0.0, Technical Report, "3rd Generation Partnership Project; Technical Specification Group Radio Access Network; Evolved Universal Terrestrial Radio Access (E-UTRA); Further advancements for E-UTRA physical layer aspects", Release 9, (Mar. 2010), 104 pages.
3GPP TR 36.912, V10.0.0, Technical Report, "3rd Generation Partnership Project; Technical Specification Group Radio Access Network; Feasibility study for Further Advancements for E-UTRA (LTE-Advanced)", Release 10, (Mar. 2011), 252 pages.
3GPP TR 36.819, V11.2.0, Technical Report, "3rd Generation Partnership Project; Technical Specification Group Radio Access Network; Coordinated multi-point operation for LTE physical layer aspects", Release 11, (Sep. 2013), 70 pages.
3GPP TS 36.141, V12.4.0, Technical Specification, "3rd Generation Partnership Project; Technical Specification Group Radio Access Network; Evolved Universal Terrestrial Radio Access (E-UTRA); Base Station (BS) conformance testing", Release 12, (Jun. 2014), 257 pages.
3GPP TR 36.842, V12.0.0, Technical Report, "3rd Generation Partnership Project; Technical Specification Group Radio Access Network; Study on Small Cell enhancements for E-UTRA and E-UTRAN; Higher layer aspects", Release 12, (Dec. 2013), 71 pages.

(56) References Cited

OTHER PUBLICATIONS

3GPP TS 23.041, V12.5.0, Technical Specification, "3rd Generation Partnership Project; Technical Specification Group Core Network and Terminals; Technical realization of Cell Broadcast Service (CBS)", Release 12, Mar. 2014, 68 pages.
3GPP TSG-RAN WG2 Meeting #86, R2-142027, Agenda Item: 7.1.2, "pSCell related functionalities and procedures", (May 19-May 23, 2014), 4 pages.
3GPP TS 23.401, V12.4.0, Technical Specification, "3rd Generation Partnership Project; Technical Specification Group Services and System Aspects; General Packet Radio Service (GPRS) enhancements for Evolved Universal Terrestrial Radio Access Network (E-UTRAN) access", Release 12, (Mar. 2014), 302 pages.
3GPP TS 36.211, V12.1.0, Technical Specification, "3rd Generation Partnership Project; Technical Specification Group Radio Access Network; Evolved Universal Terrestrial Radio Access (E-UTRA); Physical channels and modulation", Release 12, (Mar. 2014), 120 pages.
3GPP TS 37.320, V12.0.0, Technical Specification, "3rd Generation Partnership Project; Technical Specification Group Radio Access Network; Universal Terrestrial Radio Access (UTRA) and Evolved Universal Terrestrial Radio Access (E- Utra); Radio measurement collection for Minimization of Drive Tests (MDT); Overall description; Stage 2", Release 12, (Mar. 2014), 23 pages.
3GPP TS 36.331, V12.1.0, Technical Specification, "3rd Generation Partnership Project; Technical Specification Group Radio Access Network; Evolved Universal Terrestrial Radio Access (E-UTRA); Radio Resource Control (RRC); Protocol specification", Release 12, (Mar. 2014), 356 pages.
International Preliminary Report on Patentability and Written Opinion issued Feb. 16, 2017 in PCT/JP2015/071932 (with English language translation).
European Search Report dated Feb. 5, 2018, issued in European Patent Application No. 15830553.2.
Combined Chinese Office Action and Search Report issued on Aug. 5, 2019, in Patent Application No. 201580042234.5 (with English translation), 18 pages.
Office Action issued on Sep. 17, 2019 in Japanese Patent Application No. 2016-540215 (with unedited computer generated English translation), 6 pages.
Extended European Search Report issued Mar. 4, 2021 in European Application No. 20211310.6.

3GPP TSG-RAN WG2 #85, ETRI, "Provisioning of the SeNB System Information", R2-140232, http://www.3gpp.org/ftp/Meetings_ 3GPP_SYNC/RAN2/Docs, Feb. 9, 2014, 3 pages.
Combined Chinese Office Action and Search Report issued Sep. 15, 2020 in corresponding Chinese Patent Application No. 201580042234.5 (with English Translation), 17 pages.
Chinese Office Action issued on Feb. 6, 2020 in Patent Application No. 201580042234.5, 15 pages (with unedited computer generated English translation).
Office Action issued Mar. 4, 2022, in corresponding Indian Patent Application No. 202148030101 (with English Translation), 6 pages.
Office Action issued Mar. 4, 2022, in corresponding Indian Patent Application No. 202148030082 (with English Translation), 6 pages.
Office Action issued Mar. 3, 2022, in corresponding Indian Patent Application No. 202148030055 (with English Translation), 6 pages.
Office Action issued Mar. 3, 2022, in corresponding Indian Patent Application No. 202148030033 (with English Translation), 5 pages.
Combined Chinese Office Action and Search Report issued Jan. 12, 2022 in Chinese Patent Application No. 202110260766.3 (with English translation), 18 pages.
Office Action issued Nov. 30, 2021 in corresponding Japanese Patent Application No. 2020-152842 (with English Translation), 6 pages.
Ericsson, "Open Issues on Basic Signalling Flows", 3GPP TSG-RAN WG3 Meeting #84, R3-141321, May 19-23, 2014, pp. 1-15.
Office Action issued Jul. 7, 2022, in corresponding Chinese Patent Application No. 202110260766.3 (with English Translation), 14 pages.
Combined Chinese Office Action and Search Report issued Jan. 9, 2023, in corresponding Chinese Patent Application No. 202110260766.3 (with English Translation), 19 pages.
European Search Report dated Jul. 4, 2023, Issued in European Patent Application No. 23164652.2.
Japanese Office Action dated Jul. 11, 2023, issued in Japanese Patent Application No. 2022-112291 (with English translation).
Japanese Patent Office, Office Action, Application No. 2022-112291, dated Nov. 21, 2023, in 6 pages.
Japanese Patent Office, Office Action, Application No. 2022-112291, dated May 14, 2024, in 7 pages.
Japanese Patent Office, Decision of Refusal, Application No. 2022-112291, dated Oct. 22, 2024, in 7 pages.

* cited by examiner

F I G . 1
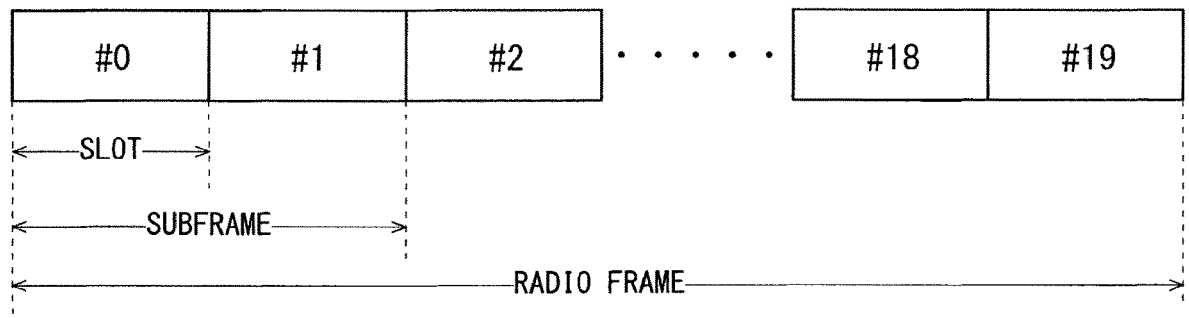

F I G . 8
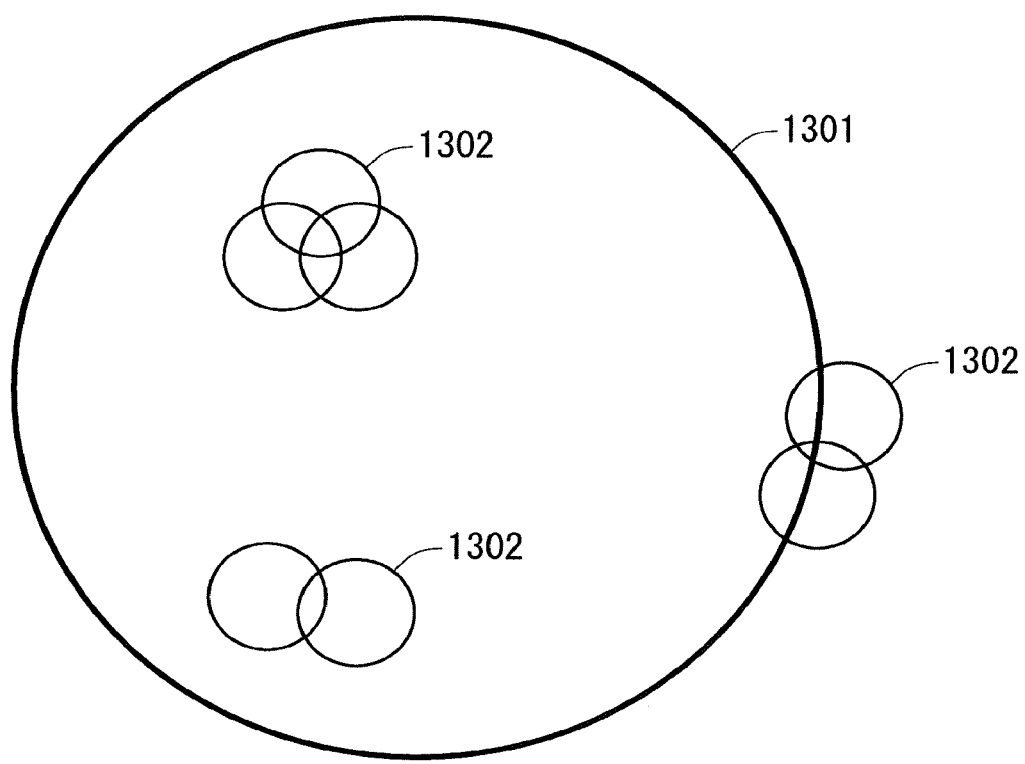

F I G. 9
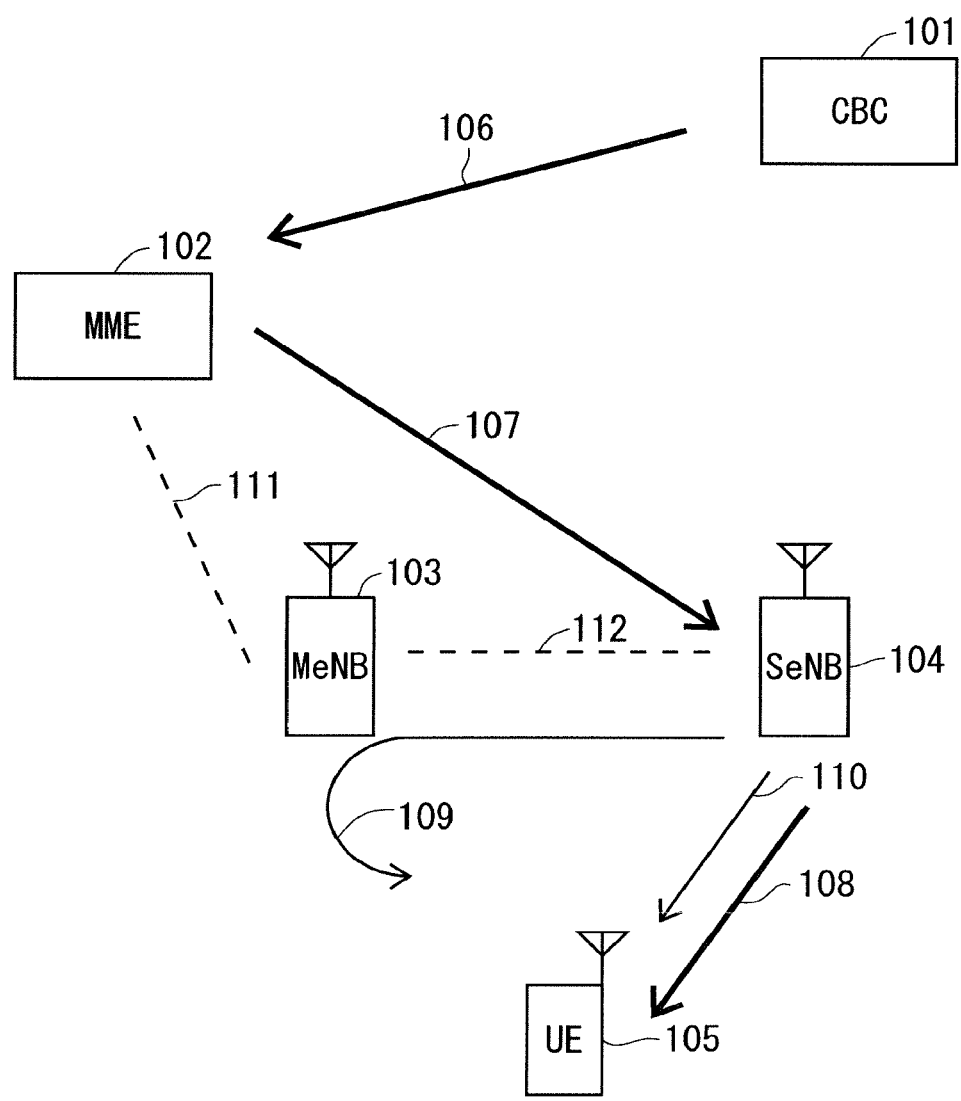

F I G . 1 3
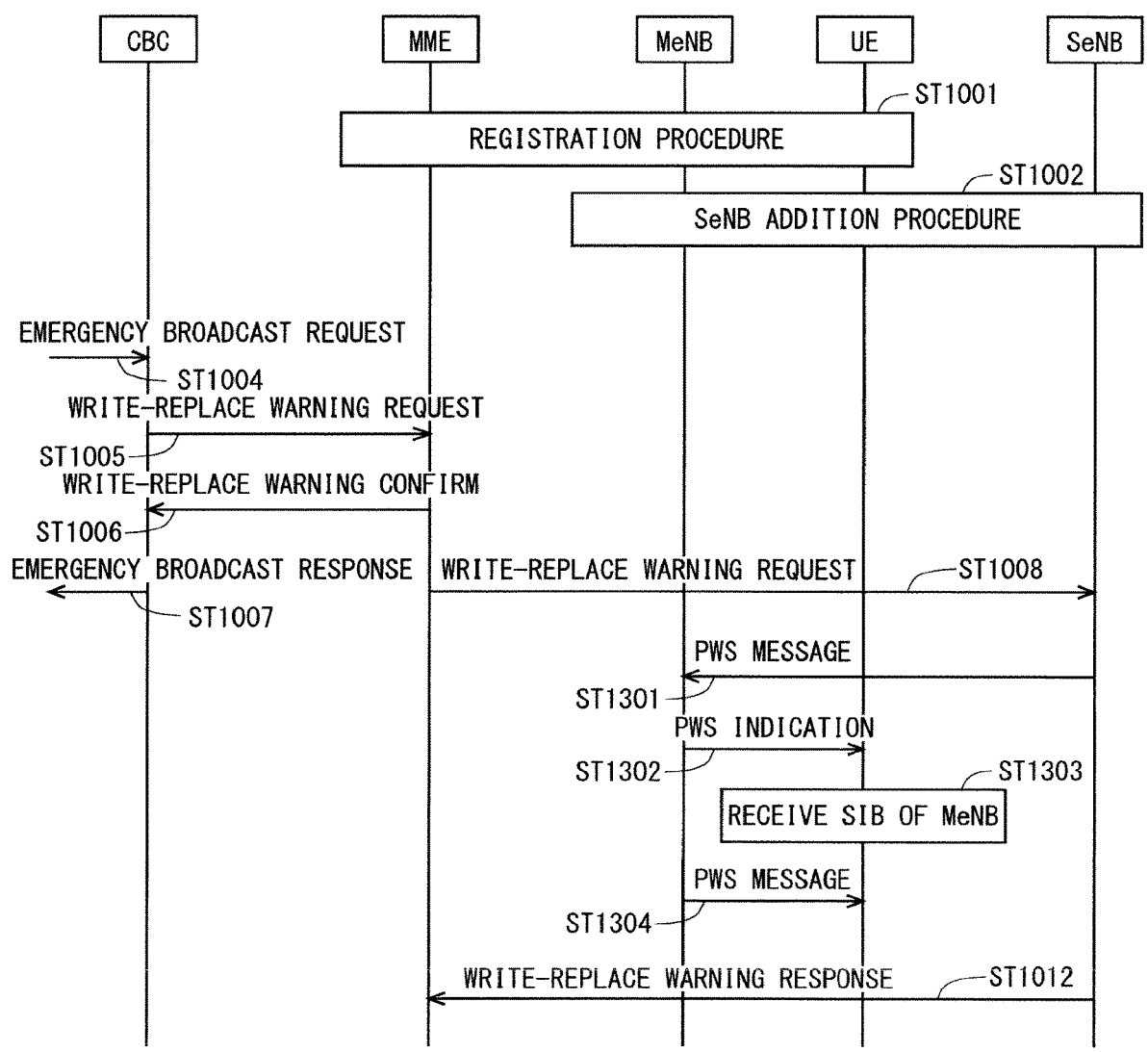

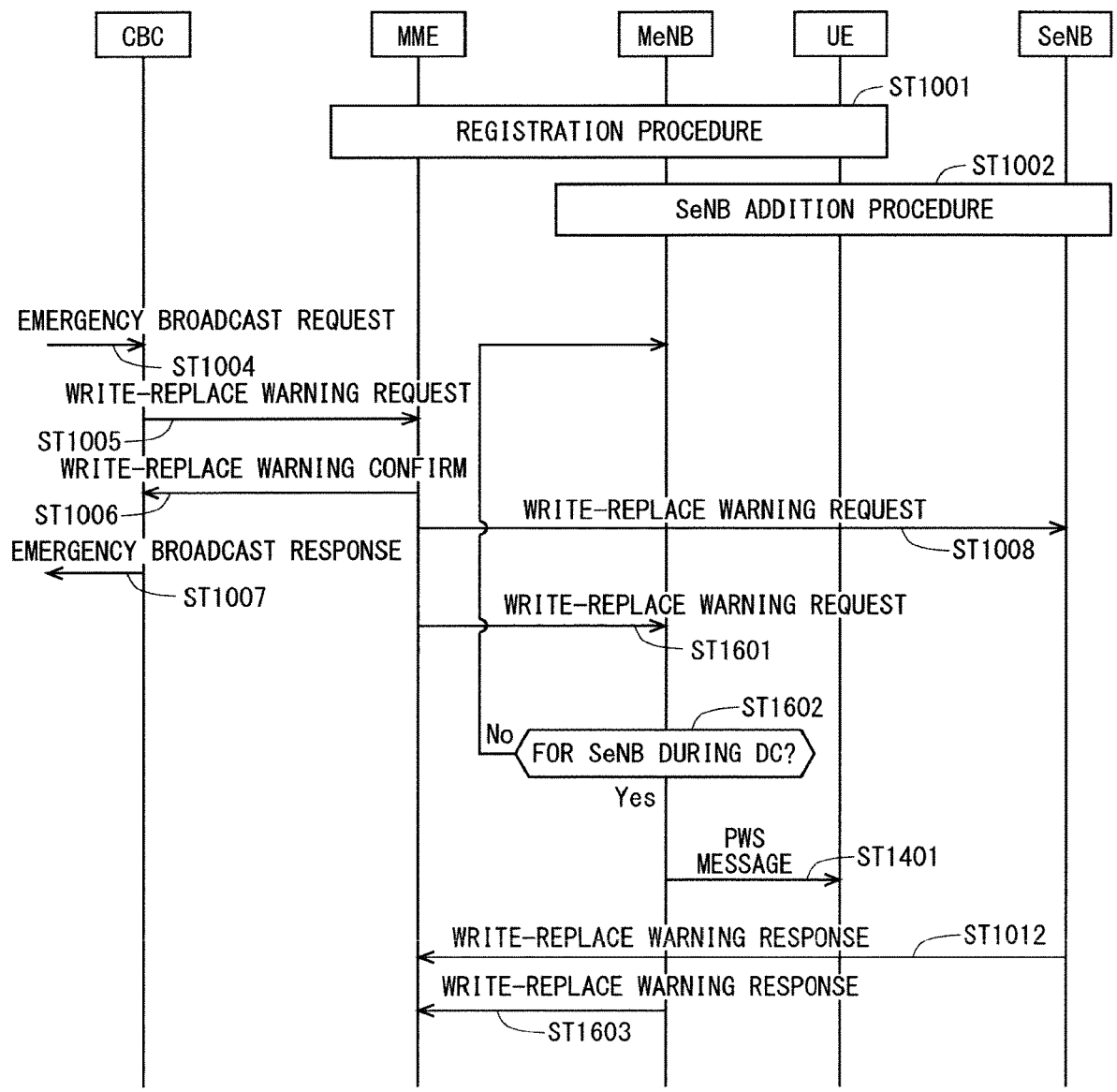
F I G . 1 7

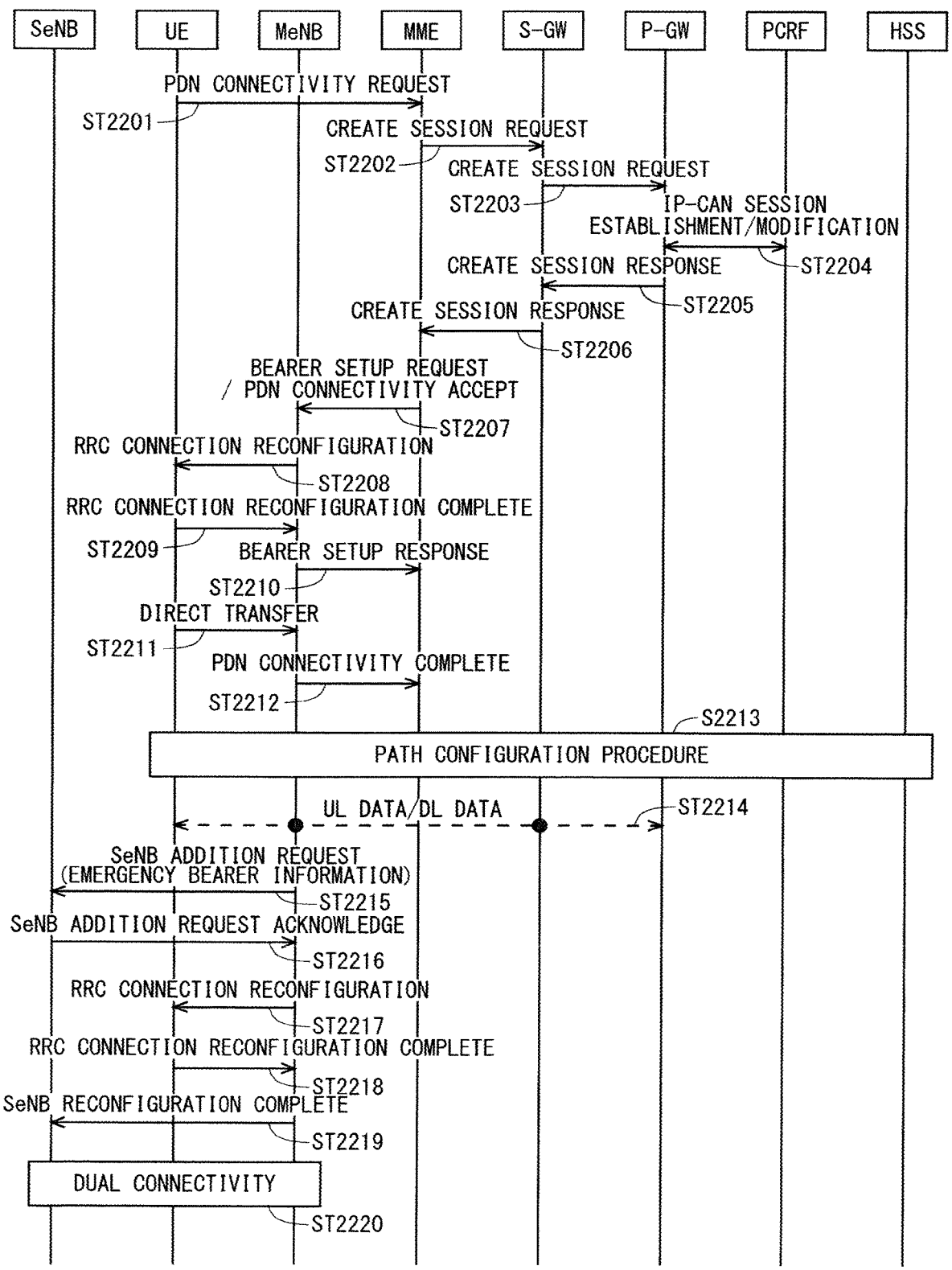

F I G . 2 2
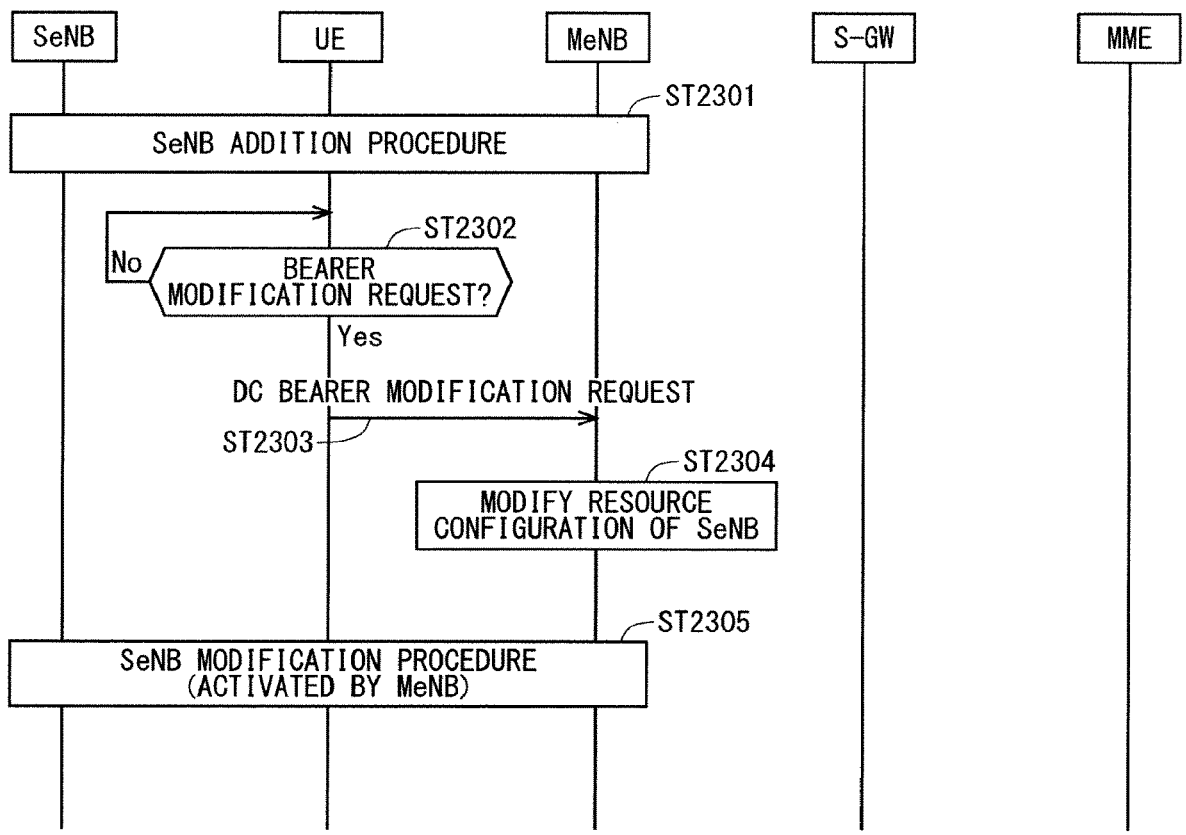

F I G . 2 3
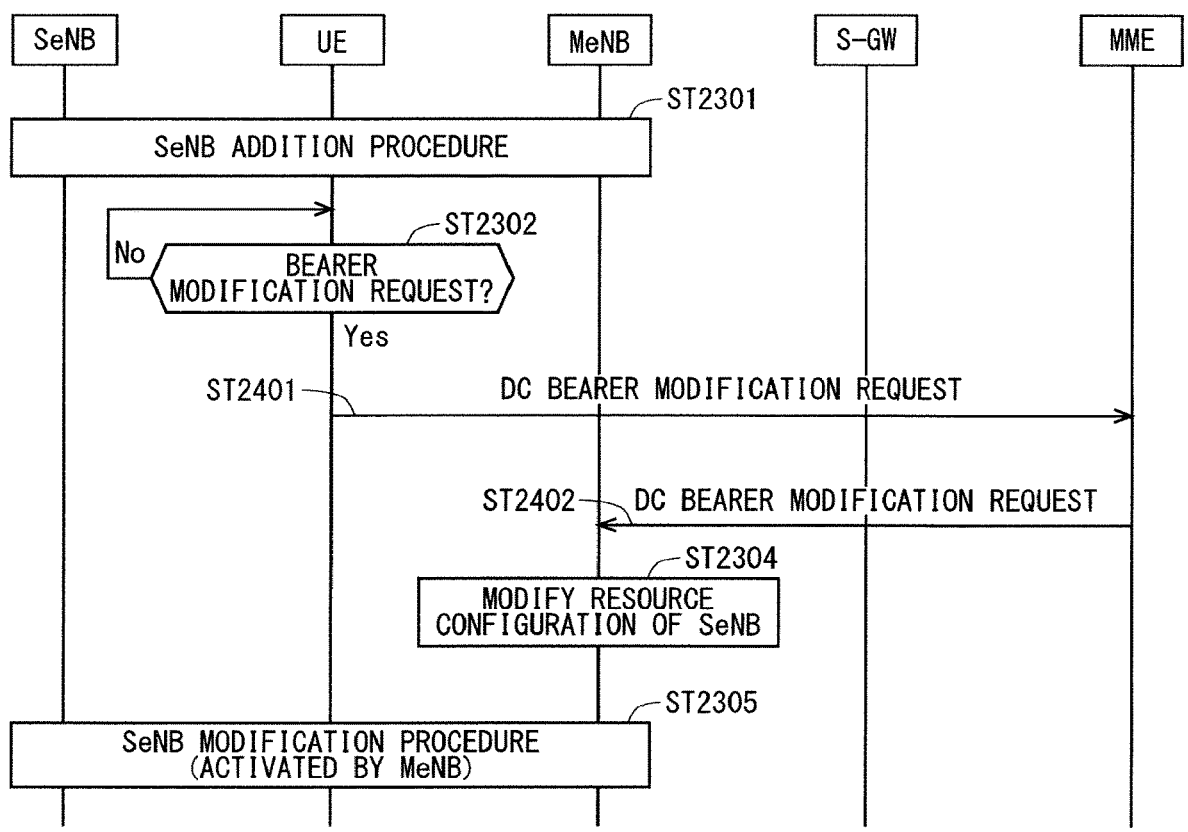

F I G . 2 7
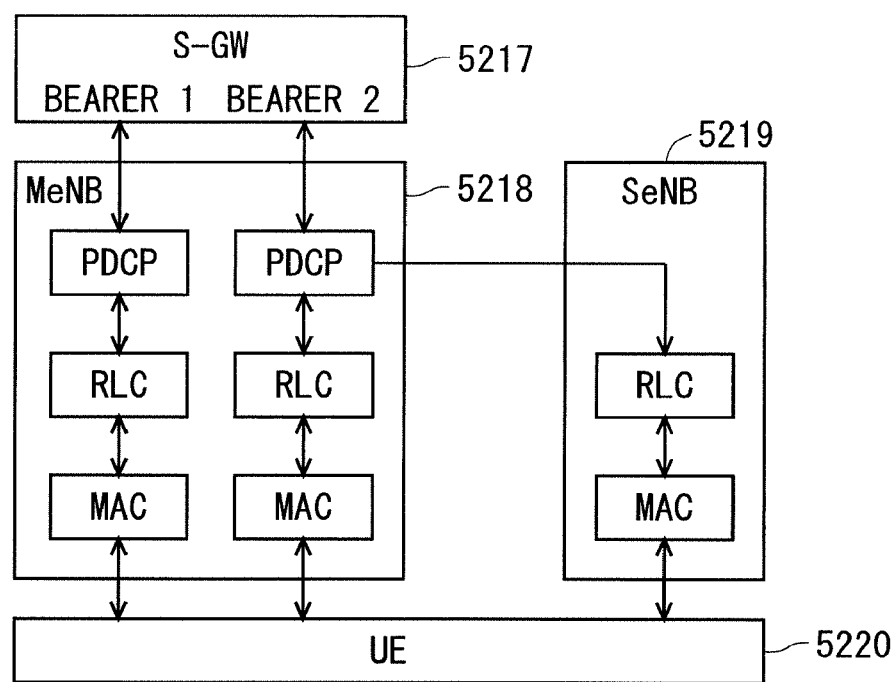

COMMUNICATION SYSTEM

CROSS REFERENCE TO RELATED APPLICATIONS

This application is a continuation of U.S. application Ser. No. 16/712,283, filed Dec. 12, 2019, which is a divisional of U.S. application Ser. No. 16/398,604 filed Apr. 30, 2019, which is a continuation of U.S. application Ser. No. 16/150,608 filed Oct. 3, 2018, which is a continuation of U.S. application Ser. No. 15/324,957 filed Jan. 9, 2017, which is a National Stage of PCT/JP2015/071932 filed Aug. 3, 2015, and claims priority to Japanese Patent Application No. 2014-160482 filed Aug. 6, 2014. The entire contents of each of which are incorporated herein by reference.

TECHNICAL FIELD

The present invention relates to a communication system in which radio communication is performed between a communication terminal device and a base station device.

BACKGROUND ART

The 3rd generation partnership project (3GPP), the standard organization regarding the mobile communication system, is studying new communication systems referred to as long term evolution (LTE) regarding radio sections and system architecture evolution (SAE) regarding the overall system configuration including a core network and a radio access network, which will be hereinbelow collectively referred to as a network as well (for example, see Non-Patent Documents 1 to 14). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Differently from the wideband code division multiple access (W-CDMA), circuit switching is not provided but a packet communication system alone is provided in the LTE.

The decisions by 3GPP regarding the frame configuration in the LTE system described in Non-Patent Document 1 (Chapter 5) will be described with reference to FIG. 1. FIG. 1 is a diagram illustrating a configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal (SS) per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station to a user equipment. A BCH transport block is mapped to four subframes within a 40 ms interval. There is no explicit signaling indicating 40 ms timing.

A physical control format indicator channel (PCFICH) is a channel for downlink transmission from a base station to a user equipment. Through the PCFICH, the base station notifies the user equipment of the number of orthogonal frequency division multiplexing (OFDM) symbols used for PDCCHs. The PCFICH is transmitted per subframe.

A physical downlink control channel (PDCCH) is a channel for downlink transmission from a base station to a user equipment. The PDCCH notifies the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signals (DM-RS) being UE-specific reference signals, positioning reference signals (PRS), and channel-state information reference signals (CSI-RS). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is a technique for improving the communication quality of a channel through combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinbelow, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is restricted in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking the locations of user equipments and calling user equipments, in other words, incoming calling to user equipments even in an idle state. An area for tracking locations of user equipments is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is a cell that supports both the open access mode and the closed access mode.

In 3GPP, among all physical cell identities (PCIs) is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. In contrast, the user equipment that has the PCI split information is capable of performing cell search using the PCI split information.

Further, 3GPP is pursuing specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA), which is also referred to as "aggregation", is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

3GPP is developing specifications of Release 12. In the specifications of Release 12, the use of small eNBs configuring small cells is studied to satisfy a tremendous volume of traffic in the future. In an example technique under study, a large number of small eNBs are installed to configure a large number of small cells, thus increasing spectral efficiency for increased communication capacity.

The traffic flow of a mobile network is on the rise, and the communication rate is also increasing. It is expected that the communication rate will be further increased when the operations of the LTE and the LTE-A are fully initiated, leading to an increase in traffic flow.

PRIOR ART DOCUMENTS

Non-Patent Documents

Non-Patent Document 1: 3GPP TS 36.300 V12.1.0
Non-Patent Document 2: 3GPP TS 36.304 V12.0.0
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.2.0
Non-Patent Document 8: 3GPP TS 36.141 V12.4.0
Non-Patent Document 9: 3GPP TR 36.842 V12.0.0
Non-Patent Document 10: 3GPP TS 23.041 V12.5.0
Non-Patent Document 11: 3GPP R2-142471
Non-Patent Document 12: 3GPP R2-142027
Non-Patent Document 13: 3GPP TS 23.401 V12.4.0
Non-Patent Document 14: 3GPP TS 36.211 V12.1.0

SUMMARY OF INVENTION

Problems to be Solved by the Invention

Installing and operating a large number of small cells in addition to a macro cell causes a reduction in mobility capability and an increase in interference. To solve these problems, 3GPP is studying a dual connectivity (abbreviated as DC) technique. It is studied for DC that a UE uses a macro cell and a small cell for communication. Specifically, 3GPP is studying that the mobility capability of a UE is secured by the macro cell and that a resource of the macro cell and a resource of the small cell are used together to increase a throughput in data communication.

Unfortunately, the application of DC to a conventional technique without any contrivance may prevent the technique from being achieved. Examples of such a technique include a public warning system (PWS) that is a warning information notification service, an emergency service, and a UE requested bearer modification. In the PWS, the UE during DC cannot be notified of warning information for small cells. In the emergency service, in execution of DC, a secondary eNB may reject the execution of DC considering the status of the eNB. In the UE requested bearer modification, the bearer subjected to DC cannot be modified. A method of solving such a problem is thus required.

Considering that a large number of small cells in addition to a macro cell are installed and operated in DC, a further improvement in mobility capability is desired. For example, when the UE moves within a macro cell and changes a small cell, the method of deriving the location and moving status of the UE in a conventional technique cannot change a small cell optimally, thus reducing the mobility capability.

3GPP is also studying a technique for communication using a plurality of cells (points) or a plurality of antennas for a UE, such as CoMP or multiple input and multiple output (MIMO). This technique uses cells or antennas in a coordinated manner to reduce an influence of interference, thus increasing a throughput.

Considering that a large number of small cells in addition to a macro cell are installed and operated in the techniques such as CoMP and MIMO, however, a technique for further improving mobility capability and reducing interference or a technique of enabling optimum scheduling by a cell that is a UE's moving destination to increase a throughput is required.

The present invention has an object to provide a communication system capable of improving the communication capability of a communication terminal device in the installation and operation of a large number of small cells in addition to a macro cell.

Means to Solve the Problems

A communication system according to the present invention includes a communication terminal device and base station devices configuring cells capable of radio communication with the communication terminal device. The cells include a macro cell and a small cell. The macro cell has a coverage in which communication with the communication terminal device is enabled and which is relatively large. The small cell is provided such that at least a part of the coverage of the small cell overlaps the coverage of the macro cell. The coverage of the small cell is relatively small. When the communication terminal device is connected to the macro cell and the small cell, upon receipt of information for small cells directed to the small cell from a higher-layer device, at least one cell of the macro cell and the small cell notifies the communication terminal device connected with the at least one cell of the information for small cells.

Effects of the Invention

In the communication system according to the present invention, the communication terminal device is connected to the macro cell and the small cell for dual connectivity. At least one cell of the macro cell and the small cell notifies the communication terminal device connected with the at least one cell of the information for small cells from the higher-layer device. This enables the communication terminal device to receive the information for small cells. The communication capability of the communication terminal device can thus be improved in the operation of a large number of small cells in addition to a macro cell.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating a configuration of a radio frame for use in an LTE communication system.

FIG. 8 shows an example of a cell configuration when a macro cell and small cells are overlaid on one another.

FIG. 9 shows an example flow of a PWS message in a communication system of a first embodiment.

FIG. 13 shows an example of a sequence of a PWS message notification process in the communication system of the first modification of the first embodiment.

FIG. 17 shows another example of the sequence of the PWS message notification process in the communication system of the second modification of the first embodiment.

FIG. 21 shows an example of a sequence of a DC execution process to an emergency bearer in a communication system of a second embodiment.

FIG. 22 shows an example of a sequence of a UE-activated DC bearer modification process in a communication system of a third embodiment.

FIG. 23 shows another example of the sequence of the UE-activated DC bearer modification process in the communication system of the third embodiment.

FIG. 27 shows another example of the operation of DC in the communication system of the first modification of the fifth embodiment.

DESCRIPTION OF EMBODIMENTS

First Embodiment

Figure 2:
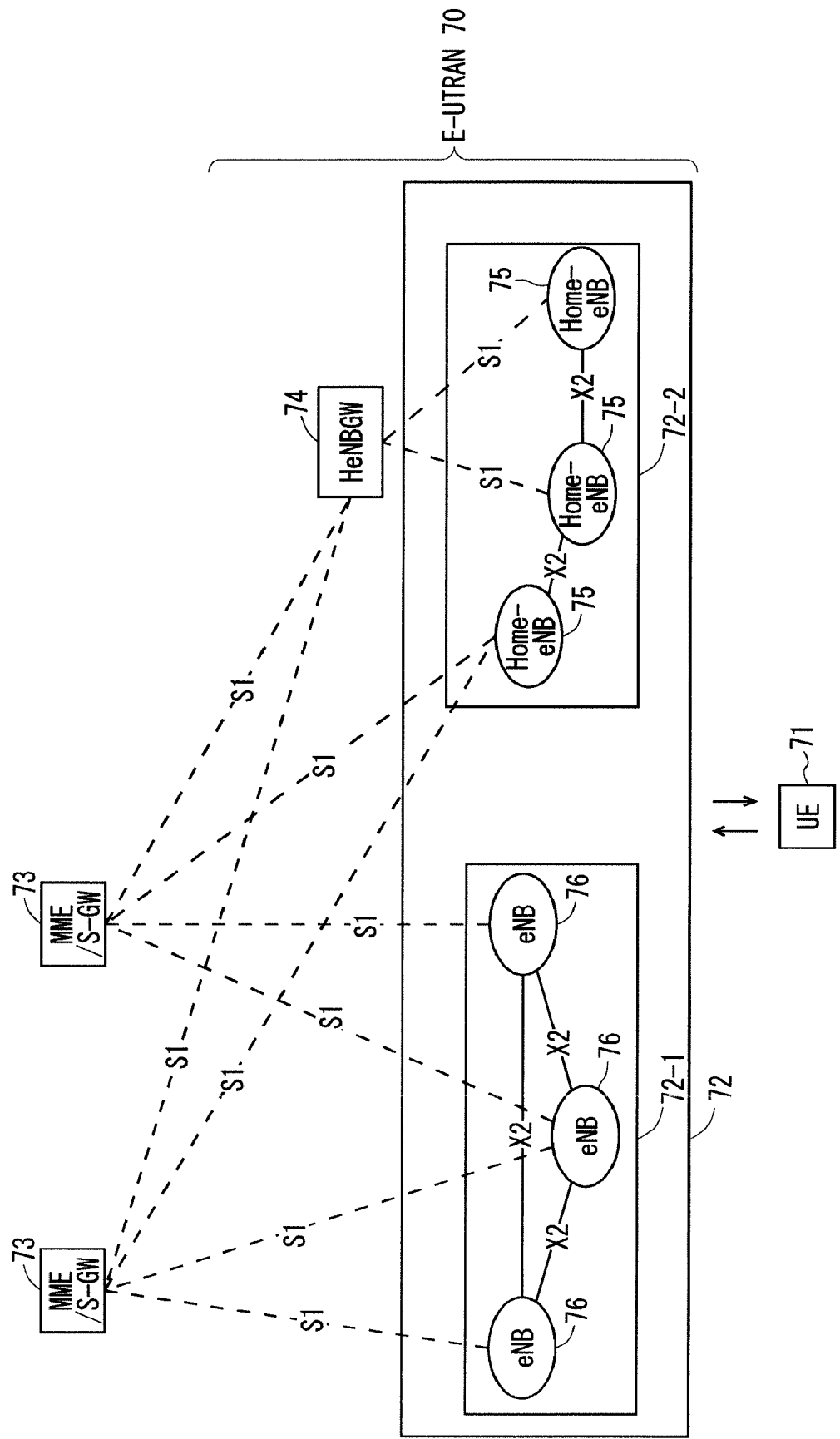
FIG. 2 is a block diagram showing an overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinbelow, referred to as a "user equipment (UE)") 71, which is a communication terminal device, is capable of radio communication with a base station device (hereinbelow, referred to as a "base station (E-UTRAN NodeB: eNB)") 72 and transmits and receives signals through radio communication.

The E-UTRAN is composed of one or more base stations 72, provided that a control protocol for a user equipment 71 such as a radio resource control (RRC), and user planes such as a packet data convergence protocol (PDCP), radio link control (RLC), medium access control (MAC), and physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, the user equipment performs, for example, handover (HO) and measurement of a neighbor cell.

The base stations 72 are classified into eNBs 76 and Home-eNBs 75. The communication system 700 includes an eNB group 72-1 including a plurality of eNBs 76 and a Home-eNB group 72-2 including a plurality of Home-eNBs 75. A system composed of an evolved packet core (EPC) being a core network and an E-UTRAN 70 being a radio access network is referred to as an evolved packet system (EPS). The EPC being a core network and the E-UTRAN 70 being a radio access network may be collectively referred to as a "network".

The eNB 76 is connected to an MME/S-GW unit (hereinbelow, also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MIE unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 by means of an S1 interface.

One or more Home-eNBs 75 are connected to one HeNBGW 74, and information is communicated therebetween through an S1 interface. The HeNBGW 74 is connected to one or more MME units 73, and information is communicated therebetween through an S1 interface.

The MIE units 73 and HeNBGW 74 are higher-layer entities, specifically, higher nodes, and control the connections between the user equipment (UE) 71 and the eNB 76 and the Home-eNB 75 that are base stations. The MME units 73 configure an EPC being a core network. The base station 72 and the HeNBGW 74 configure an E-UTRAN 70.

Further, 3GPP is studying the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 through the HeNBGW 74 and the Home-eNB 75 is directly connected to the MME unit 73.

The base station device 72 may configure a single cell or a plurality of cells. Each cell has a range predetermined as a coverage in which the cell can communicate with a communication terminal device and performs radio communication with the communication terminal device within the coverage. In the case where one base station device configures a plurality of cells, every cell is configured to communicate with the user equipment 71.

Figure 3:
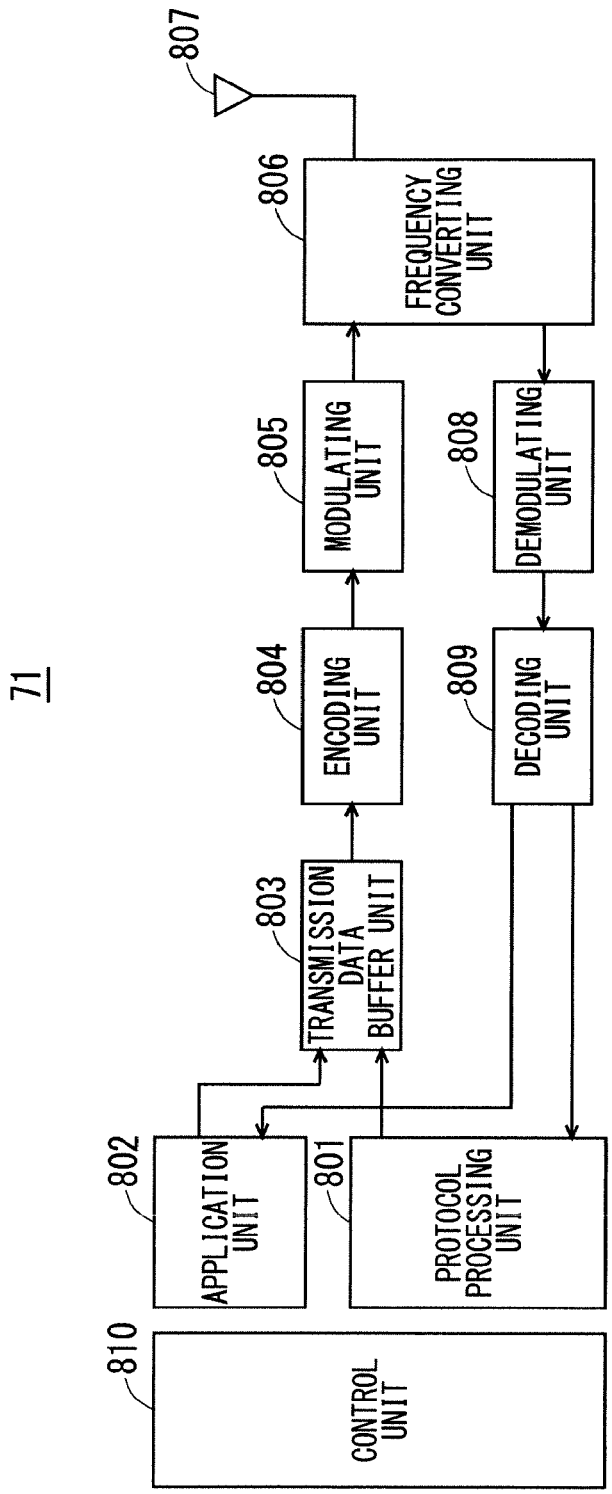
FIG. 3 is a block diagram showing a configuration of a user equipment 71 shown in FIG. 2, which is a user equipment according to the present invention.

FIG. 3 is a block diagram showing a configuration of the user equipment 71 of FIG. 2, which is a user equipment according to the present invention. The transmission process of the user equipment 71 shown in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception procedure as follows. The radio signal from the base station 72 is received by the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, and the user data is passed to the application unit 802. A series of processes by the user equipment 71 is controlled by a control unit 810. This means that, though not shown in FIG. 3, the control unit 810 is connected to the individual units 801 to 809.

Figure 4:
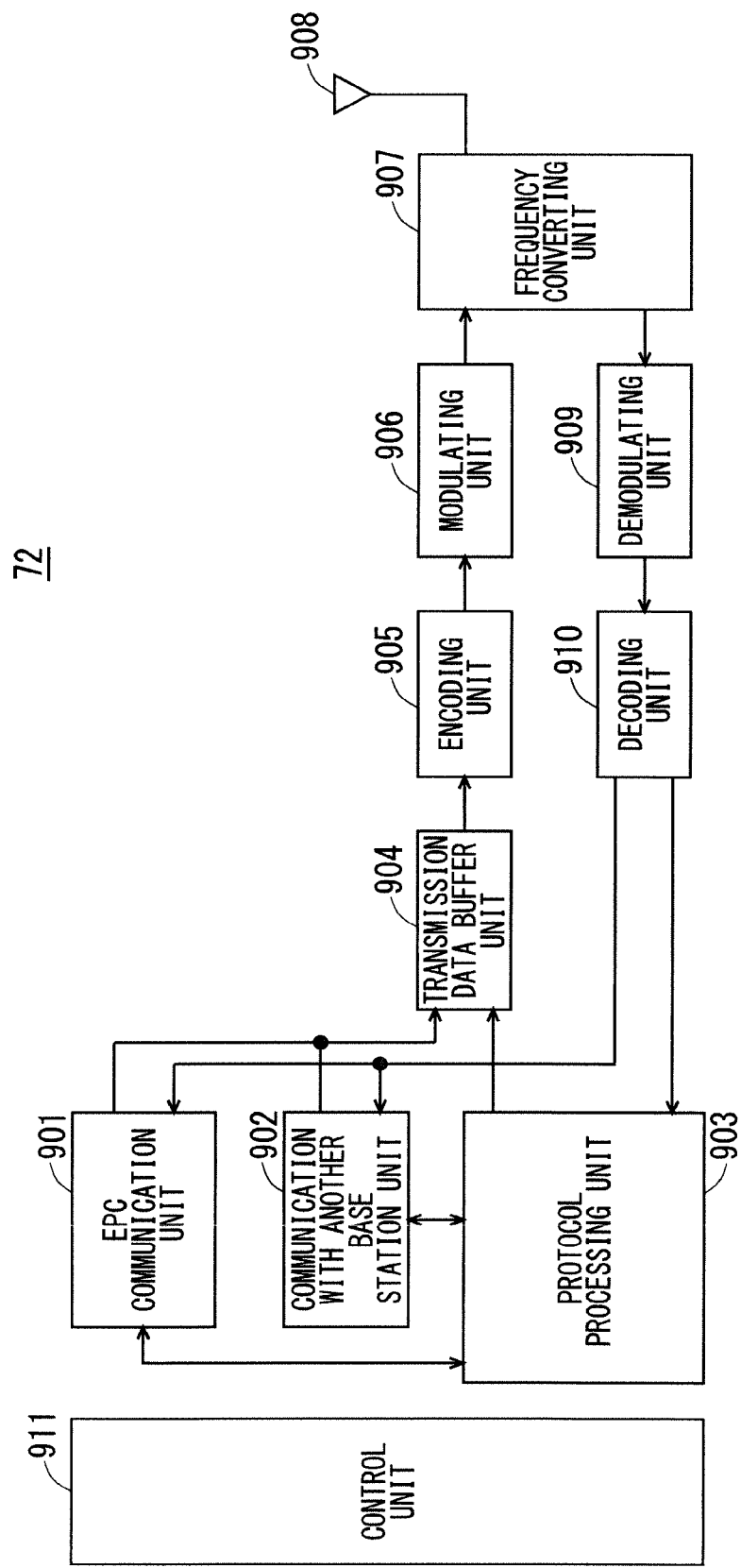
FIG. 4 is a block diagram showing a configuration of a base station 72 shown in FIG. 2, which is a base station according to the present invention.

FIG. 4 is a block diagram showing a configuration of the base station 72 of FIG. 2, which is a base station according to the present invention. The transmission process of the base station 72 shown in FIG. 4 will be described. An EPC communication unit 901 performs data transmission and reception between the base station 72 and the EPC (such as the MNME unit 73), HeNBGW 74, and the like. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or more user equipments 71.

The reception procedure of the base station 72 is executed as follows. A radio signal from one or more user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, and the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

Figure 5:
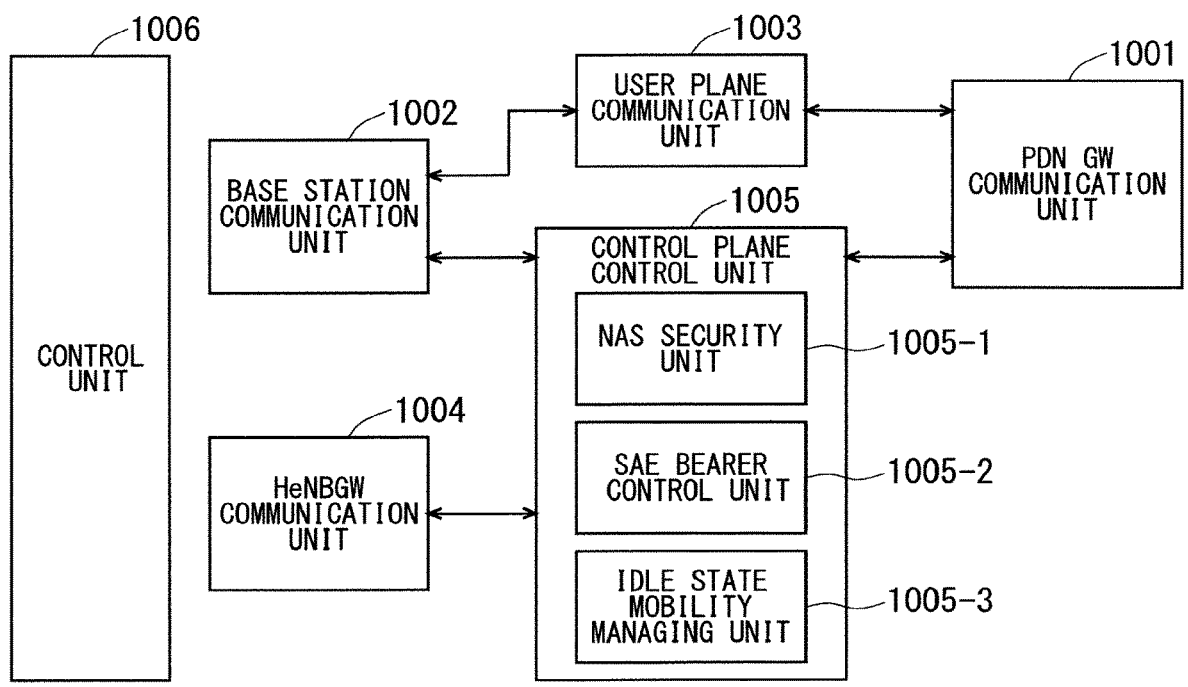
FIG. 5 is a block diagram showing a configuration of an MME according to the present invention.

FIG. 5 is a block diagram showing a configuration of the MME according to the present invention. FIG. 5 shows the configuration of an MME 73a included in the MME unit 73 shown in FIG. 2 described above. A PDN GW communication unit 1001 performs data transmission and reception between the MME 73a and the PDN GW. A base station communication unit 1002 performs data transmission and reception between the MME 73a and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or more base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73a and the HeNBGW 74 by means of the interface (IF) according to an information type. The control data received from the HeNBGW communication unit 1004 is passed from the HeNBGW communication unit 1004 to the control plane control unit 1005. The processing result of the control plane control unit 1005 is transmitted to the PDN GW via the PDN GW communication unit 1001. The processing results of the control plane control unit 1005 are transmitted to one or more base stations 72 by means of the S1 interface via the base station communication unit 1002, and is transmitted to one or more HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, and update of and search for a tracking area of one or more user equipments 71 being served thereby, and tracking area list management.

The MME 73a distributes a paging signal to one or more base stations 72. In addition, the MME 73a performs mobility control of an idle state. When the user equipment is in the idle state and active state, the MME 73a manages a list of tracking areas. The MME 73a begins a paging protocol by transmitting a paging message to the cell belonging to a tracking area in which the UE is registered. The idle state mobility managing unit 1005-3 may manage the CSG of the Home-eNBs 75 to be connected to the MME 73a, CSG-IDs, and a whitelist.

Figure 6:
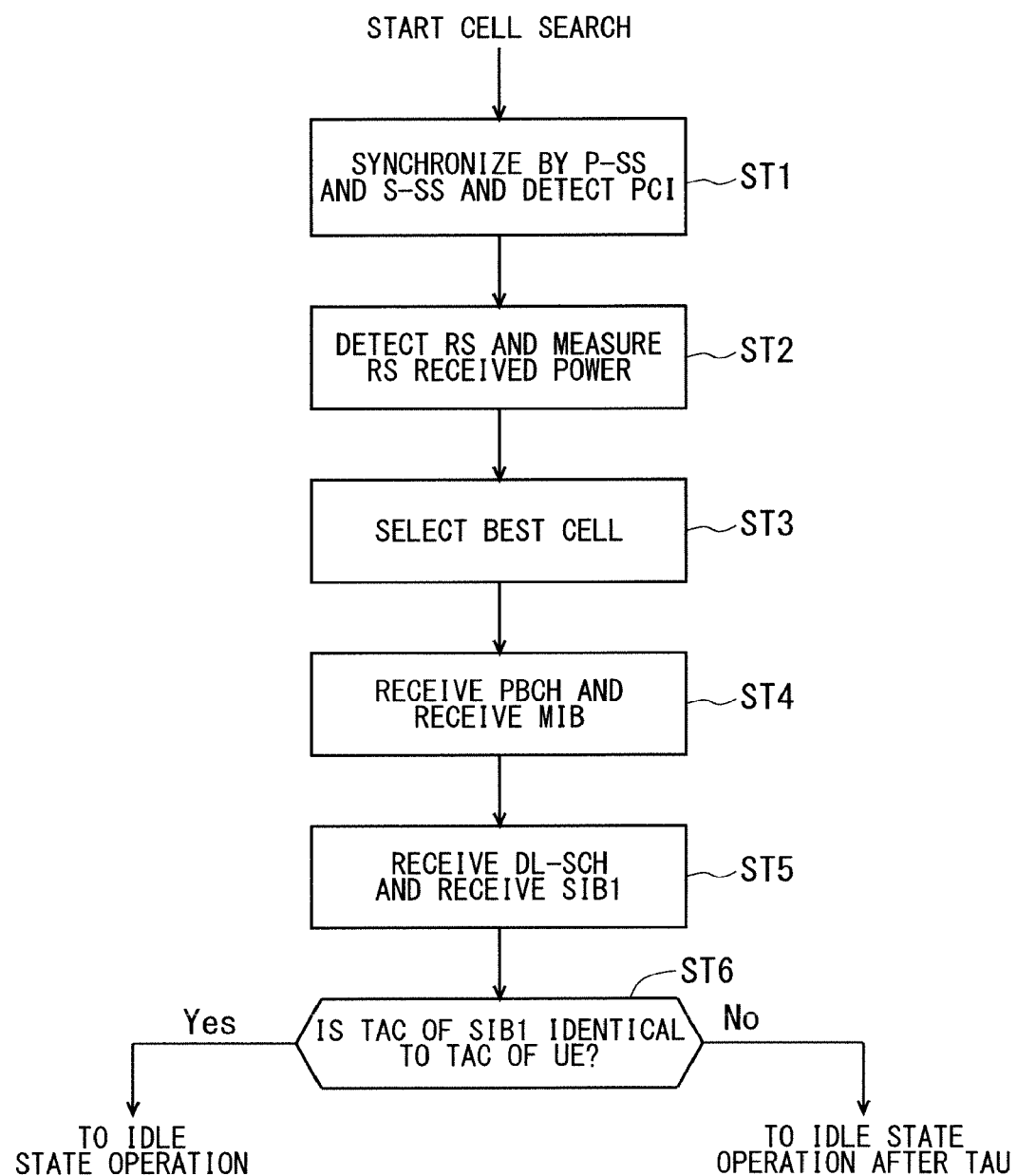
FIG. 6 is a flowchart showing an outline from a cell search to an idle state operation performed by a user equipment (UE) in the LTE communication system.

An example of a cell search method in a mobile communication system will be described next. FIG. 6 is a flowchart showing an outline from a cell search to an idle state operation performed by a user equipment (UE) in the LTE communication system. When starting a cell search, in step ST1, the user equipment synchronizes slot timing and frame timing by a primary synchronization signal (P-SS) and a secondary synchronization signal (S-SS) transmitted from a neighbor base station.

The P-SS and S-SS are collectively referred to as synchronization signals (SSs). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In step ST2, for the synchronized cells, the user equipment next detects a cell-specific reference signal (CRS) being a reference signal (RS) transmitted from the base station per cell and measures the reference signal received power (RSRP). The codes corresponding one-to-one to the PCIs are used for the reference signal (RS). Separation from another cell is enabled by correlation using the code. The code for RS of the cell is derived from the PCI specified in step ST1, so that the RS can be detected and the RS received power can be measured.

In step ST3, the user equipment then selects the cell having the best RS received quality, for example, the cell having the highest RS received power, that is, the best cell, from one or more cells that have been detected up to step ST2.

In step ST4, the user equipment then receives the PBCH of the best cell and obtains the BCCH that is the broadcast information. A master information block (MIB) containing the cell configuration information is mapped to the BCCH over the PBCH. The MIB is accordingly obtained by obtaining the BCCH through reception of the PBCH. Examples of the MIB information include the downlink (DL) system bandwidth, which is also referred to as a transmission bandwidth configuration (dl-bandwidth), the number of transmission antennas, and a system frame number (SFN).

In step ST5, the user equipment then receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In step ST6, the user equipment then compares the TAC of the SIB1 received in step ST5 with the TAC portion of a tracking area identity (TAI) in the tracking area list that has already been possessed by the user equipment. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of step ST6 shows that the TAC received in step ST5 is identical to the TAC included in the tracking area list, the user equipment enters an idle state operation in the cell. If the result of the comparison shows that the TAC received in step ST5 is not included in the tracking area list, the user equipment requests a core network (EPC) including MME and the like to change a tracking area through the cell for performing tracking area update (TAU).

The device configuring a core network (hereinbelow, also referred to as a "core-network-side device") updates the tracking area list based on an identification number (such as UE-ID) of a user equipment transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, thus, it is studied to downsize cells for spatial separation.

In the conventional configuration of cells, the cell configured by an eNB has a relatively-large-range coverage. Conventionally, cells are configured such that relatively-large-range coverages of a plurality of cells configured by a plurality of eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell whose coverage is relatively large, that is, whose coverage area is relatively large, such as a cell configured by a conventional eNB, and a "macro eNB" refers to an eNB configuring a macro cell. A "small cell" refers to a cell whose coverage is relatively small, that is, whose coverage area is relatively small, such as a downsized cell, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

Figure 7:
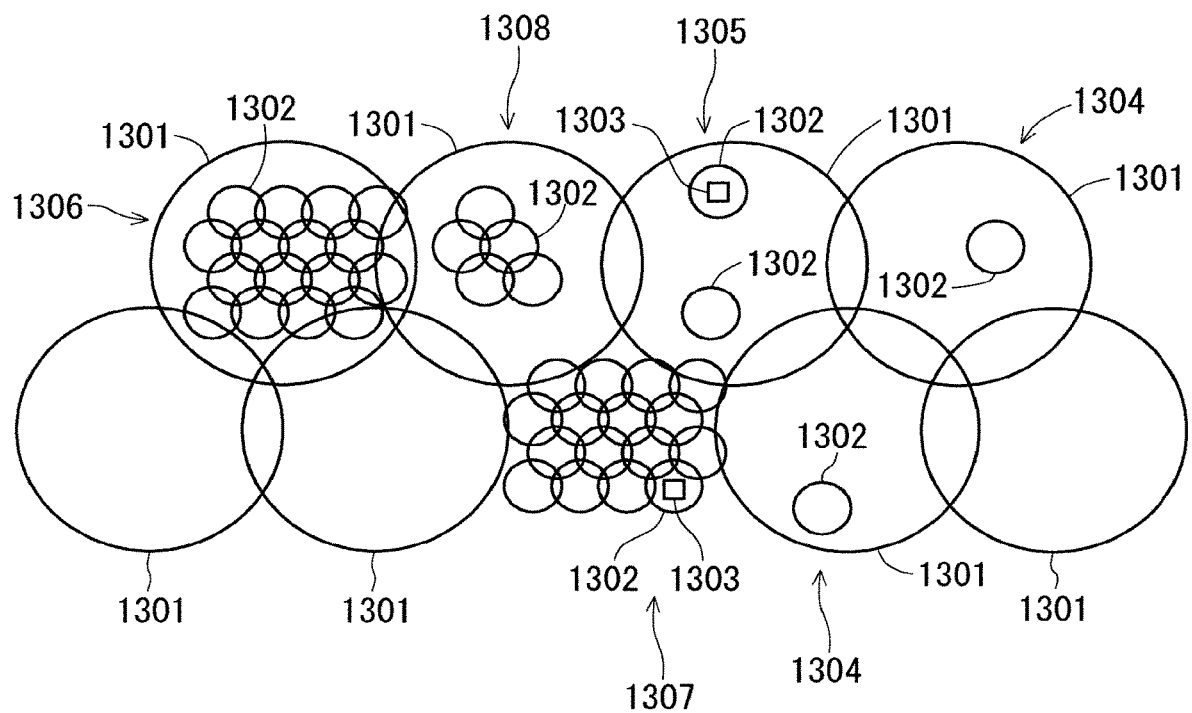
FIG. 7 shows the concept of a cell configuration in which macro eNBs and small eNBs coexist.

FIG. 7 shows the concept of a cell configuration in which macro eNBs and small eNBs coexist. The macro cell configured by a macro eNB has a relatively-large-range coverage 1301. The small cell configured by a small eNB has a coverage 1302 whose range is smaller than the coverage of the coverage 1301 of the macro eNB (macro cell).

When a plurality of eNBs coexist, the coverage of the cell configured by an eNB may be included in the coverage of the cell configured by another eNB. In the cell configuration shown in FIG. 7, as indicated by reference "1304" or "1305", the coverage 1302 of the small cell configured by a small eNB may be included in the coverage 1301 of the macro cell configured by a macro eNB.

As indicated by reference "1305", the coverages 1302 of a plurality of, for example, two small cells may be included in the coverage 1301 of one macro cell. A user equipment (UE) 1303 is included in, for example, the coverage 1302 of the small cell and performs communication via the small cell.

In the cell configuration shown in FIG. 7, as indicated by reference "1306", the coverage 1301 of the macro cell configured by a macro eNB may complicatedly overlap the coverages 1302 of the small cells configured by small eNBs.

As indicated by reference "1307", the coverage 1301 of the macro cell configured by a macro eNB may not overlap the coverages 1302 of the small cells configured by small eNBs.

Further, as indicated by reference "1308", the coverages 1302 of a large number of small cells configured by a large number of small eNBs may be configured in the coverage 1301 of one macro cell configured by one macro eNB.

It is studied in the operation of a small cell to improve a throughput by configuring a small cell in an area of heavy traffic within the coverage of a macro cell, that is, by placing (overlaying) a small cell on a macro cell.

FIG. 8 shows an example of a cell configuration in which a macro cell and small cells are overlaid on one another. With reference to FIG. 8, the coverage of a macro cell is indicated by reference "1301" and the coverage of a small cell is indicated by reference "1302" as in FIG. 7.

3GPP is studying dual connectivity (abbreviated as DC) in which a UE is connected to both a macro cell and a small cell in the cell configuration as shown in FIG. 8 (see Non-Patent Document 9). In the control plane (C-plane) for a UE performing DC, a secondary eNB (SeNB) is connected via a master eNB (MeNB) to an MME.

Two architectures are mainly studied in the user plane (U-plane) for the UE performing DC: one of them is an architecture in which a SeNB is directly connected to a S-GW (hereinbelow also referred to as "architecture 1A"), and the other is an architecture in which a SeNB is connected via a MeNB to a S-GW (hereinbelow also referred to as "architecture 3C").

Herein, the MeNB is an eNB configuring a macro cell in DC. The SeNB is an eNB configuring a small cell in DC. A cell group configured by the MeNB is referred to as "MCG", and a cell group configured by the SeNB is referred to as "SCG". A cell in the MCG is referred to as an "MCG cell", and a cell in the SCG is referred to as an "SCG cell". A cell that transmits the PUCCH in the MCG is referred to as "PCell". A special cell that transmits the PUCCH in the SCG is referred to as "SPCell". The SPCell has some of the functions of the PCell.

A problem to be solved in the first embodiment and a solution to the problem will be described below. The public warning system (PWS) is a system that notifies a UE located in a specific area of a warning message (see Non-Patent Document 10). Examples of the PWS include an Earthquake and Tsunami Warning System (ETWS), Commercial Mobile Alert System (CMAS), European Public Warning System (EU-ALERT), and Korean Public Alert System (KPAS).

The PWS supports not only a UE in RRC_IDLE but also a UE in RRC_CONNECTED because of the importance of a message to be notified. The message in the PWS (hereinbelow also referred to as a "PWS message") is notified to the eNB by the MME via an S1-MME that is an interface of the control plane (C-Plane). The PWS message corresponds to the information for small cells that is directed from a higher-layer entity to a small cell. Examples of the higher-layer entity include a cell broadcast entity (CBE), a cell broadcast centre (CBC), and an MME.

In DC under discussion of 3GPP, the SeNB is not directly connected with the MME in the control plane (C-Plane) of the UE during DC. In application of the PWS described above to DC, the UE performing DC using the SeNB is not accordingly to be notified of the PWS message for the SeNB, and the UE cannot receive a PWS message for the SeNB.

As to how to handle the PWS in DC, 3GPP has discussed only that the UE during DC receives a PWS message for the MeNB and has not discussed how the UE during DC receives a PWS message for the SeNB (see Non-Patent Documents 11 and 12).

The PWS is targeted for a specific area, and accordingly, even when the SeNB and the MeNB are overlaid on each other, the PWS message for the SeNB may differ from the PWS message for the MeNB. Enabling the UE located within the coverage of the SeNB to receive the PWS message for the SeNB is thus effective for the UE.

The first embodiment will disclose the method of enabling a UE performing DC using a SeNB to receive a PWS message for the SeNB.

The solution in the first embodiment will be described below. The SeNB transmits a PWS message for the SeNB to the UE during DC. The UE performing DC using the SeNB receives the PWS message for the SeNB.

When the PWS message is notified to a specific SCG cell or specific SCG cells, the SeNB used in DC transmits a PWS message for its own SCG cell to the UE performing DC using its own SCG cell. The UE performing DC using the SCG cell receives the PWS message for the SCG cell.

The PWS message notification method will be described. FIG. 9 shows an example flow of a PWS message in a communication system of the first embodiment. With reference to FIG. 9, the flow of the PWS message is indicated by bold arrows 106, 107, and 108.

The PWS message is notified to a cell broadcast centre (CBC) 101 by a cell broadcast entity (CBE, not shown). The CBC 101 notifies an MME 102 of the PWS message notified by the CBE as indicated by the arrow 106.

The MME 102 notifies an eNB of the PWS message notified by the CBC 101. Specifically, the MME 102 notifies a SeNB 104 of the PWS message as indicated by the arrow 107. The NME 102 also notifies a MeNB 103 of the PWS message. When its own cell is being used in DC, that is, when the eNB is the SeNB 104, the eNB notifies a UE 105 performing DC using its own cell of the PWS message notified by the MME 102 as indicated by the arrow 108.

The MME 102 and the MeNB 103 are connected by an interface 111. An S1 interface is used as the interface 111 between the MME 102 and the MeNB 103. Indicated herein is an interface to the UE 105 during DC.

The MeNB 103 and the SeNB 104 are connected by an interface 112. An X2 or Xn interface is used as the interface 112 between the MeNB 103 and the SeNB 104. Indicated herein is an interface to the UE 105 during DC.

For the SeNB 104 to notify the UE 105 performing DC using the cell of the SeNB 104 of a PWS message, the SCG cell may include a PWS message in an SIB and broadcast the SIB.

The SIB including the PWS message (hereinbelow also referred to as "SIB for PWS message") may be a newly provided SIB or an existing SIB. Examples of the existing SIB including a PWS message include SIB10 and SIB11 for ETWS and SIB12 for CMAS.

The method in which a SCG cell broadcasts a PWS message to a UE being served thereby is applicable as the method in which a SCG cell notifies a UE during DC of a PWS message. The SCG cell has to notify a UE being served thereby of a PWS message. This notification is made through broadcasting.

The SCG cell also notifies a UE performing DC using the SCG cell of a PWS message by the method in which the SCG cell broadcasts a PWS message to a UE being served thereby, thus eliminating the need for additional new process. This prevents the function of the SeNB from becoming complicated, reducing malfunctions.

The UE performing DC using the SCG cell receives the SIB for PWS message that is broadcast from the SCG cell. The PWS message is included in the SIB for PWS message to be broadcast, and accordingly, the UE receives the SIB for PWS message to receive the PWS message contained in the SIB for PWS message.

A PWS indication may be provided to show the UE during DC that the PWS message has been broadcast. The PWS indication corresponds to broadcast indication information indicating that the information for small cells has been broadcast. The PWS indication is notified to the UE during DC before the PWS message. Upon receipt of the PWS indication, the UE during DC receives the SIB including the PWS message of the SCG cell. With reference to FIG. 9, the flow of the PWS indication is indicated by arrows 109 and 110.

When receiving the PWS message for the SeNB 104 from the MME 102, the SeNB 104 notifies the UE 105 of the PWS indication. The following two, (1) and (2), will be disclosed as specific examples of the PWS indication notification method.

(1) The SeNB 104 directly notifies the UE 105 during DC as indicated by the arrow 110.
(2) The SeNB 104 notifies the UE 105 during DC via the MeNB 103 as indicated by the arrow 109.

The case where the notification method (1) is applied as the PWS indication notification method will be described. The SeNB 104 that has received the PWS message from the MME 102 specifies a SCG cell to which the SeNB 104 transmits the PWS message. The SCG cell includes the PWS indication in a paging message and notifies a UE being served thereby of the message. The SCG cell also notifies the UE during DC of the paging message including the PWS indication. The SCG cell broadcasts a PWS message.

The UE performing DC using the SCG cell receives the paging message from the SCG cell to receive the PWS indication contained in the paging message.

The PWS indication may be a newly provided indication or an existing indication. Examples of the existing indication include an ETWS indication for ETWS and a CMAS indication for CMAS.

Upon receipt of the PWS indication contained in the paging message, the UE performing DC using the SCG cell receives the SIB including the PWS message of the SCG cell.

The SIB including a PWS message may be determined statically in advance. The SIB including a PWS message may be determined in specifications.

The UE performing DC using the SCG cell receives SIB (SIB1) including scheduling information for the reception of the SIB including the PWS message. The UE during DC that has received the SIB1 of the SCG cell uses the scheduling information to receive the SIB including the PWS message.

Figure 10:
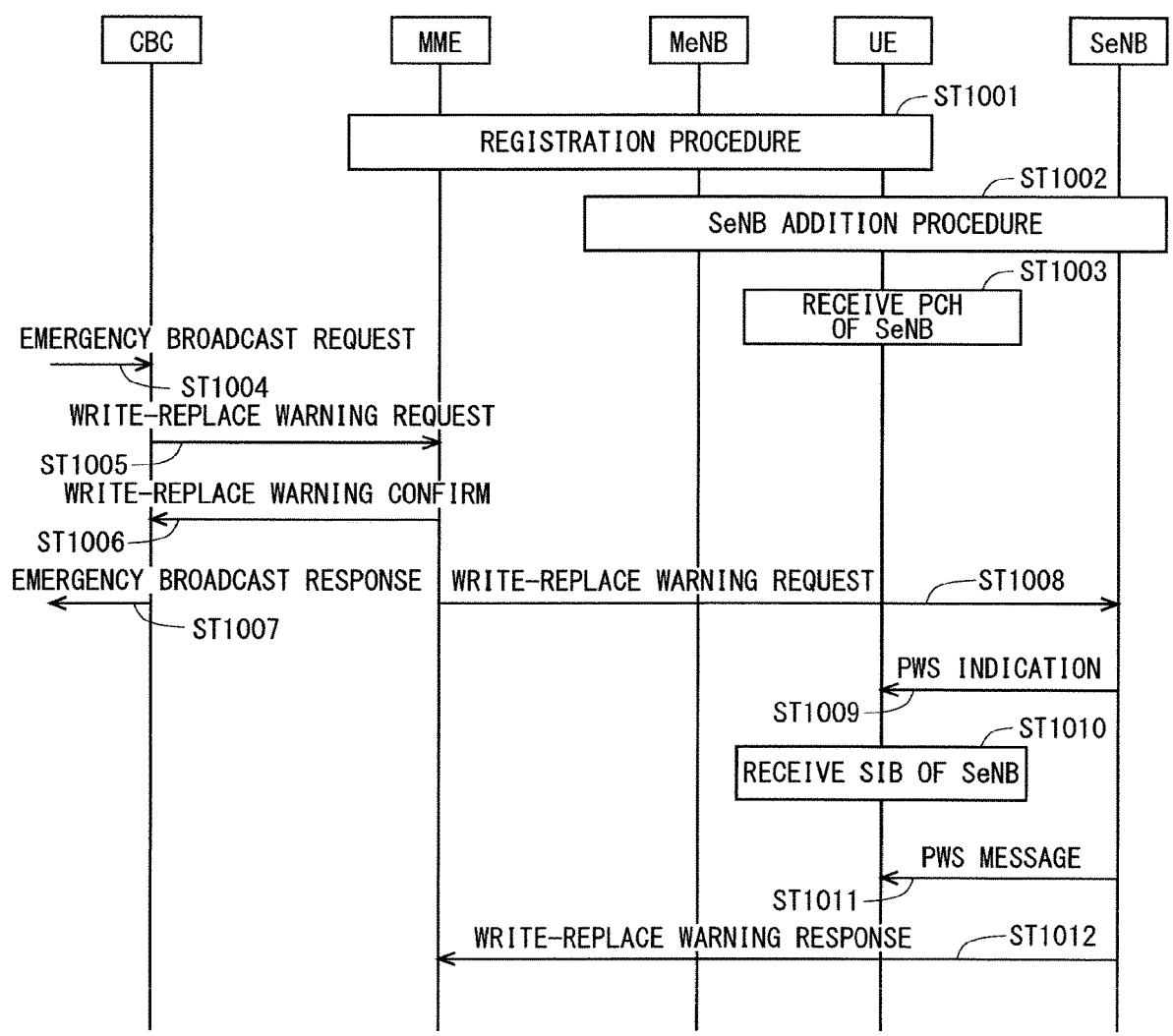
FIG. 10 shows an example of a sequence of a PWS message notification process in the communication system of the first embodiment.

FIG. 10 shows an example of a sequence of a PWS message notification process in the communication system of the first embodiment. FIG. 10 shows an example of the case where the notification method (1) described above is applied as the PWS indication notification method.

In step ST1001, the UE, the MeNB, and the MME perform a registration procedure. In the registration procedure, specifically, the UE performs registration with the MME via the MeNB. After the completion of the registration procedure, the UE enters the RRC_CONNECTED state with the MeNB.

In step ST1002, the MeNB activates a procedure for adding a SeNB (hereinbelow also referred to as a "SeNB addition procedure") to perform DC to the UE. As a result, the SeNB addition procedure is performed among the MeNB, the UE, and the SeNB. Details of the SeNB addition procedure are disclosed in, for example, Non-Patent Document 9. In the SeNB addition procedure, the UE is synchronized with a SCG cell to be added.

In step ST1003, the UE that has performed the SeNB addition procedure and has been synchronized with the SCG cell to be added receives a PCH to which the paging message of the SCG cell is mapped. In this embodiment, the UE intermittently receives a PCH to which the paging message of the SCG cell is mapped.

The UE may receive the information about the PCH transmission timing of the SCG cell from the SeNB via the MeNB. The SeNB notifies the MeNB of the information about the PCH transmission timing of the SCG cell. The MeNB notifies the UE of the information about the PCH transmission timing of the SCG cell. These notifications may be performed in the SeNB addition procedure of step ST1002. A non-limiting example of the information about the PCH transmission timing is a DRX cycle.

The SeNB recognizes the identifier of the UE in advance. The MeNB may notify the SeNB of the identifier of the UE that is to be subjected to DC. This notification may be made in the SeNB addition procedure of step ST1002.

The identifier of the UE may be an international mobile subscriber identity (IMSI). The reception of the IMSI of the UE, which is to be subjected to DC, by the SeNB enables a timing at which the PCH is transmitted to the UE to be derived as in the conventional method of deriving a timing at which the PCH is transmitted to the UE being served by the SeNB. Also, the UE during DC can derive a timing at which the PCH is transmitted from the SCG cell by the conventional deriving method, based on its own IMSI.

In step ST1004, a cell broadcast centre (CBC) receives a PWS message from a cell broadcast entity (CBE, not shown). Specifically, the CBC receives an emergency broadcast request message as the PWS message.

In step ST1005, the CBC that has received the PWS message from the CBE notifies the MME of the PWS message by an SBc interface.

In step ST1005, the CBC notifies the MME of the PWS message, as well as a tracking area ID list, warning area information, and a global eNB ID. The CBC may notify the identifier specific to the PWS message. The warning area information contains a list of cell identifiers, a list of tracking area identifiers, or an emergency area identifier.

A "Write-Replace Warning Request" message is used as the message for notification of the PWS message, the tracking area ID list, warning area information, and global eNB ID. In other words, in step ST1005, the CBC notifies the MME of the "Write-Replace Warning Request" message to notify the MME of the PWS message, the tracking area ID list, the warning area information, and the global eNB ID.

The MME that has received the PWS message specifies an eNB that is to be notified of the PWS message, from the tracking area ID list. Described and shown here is a case where the SeNB is included in the tracking area ID list.

In step ST1006, the MME that has received the PWS message notifies the CBC of a PWS message reception confirm message. A "Write-Replace Warning Confirm" message is used as the message for notification of the PWS message reception confirm message.

In step ST1007, the CBC that has received the PWS message reception confirm message notifies the CBE of a PWS message reception response message. Specifically, the CBC notifies an emergency broadcast response message as the PWS message reception response message.

The MME may notify the PWS message reception confirm message of step ST1006 after transmitting the "Write-Replace Warning Request" message in step ST1008, which will be described below, or after receiving a "Write-Replace Warning Response" message in step ST1012, which will be described below. The MME may perform this notification after notifying the eNB of a PWS message or receiving a response to the notification of the PWS message from the eNB.

In step ST1008, the MME notifies the SeNB of a PWS message by an S1-MME interface. In step ST1008, the MME notifies the SeNB of warning area information together with the PWS message. The NME may notify an identifier specific to the PWS message. The "Write-Replace Warning Request" message is used as the message for notification of the PWS message and the warning area information.

The SeNB that has received the PWS message uses the warning area information to confirm whether the PWS message is for the SeNB. If the PWS message is for the SeNB, the SeNB uses the warning area information to specify a SCG cell to which the SeNB transmits a PWS message.

In step ST1009, the SeNB notifies the UE being served thereby of a paging message including a PWS indication from the specified SCG cell. The SeNB also notifies the UE during DC of the paging message including a PWS indication. The SeNB uses the IMSI of the UE that has been obtained in the SeNB addition procedure of step ST1002 to determine a timing at which a paging message is transmitted to the UE during DC.

In step ST1009, the UE that has received the PCH in step ST1003 receives the paging message mapped to the PCH from the SCG cell to receive the PWS indication.

In step ST1010, the UE that has received the PWS indication receives the SIB1 broadcast from the SCG cell to receive the scheduling information on the SIB including the PWS message. In step ST1011, the UE then receives the SIB including the PWS message in accordance with the scheduling information to receive the PWS message.

For the PWS message with a sense of urgency, for example, ETWS, the UE may receive the PWS message immediately after receiving the PWS indication.

In step ST1012, the SeNB notifies the MME of a "Write-Replace Warning Response" message and ends the procedures of the PWS message notification process.

The PWS message notification process as shown in FIG. 10 enables the UE performing DC using the SeNB to receive a PWS message for the SeNB.

The use of the notification method (1) as the PWS indication notification method enables the notification of a PWS indication as in the conventional PWS indication notification method, thus preventing the process in the SeNB from becoming complicated.

In the presence of a plurality of SCG cells used in DC, the UE during DC needs to receive the PCHs of the plurality of SCG cells. In this case, an amount of the PCH reception procedures by the UE during DC increases, resulting in increased power consumption. To avoid such a situation, only the SPCell may be notified of the PWS indication. Also, only the SPCell may be notified of the PWS message. An increase in the power consumption of the UE during DC can thus be prevented.

When the SeNB receives a PWS message from the MME, a SCG cell that is regarded as a SPCell by the UE performing DC using the SeNB may transmit a PWS indication to the UE. The SPCell may transmit to the UE a PWS indication, as well as the information indicating for which SCG cell a PWS message has occurred. The UE performing DC using the SeNB may accordingly need to receive at least only the PCH of the SPCell. Alternatively, a PWS message may be transmitted by the SCG cell that is regarded as a SPCell by the UE performing DC using the SeNB. The UE performing DC using the SeNB may accordingly need to receive a PWS message from the SPCell alone. An increase in the power consumption of the UE during DC can thus be prevented.

The case where the notification method (2) is applied as the PWS indication notification method will be described with reference to FIG. 9 described above. The SeNB 104 that has received the PWS message from the MME 102 notifies the UE 105 performing DC using its own SCG cell of a PWS indication via the MeNB 103.

More specifically, the SeNB 104 specifies a SCG cell to which the SeNB 104 transmits a PWS message and notifies the UE 105 performing DC using the SCG cell of a PWS indication via the MeNB 103 as indicated by the arrow 109.

Upon receipt of the PWS indication transmitted from the MeNB 103, the UE 105 performing DC using the SCG cell receives the SIB including the PWS message of the SCG cell.

Figure 11:
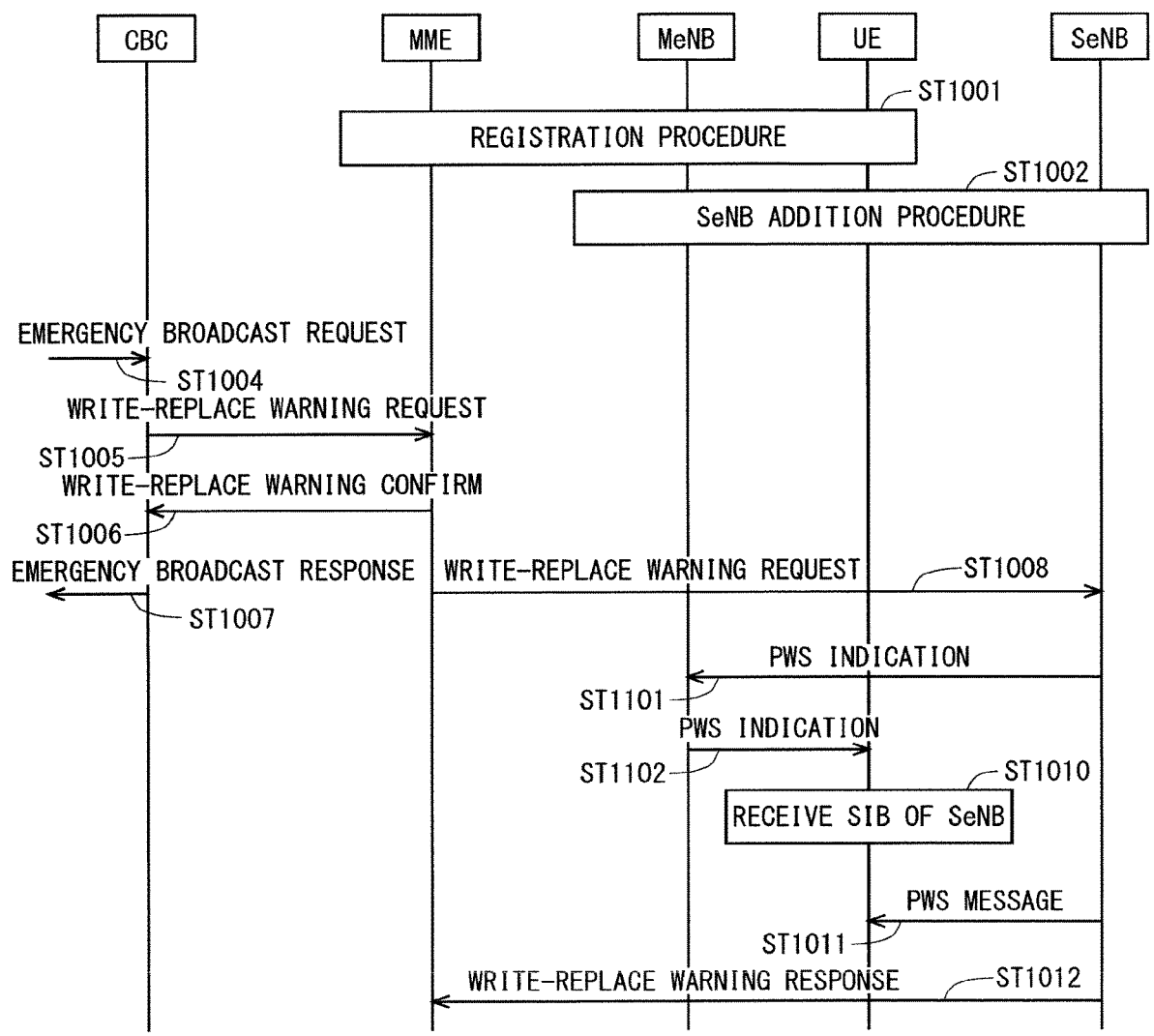
FIG. 11 shows another example of the sequence of the PWS message notification process in the communication system of the first embodiment.

FIG. 11 shows another example of the sequence of the PWS message notification process in the communication system of the first embodiment. FIG. 11 shows an example of the case where the notification method (2) described above is applied as the PWS indication notification method. The sequence shown in FIG. 11 is similar to the sequence shown in FIG. 10, and thus, the same steps will be denoted by the same step numbers, and common description will be omitted.

As in the case shown in FIG. 10 described above, first, the procedures of steps ST1001 and ST1002, and ST1004 to ST1008 are performed. The SeNB that has received the PWS message in step ST1008 uses warning area information to confirm whether the received PWS message is for the SeNB. If the received PWS message is for the SeNB, the SeNB uses the warning area information to specify a SCG cell to which the SeNB transmits the PWS message.

In step ST1101, the SeNB notifies the MeNB performing DC using the specified SCG cell of a PWS indication. The PWS indication is notified by the X2 interface. Alternatively, if a new Xn interface is provided between the MeNB and the SeNB for DC, a notification may be made by the Xn interface. The PWS indication may be included in a new message provided as an X2 message and notified. Alternatively, the PWS indication may be included in a message for changing the configuration of a SCG cell and notified. Still alternatively, a container for an RRC message may be provided in an X2 message or an Xn message, and the PWS indication may be included in the container and notified. These messages may be notified through dedicated signaling.

In step ST1101, the SeNB notifies the MeNB of the PWS indication, as well as the identifier of the SeNB or the identifier of the specified SCG cell. In the case of recognizing the identifier of the UE during DC with the specified SCG cell, the SeNB may notify the identifier of the UE during DC. As the method in which the SeNB recognizes the identifier of the UE during DC with the SCG cell, in the SeNB addition procedure of step ST1002, the MeNB may notify the SeNB of the identifier of the UE during DC with the SCG cell.

In step ST1102, the MeNB that has received the PWS indication to the UE during DC from the SeNB in step ST1101 notifies the UE performing DC using the SeNB of the PWS indication. An RRC message may be used in the notification of the PWS indication. The RRC message may be notified through dedicated signaling.

In step ST1102, the MeNB may notify the UE performing DC using the SeNB of the identifier of the PWS indication, as well as the identifier of the SCG cell to which the MeNB transmits a PWS message.

When being notified of the PWS indication in the container for the RRC message by the SeNB, the MeNB may transfer the PWS indication to an RRC message and dedicatedly notify the UE during DC of the container.

The MeNB that has received the PWS indication to the UE during DC from the SeNB in step ST1101 may use the identifier of the specified SCG cell or the identifier of the UE during DC with the specified SCG cell to notify only the UE during DC with the specified SCG cell of the PWS indication. The PWS indication, as well as the identifier of the specified SCG cell does not need to be notified. The UE performing DC with the SCG cell to which the MeNB transmits no PWS message does not need to be notified of the PWS indication. This results in a reduced signaling load and simplified control.

Although it has been disclosed that the SeNB notifies the MeNB performing DC using the specified SCG cell in step ST1101, the SeNB may notify an eNB capable of DC using its own cell or a neighboring eNB of the PWS indication. In this case, the SeNB notifies the PWS indication, as well as the identifier of the SeNB or the identifier of the specified SCG cell. The eNB that has been notified of the PWS indication uses the identifier of the SeNB or the identifier of the specified SCG cell to judge whether the eNB is performing DC using the SeNB or the SCG cell. During DC using the SeNB or the SCG cell, the SeNB may notify the UE during DC of the PWS indication.

In another method of notifying the UE of a PWS indication, the MeNB may include a PWS indication in a paging message to be mapped to the PCH and notify the paging message. A PWS indication of the PWS message for the SeNB during DC may be provided on the PCH. The identifier of the SCG cell that transmits a PWS message may be included together with the PWS indication. This allows the UE to specify a SCG cell that transmits a PWS message.

The MeNB may map a paging message to a PCH of the MCG cell from which the UE can receive the PCH.

The MeNB may map a paging message to the PCH of the PCell. This method is applicable to the case where the UE has received the PCH of only the PCell of the MeNB.

In step ST1102, the UE that has received the PWS indication from the MeNB receives the identifier of the SCG cell that has been notified together with the PWS indication and recognizes for which SCG cell the PWS message has been transmitted.

In step ST1010, the UE that has received the PWS indication receives the SIB1 broadcast from the SCG cell to receive scheduling information on the SIB including the PWS message. In step ST1011, the UE then receives the SIB including the PWS message in accordance with the scheduling information to receive the PWS message.

For a PWS message with a sense of urgency, for example, ETWS, the UE may receive a PWS message immediately after receiving a PWS indication.

In step ST1012, the SeNB notifies the MME of a "Write-Replace Warning Response" message and ends the procedures of the PWS message notification process, as in the case shown in FIG. 10 described above.

The method used in the presence of a plurality of SCG cells used in DC or the method in which a SPCell notifies a PWS indication or a PWS message when the SeNB receives the PWS message from the MME, which has been disclosed in the PWS indication notification method (1), may be applied as the PWS indication notification method (2). This simplifies the PWS indication reception procedure or the PWS message reception procedure by the UE, resulting in reduced power consumption of the UE.

The PWS message notification process as shown in FIG. 11 above enables the UE performing DC using the SeNB to receive a PWS message for the SeNB.

The use of the notification method (2) above as the PWS indication notification method eliminates the need for the UE during DC to receive the PCH of the SCG cell, which is required in the notification method (1) described above. The power consumption of the UE can thus be reduced.

First Modification of First Embodiment

This modification will disclose another method in which the SeNB transmits a PWS message for the SeNB to the UE during DC.

The SeNB transmits a PWS message for the SeNB to the UE via the MeNB. The UE during DC receives the PWS message for the SeNB from the MeNB.

When the PWS message is notified to a specific SCG cell or specific SCG cells, the SeNB used in DC transmits a PWS message for its own SCG cell to the UE performing DC using its own SCG cell via the MeNB. The UE performing DC using the SCG cell receives the PWS message for the SCG cell from the MeNB.

Figure 12:
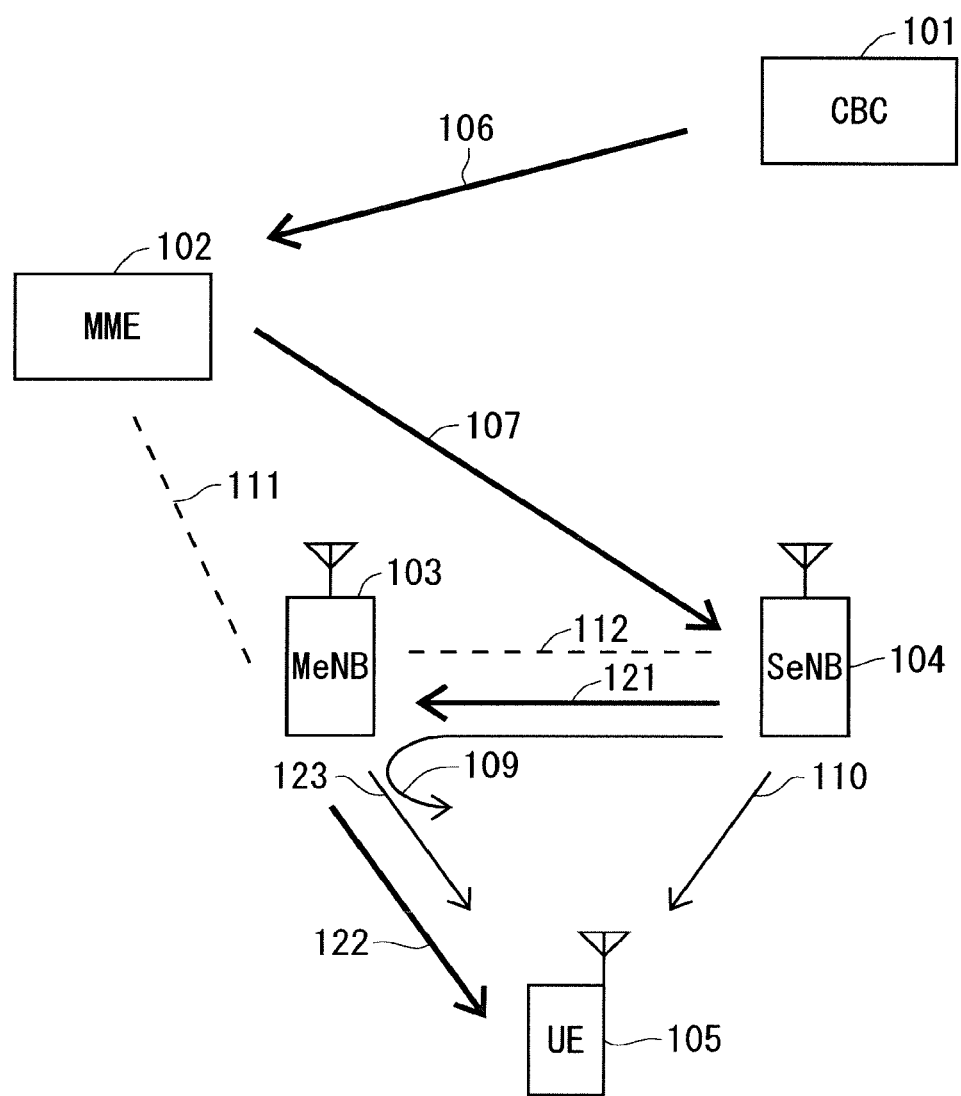
FIG. 12 shows an example flow of a PWS message in a communication system of a first modification of the first embodiment.

The PWS message notification method will be described. FIG. 12 shows an example flow of a PWS message in a communication system of a first modification of the first embodiment. The configuration shown in FIG. 12 is similar to the configuration shown in FIG. 9, and thus, the same portions will be denoted by the same references, and common description will be omitted. With reference to FIG. 12, the flow of the PWS message is indicated by the bold arrows 106, 107, 121, and 122.

The PWS message is notified to the CBC 101 by the CBE (not shown). The CBC 101 notifies the MME 102 of the PWS message as indicated by the arrow 106.

The MME 102 notifies the eNB of the PWS message. Specifically, the MME 102 notifies the SeNB 104 of the PWS message as indicated by the arrow 107. The MME 102 also notifies the MeNB 103 of the PWS message. When its own cell is used in DC, that is, when the eNB is the SeNB 104, the eNB 104 notifies the UE 105 performing DC using its own cell of the PWS message via the MeNB 103, as indicated by an arrow 121 and the arrow 122.

The SeNB 104 that received the PWS message from the MME 102 notifies the MeNB 103 performing DC using the SeNB of the PWS message. The SeNB 104 specifies a SCG cell to which the SeNB 104 transmits the PWS message and notifies the MeNB 103 performing DC using the SCG cell of the PWS message.

The X2 interface 112 is used in the notification of the PWS message. Alternatively, if a new Xn interface is provided between the MeNB 103 and the SeNB 104 for DC, the PWS message may be notified by means of the Xn interface. The PWS message may be included in a new message provided as the X2 message and notified. Alternatively, the PWS message may be included in a message for changing the configuration of the SCG cell and notified. A container for an RRC message may be provided in an X2 message or an Xn message, and the PWS message may be included in the container and notified. These messages may be notified through dedicated signaling.

The SeNB may notify the PWS message, as well as the identifier of the SeNB or the identifier of the specified SCG cell. Alternatively, when recognizing the identifier of the UE during DC with the specified SCG cell, the SeNB may notify the identifier of the UE during DC. The SeNB may notify the identifier specific to the PWS message.

The MeNB that has received the PWS message from the SeNB notifies the UE performing DC using the SeNB of the PWS message. The MeNB may notify the PWS message, as well as the identifier specific to the PWS message. The UE performing DC using the SeNB receives the PWS message for the SeNB notified by the MeNB. The MeNB may receive the PWS message, as well as the identifier specific to the PWS message. This enables the UE performing DC using the SeNB to obtain the PWS message for the SeNB.

The PWS indication may be provided to be notified to the UE during DC before the PWS message, as in the first embodiment. In this case, upon receipt of the PWS indication, the UE during DC receives the PWS message for the SeNB notified by the MeNB.

With reference to FIG. 12, the flow of the PWS indication is indicated by the arrows 109 and 110 and an arrow 123.

When receiving the PWS message for the SeNB from the MME 102, the SeNB 104 notifies the UE 105 of the PWS indication as indicated by the arrow 110. Alternatively, when the MeNB 103 receives the PWS message from the SeNB

104, the MeNB 103 may notify the UE 105 during DC of the PWS indication, as indicated by the arrow 123.

The following three, (1) to (3), will be disclosed as specific examples of the PWS indication notification method.

(1) The SeNB 104 directly notifies the UE 105 during DC as indicated by the arrow 110.

(2) The SeNB 104 notifies the UE 105 during DC via the MeNB 103 as indicated by the arrow 109.

(3) The MeNB 103 notifies the UE 105 during DC as indicated by the arrow 123.

The method described in the first embodiment is applicable as the notification methods (1) and (2) described above. The notification method (3) described above will be described as the PWS indication notification method. The MeNB 103 that has received the PWS message from the SeNB 104 notifies the UE 105 during DC of the PWS indication. More specifically, the MeNB 103 uses the information indicating to which SCG cell the PWS indication is directed, which has been received together with the PWS message, for example, the identifier of the SCG cell to notify the UE 105 performing DC using the SCG cell of the PWS indication. Upon receipt of the PWS indication transmitted from the MeNB 103, the UE 105 performing DC using the SCG cell receives the PWS message of the SCG cell from the MeNB 103.

FIG. 13 shows an example of the sequence of a PWS message notification process in the communication system of the first modification of the first embodiment. FIG. 13 shows an example of the case where the notification method (3) described above is applied as the PWS indication notification method. The sequence shown in FIG. 13 is similar to the sequences shown in FIGS. 10 and 11, and thus, the same steps will be denoted by the same step numbers, and common description will be omitted.

First, as in the cases shown in FIGS. 10 and 11 described above, the procedures of steps ST1001 and ST1002, and ST1004 to ST1008 are performed. The SeNB that has received the PWS message in step ST1008 uses the warning area information to confirm whether the PWS message is for the SeNB. If the PWS message is for the SeNB, the SeNB uses the warning area information to specify a SCG cell to which the SeNB transmits the PWS message.

In step ST1301, the SeNB notifies the MeNB performing DC using the specified SCG cell of the PWS message. The SeNB may notify the identifier specific to the PWS message.

In step ST1302, the MeNB that has received the PWS message from the SeNB notifies the UE performing DC using the SeNB of a PWS indication. The MeNB may use an RRC message in this notification. The RRC message may be notified through dedicated signaling.

Although it has been disclosed that the SeNB notifies the MeNB performing DC using the specified SCG cell of the PWS message in step ST1301, the SeNB may notify an eNB capable of DC using its own cell or a neighboring eNB of the PWS message. In this case, the SeNB notifies the PWS message, as well as the identifier of the SeNB or the identifier of the specified SCG cell. The eNB that has been notified of the PWS message uses the identifier of the SeNB or the identifier of the specified SCG cell to judge whether the eNB is performing DC using the SeNB or the SCG cell. During DC using the SeNB or the SCG cell, the eNB may notify the UE during DC of the PWS indication.

In step ST1302, the MeNB may notify the UE during DC using the SeNB of the PWS indication, as well as the identifier of the SCG cell to which the MeNB transmits the PWS message.

In another method of notifying the UE of a PWS indication, the MeNB may include the PWS indication in the paging message to be mapped to the PCH and notify the UE of the paging message. The PWS indication of the PWS message for the SeNB during DC may be provided on the PCH. The identifier of the SCG cell to which the MeNB transmits the PWS message may be included together with the PWS indication. This allows the UE to specify a SCG cell to which the MeNB transmits a PWS message.

The MeNB may map a paging message to the PCH of the MCG cell from which the UE can receive the PCH. Alternatively, the MeNB may map a paging message to the PCH of the PCell. This method is applicable to the case where the UE has received only the PCH of the PCell of the MeNB. In this case, the UE is required to receive only the PCH of the PCell and is not required to receive the PCH transmitted from another MCG cell. This reduces the power consumption of the UE.

In step ST1304, the MeNB that has received the PWS message from the SeNB broadcasts the PWS message. The MeNB includes the PWS message in the SIB and broadcasts the SIB. The SIB including the PWS message may be a newly provided SIB or a newly provided SIB for PWS message directed to the SeNB. Alternatively, an existing SIB may be used. Examples of the existing SIB including the PWS message include SIB10 and SIB11 for ETWS and SIB12 for CMAS. The method in which the MeNB broadcasts the PWS message to the UE being served thereby is applicable as the method in which the MeNB notifies the UE during DC of the PWS message.

The MeNB may broadcast the PWS message for the SeNB to the UE during DC from the PCell. Alternatively, the MeNB may include the PWS message in the SIB of the PCell and broadcast the SIB.

The UE during DC may receive the PWS message for the SeNB transmitted from the PCell.

The UE is required to receive only the SIB of the PCell and is not required to receive the SIB transmitted from another MCG cell. This can reduce the power consumption of the UE.

In step ST1303, the UE that has received the PWS indication from the MeNB in step ST1302 receives the SIB1 broadcast from the MeNB to receive the scheduling information on the SIB including the PWS message. In step ST1304, the UE then receives the SIB including the PWS message in accordance with the scheduling information to receive the PWS message.

For a PWS message with a sense of urgency, for example, ETWS, the UE may receive the PWS message immediately after receiving the PWS indication.

The MeNB notifies the UE during DC of the PWS indication or the PWS message from the PCell, thus eliminating the need for the UE to receive the PWS indication or the PWS message from the SeNB. This reduces the power consumption of the UE.

In step ST1012, the SeNB notifies the MME of the "Write-Replace Warning Response" message and ends the procedures of the PWS message notification process, as in the cases shown in FIGS. 10 and 11 described above.

In the method described above, the MeNB notifies the UE during DC of the SIB including the PWS message. In another method, the MeNB may notify the UE during DC of the RRC message including the PWS message. In this case, the RRC message may be notified through dedicated signaling.

When being notified of the PWS message in the container for the RRC message by the SeNB, the MeNB may transfer the PWS message to the RRC message and dedicatedly notify the UE during DC of the container.

The MeNB may notify the UE performing DC using the SeNB of the PWS message, as well as the identifier of the SCG cell to which the MeNB transmits the PWS message.

The MeNB transmits the RRC message including the PWS indication and then transmits the RRC message including the PWS message.

The MeNB may notify the UE during DC of one RRC message including the PWS indication and the PWS message. In this case, only one message is notified, thus reducing a signaling amount between the MeNB and the UE.

The PWS message notification process as shown in FIG. 13 enables the UE performing DC using the SeNB to receive a PWS message for the SeNB.

The MeNB notifies the UE during DC of the PWS message, thus eliminating the need for the UE to receive the PWS message transmitted from the SeNB. This can prevent the PWS message reception procedure from becoming complicated.

The UE also does not need to receive the broadcast information from the SeNB, thus reducing the power consumption of the UE.

In the PWS indication notification methods (2) and (3) described above, the MeNB notifies the UE during DC of the PWS indication. This eliminates the need for the UE to receive the PWS indication transmitted from the SeNB. The PWS message reception procedure can thus be prevented from becoming complicated. The UE does not need to receive the PCH of the SeNB, thus reducing the power consumption of the UE.

Although the example shown in FIG. 13 discloses the method of notifying the UE during DC of the PWS indication before the PWS message, another method will be disclosed below.

In the other method, the PWS indication to the UE during DC is eliminated. In other words, the UE during DC is notified of the PWS message alone.

Figure 14:
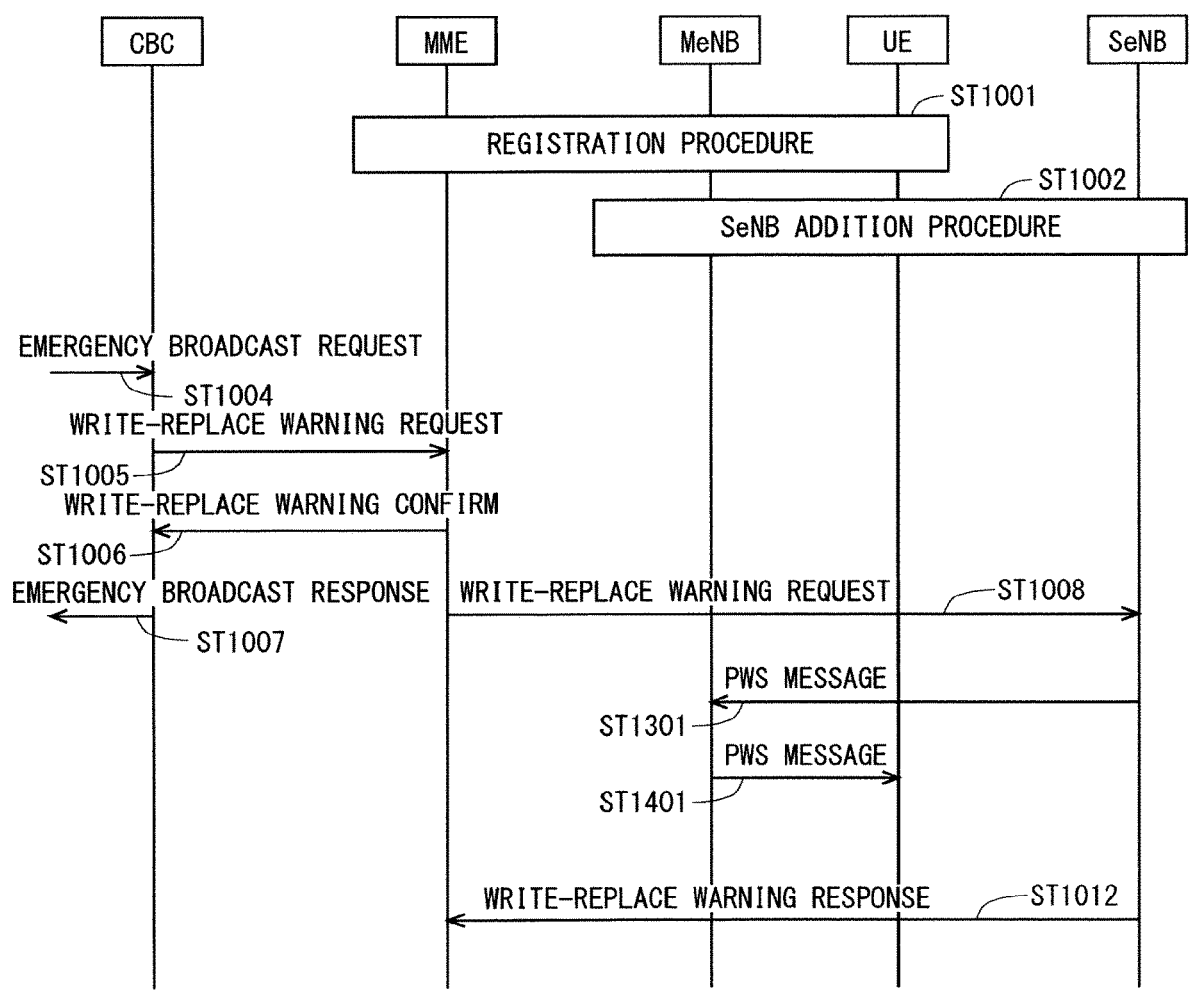
FIG. 14 shows another example of the sequence of the PWS message notification process in the communication system of the first modification of the first embodiment.

FIG. 14 shows another example of the sequence of the PWS message notification process in the communication system of the first modification of the first embodiment. FIG. 14 shows the example of the case where the UE during DC is notified of the PWS message alone. The sequence shown in FIG. 14 is similar to the sequences shown in FIGS. 10, 11, and 13 described above, and thus, the same steps will be denoted by the same step numbers, and common description will be omitted.

First, the procedures of steps ST1001 and step ST1002, and ST1004 to step ST1008 are performed as in the cases shown in FIGS. 10 and 11 described above. In step ST1401, the MeNB that has received the PWS message from the SeNB in step ST1301 notifies the UE performing DC using the SeNB of a PWS message. Specifically, the MeNB includes the PWS message in an RRC message and notifies the UE of the RRC message. The RRC message may be notified through UE-dedicated signaling.

When being notified of the PWS message in the container for the RRC message by the SeNB, the MeNB may transfer the PWS message to the RRC message and then dedicatedly notify the UE during DC of the container.

The MeNB may notify the UE during DC using the SeNB of the identifier of the PWS message, as well as the identifier of the SCG cell to which the MeNB transmits the PWS message.

In step ST1401, the UE during DC receives the RRC message directed to the UE to receive a PWS message for the SeNB.

In this manner, the MeNB notifies the UE during DC of the UE-dedicated RRC message including the PWS message for the SeNB. As a result, the MeNB can notify a specific UE of the PWS message for the SeNB. The MeNB can thus notify the UE of the PWS message without notifying the UE of the PWS indication.

As a result, the PWS indication transmission and reception procedures are not required, thus preventing the process from becoming complicated as a system. Signaling for PWS indication is not also required, thus reducing a signaling load.

Second Modification of First Embodiment

This modification will disclose a method in which the MeNB transmits the PWS message for the SeNB to the UE during DC.

This modification will disclose a case where the MME also notifies the MeNB of the PWS message for the SeNB. A non-limiting example of the case where the MME also notifies the MeNB of the PWS message for the SeNB is the case where the MeNB and the SeNB are in the same tracking area.

The MeNB that has received the PWS message from the MME has conventionally notified the UE being served thereby of the PWS message only when the PWS message is for the MeNB. If the PWS message notified by the MME is not for the MeNB, thus, the UE being served by the MeNB is not notified of the PWS message.

Even when the MME also notifies the MeNB of a PWS message for the SeNB, the MeNB does not notify the UE being served thereby of the PWS message. In other words, the MeNB does not notify the UE being served thereby, which is during DC using the SeNB, of the PWS message for the SeNB.

The UE may thus fail to receive the PWS message for the SeNB. This modification will disclose the method of solving such a problem.

The MeNB transmits the PWS message for the SeNB to the UE during DC.

The MeNB that has received the PWS message for the SeNB from the MME notifies the UE during DC using the SeNB of the PWS message for the SeNB.

Figure 15:
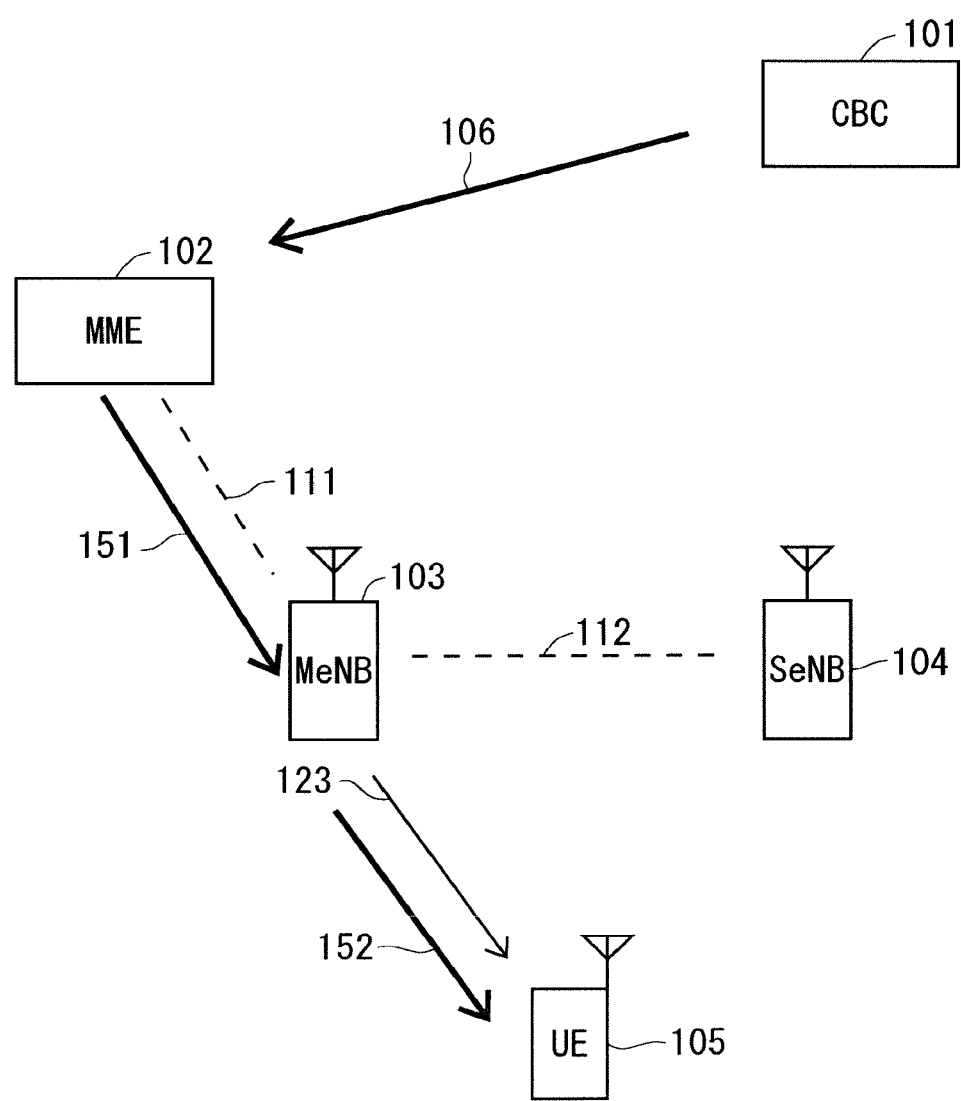
FIG. 15 shows an example flow of a PWS message in a communication system of a second modification of the first embodiment.

The PWS message notification method will be described. FIG. 15 shows an example flow of the PWS message in a communication system of a second modification of the first embodiment. The configuration shown in FIG. 15 is similar to the configurations shown in FIGS. 9 and 12, and thus, the same portions will be denoted by the same references, and common description will be omitted. With reference to FIG. 15, the flow of the PWS message is indicated by the bold arrow 106 and bold arrows 151 and 152.

As indicated by the arrow 151, the MME 102 that has received the PWS message from the CBC 101 notifies not only the SeNB 104 but also the MeNB 103 of the PWS message.

The MeNB 103 judges whether the PWS message received from the MME 102 is for the SeNB 104 used in DC. When receiving the PWS message for the SeNB 104 used in DC, as indicated by the arrow 152, the MeNB 103 notifies the UE 105 performing DC using the SeNB 104 of the PWS message.

As indicated by the arrow 152, the UE 105 performing DC using the SeNB 104 receives the PWS message for the SeNB 104 from the MeNB 103.

As indicated by the arrow 152, the UE 105 performing DC using the SeNB 104 can accordingly obtain the PWS message for the SeNB.

The PWS indication may be provided also in this modification to be notified to the UE during DC before the PWS message, as in the first modification of the first embodiment. Upon receipt of the PWS indication, the UE during DC receives the PWS message for the SeNB notified by the MeNB.

FIG. 15 also shows the flow of the PWS indication. With reference to FIG. 15, the flow of the PWS indication is indicated by the thin arrow 123.

When the MeNB 103 receives the PWS message for the SeNB 104 used in DC from the MME 102 as indicated by the arrow 151, as indicated by the arrow 123, the MeNB 103 may notify the UE 105 performing DC using the SeNB 104 of the PWS indication.

The PWS indication notification method (3) disclosed in the first modification of the first embodiment is applicable as the PWS indication notification method.

Figure 16:
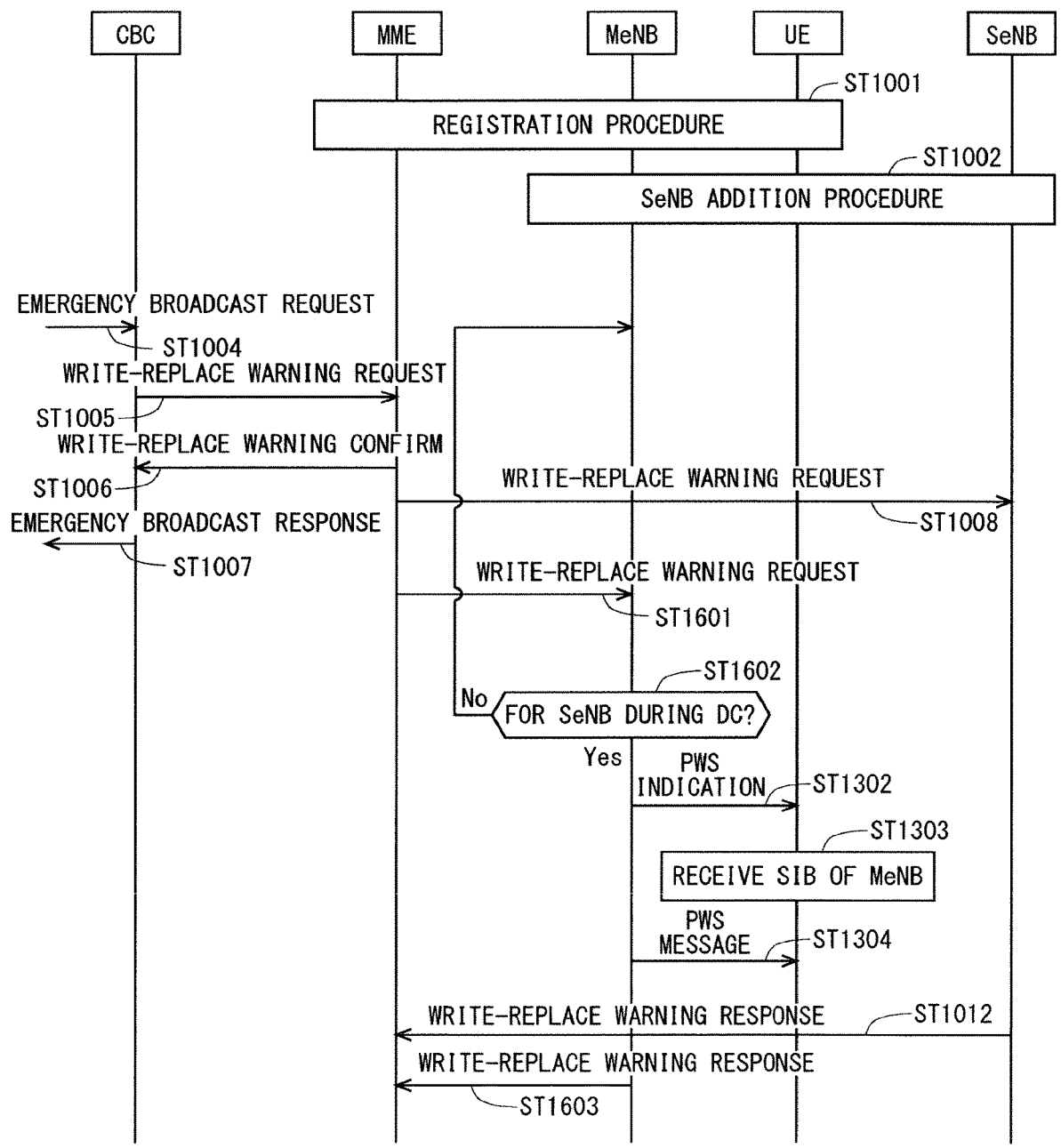
FIG. 16 shows an example of a sequence of a PWS message notification process in the communication system of the second modification of the first embodiment.

FIG. 16 shows an example of the sequence of the PWS message notification process in the communication system of the second modification of the first embodiment. FIG. 16 shows the example of the case where the PWS indication notification method (3), which has been disclosed in the first modification of the first embodiment, is applied as the PWS indication notification method. The sequence shown in FIG. 16 is similar to the sequences shown in FIGS. 10, 11, and 13 described above, and thus, the same steps will be denoted by the same step numbers, and common description will be omitted.

First, the procedures of steps ST1001, ST1002, ST1004, and ST1005 are performed as in the cases shown in FIGS. 10 and 11 described above. The MME that has received the PWS message from the CBC in step ST1005 specifies an eNB that is to be notified of the PWS message, from the tracking area ID list notified together with the PWS message. Described here is the case where the tracking area ID list includes the MeNB and the SeNB.

In step ST1008, the MME uses the S1-MME interface to notify the SeNB of the PWS message. In step ST1601, the MME also uses the S1-MME interface to notify the MeNB of the PWS message. Specifically, the MME notifies the PWS message, as well as the warning area information. The "Write-Replace Warning Request" message is used as the message for notification of the PWS message and the warning area information.

In step ST1602, the MeNB that has received the PWS message in step ST1601 uses the warning area information to judge whether the PWS message is for the SeNB used in DC.

If the PWS message is not for the SeNB used in DC, the MeNB returns to the normal process without performing the procedure for transmitting the PWS message to the UE performing DC using the SeNB. If the PWS message is for the SeNB used in DC, the MeNB uses the warning area information to specify a SCG cell to which the MeNB transmits the PWS message.

In step ST1302, the MeNB notifies the UE performing DC using the SeNB of the PWS indication.

The UE during DC that has received the PWS indication receives the PWS message notified by the MeNB through the procedures of steps ST1303 and ST1304. The method of the first modification of the first embodiment is applicable as the methods for the procedures of steps ST1303 and ST1304, and thus, description thereof will be omitted here.

In step ST1603, the MeNB notifies the MME of the "Write-Replace Warning Response" message and then ends the procedures of the PWS message notification process.

The PWS message notification process as shown in FIG. 16 above enables the UE performing DC using the SeNB to receive a PWS message for the SeNB.

The MeNB does not need to receive the PWS message from the SeNB, thus reducing the PWS message transmission and reception procedures between the SeNB and the MeNB. The procedures by the SeNB and the MeNB can accordingly be simplified, thus reducing the signaling load between the SeNB and the MeNB.

Although this modification has disclosed the method of notifying the UE during DC of the PWS indication before the PWS message, another method will be disclosed below.

The PWS indication to the UE during DC is eliminated. In other words, the UE during DC is notified of the PWS message alone.

FIG. 17 shows another example of the sequence of the PWS message notification process in the communication system of the second modification of the first embodiment. FIG. 17 shows the case where the UE during DC is notified of the PWS message alone. The sequence shown in FIG. 17 is similar to the sequences shown in FIGS. 10, 11, 13, 15, and 16, and thus, the same steps will be denoted by the same step numbers, and common description will be omitted.

First, the procedures of steps ST1001, ST1002, ST1004 to ST1008, and ST1601 are performed as in the case shown in FIG. 16 described above. In step ST1602, the MeNB that has received the PWS message from the MME in step ST1601 uses the warning area information to judge whether the PWS message is for the SeNB used in DC.

If the PWS message is not for the SeNB used in DC, the MeNB returns to the normal process without performing the procedure of transmitting the PWS message to the UE performing DC using the SeNB. If the PWS message is for the SeNB used in DC, the MeNB uses the warning area information to specify a SCG cell to which the MeNB transmits the PWS message.

In step ST1401, the MeNB notifies the UE performing DC using the SeNB of the PWS message. Specifically, the MeNB includes the PWS message in the RRC message and notifies the RRC message. The RRC message may be notified through UE-dedicated signaling.

The MeNB may notify the UE performing DC using the SeNB of the PWS message, as well as the identifier of the SCG cell to which the MeNB transmits the PWS message.

In step ST1401, the UE during DC receives the RRC message directed to the UE to receive the PWS message for the SeNB.

As described above, the MeNB notifies the UE during DC of the UE-dedicated RRC message including the PWS message for the SeNB, thus notifying a specific UE of the PWS message for the SeNB. The MeNB can thus notify the UE of the PWS message without notifying the UE of the PWS indication.

As a result, the PWS indication transmission and reception procedures are not required, thus preventing the process from becoming complicated as a system. Signaling for PWS indication is not also required, thus reducing a signaling load.

Third Modification of First Embodiment

This modification will disclose another method in which the MeNB transmits a PWS message for the SeNB to the UE during DC.

The second modification of the first embodiment has disclosed the case where the MME also notifies the MeNB of a PWS message for the SeNB. In some cases, however, the MME does not notify the MeNB of a PWS message for the SeNB. A non-limiting example of the case above is the case where the MeNB and the SeNB are in different tracking areas. In such a case, the method disclosed in the second modification of the first embodiment is not applicable.

This modification will disclose the method of solving such a problem.

The MeNB notifies the MME of the information about the SeNB used in DC. The MeNB may provide this notification in changing the SeNB or the SCG cell used in DC. The information about the SeNB possessed by the MME is accordingly updated as appropriate. The information about the SeNB used in DC may be notified in the SeNB addition procedure. Alternatively, the information may be notified in the SeNB change procedure or the SeNB modification procedure. In the SeNB release procedure, the MeNB may notify the MME of the information indicating that no SeNB is used in DC.

The MME can accordingly associate the SeNB to which the MME transmits the PWS message and the MeNB using the SeNB in DC with each other. The MME can thus notify the MeNB using the SeNB in DC of the PWS message for the SeNB.

When receiving the PWS message, the MIME judges whether the PWS message is for the SeNB used in DC. When receiving the PWS message for the SeNB used in DC, the MME notifies the MeNB of the PWS message.

The MeNB judges whether the PWS message received from the MME is for the SeNB used in DC. When receiving the PWS message for the SeNB used in DC, the MeNB notifies the UE performing DC using the SeNB of the PWS message.

The UE performing DC using the SeNB cell receives a PWS message for the SeNB cell from the MeNB.

The PWS message notification method will be described. The flow of the PWS message in this modification is similar to the flow in the case of the second modification of the first embodiment shown in FIG. 15 described above.

As in the second modification of the first embodiment, a PWS indication may be provided to be notified to the UE during DC before the PWS message. Upon receipt of the PWS indication, the UE during DC receives the PWS message for the SeNB notified by the MeNB.

The flow of the PWS indication in this modification is similar to the flow in the case of the second modification of the first embodiment shown in FIG. 15 described above.

When the MeNB receives the PWS message for the SeNB used in DC from the MME, the MeNB may notify the UE performing DC using the SeNB of the PWS indication. The PWS indication notification method (3) disclosed in the first modification of the first embodiment is applicable as the PWS indication notification method.

Figure 18:
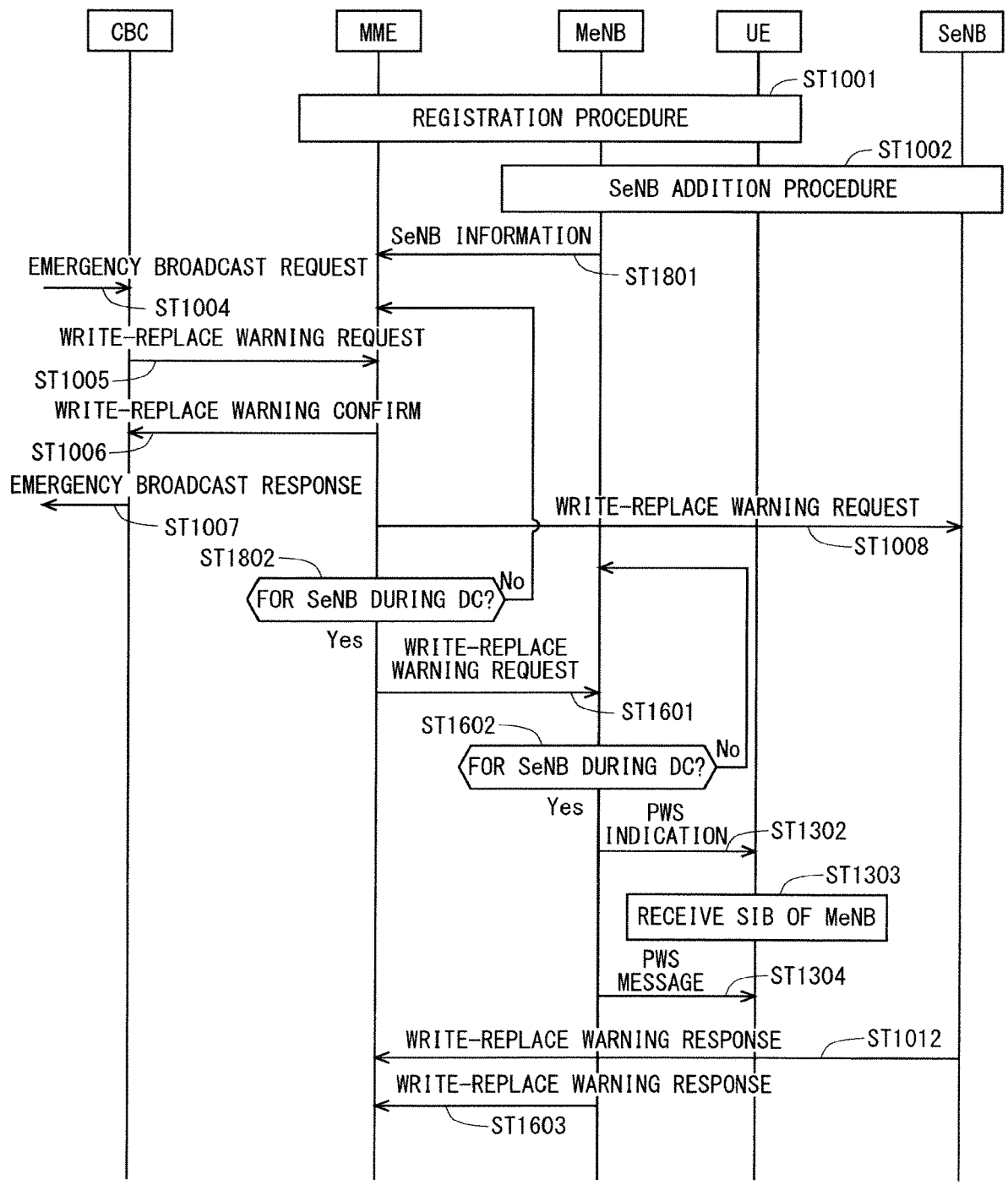
FIG. 18 shows an example of a sequence of a PWS message notification process in a communication system of a third modification of the first embodiment.

FIG. 18 shows an example of the sequence of the PWS message notification process in a communication system of a third modification of the first embodiment. The sequence shown in FIG. 18 is similar to the sequence shown in FIG. 16 described above, and thus, the same steps will be denoted by the same step numbers, and common description will be omitted.

First, the procedure of step ST1001 is performed as in the case shown in FIG. 16 described above. In step ST1002, the MeNB activates the SeNB addition procedure to perform DC to the UE. The SeNB addition procedure is accordingly performed among the MeNB, the UE, and the SeNB. In the SeNB addition procedure, the SeNB notifies the MeNB of the cell ID of its own cell, TAI, or emergency area ID.

In step ST1801, the MeNB notifies the MME of the information about the added SeNB. Alternatively, the MeNB may notify the information about the SCG cell. The information about the SeNB may be the information by which the warning area information can be specified, specifically, the cell ID of the SeNB, TAI, or emergency area ID. The MeNB may notify the identifier of the MeNB performing DC using the SeNB as the information about the SeNB. As a result, the information about the SeNB is the information about the SeNB used in DC by which MeNB can be recognized.

If the DC using the SeNB is DC architecture 1A, the MeNB notifies the MME of a path change of a user plane (U-plane) in the S-GW in the SeNB addition procedure for the execution of DC in step ST1002. The MeNB may use this change notification to notify the information about the added SeNB. For example, the MeNB may include the information about the SeNB in a path change notification message and then notify the MME of the message. Alternatively, the MeNB may notify the MME of another message including the information about the SeNB in the SeNB addition procedure.

The MME that has received the PWS message from the CBC in step ST1005 specifies an eNB that is to be notified of the PWS message, from the tracking area ID list received together with the PWS message.

In step ST1802, the MME uses the specified eNB and the information about the added SeNB, which has been received from the MeNB in step ST1801, to judge whether the eNB is the SeNB during DC. If the specified eNB is the SeNB during DC, the MME judges that the PWS message is for the SeNB during DC. If the specified eNB is not the SeNB during DC, the MME judges that the PWS message is not for the SeNB during DC.

If the PWS message is not for the SeNB during DC, the MME may return to the normal process without performing the PWS message transmission procedure to the MeNB performing DC using the SeNB.

If the PWS message is for the SeNB during DC, the MME uses the information about the added SeNB, which has been received from the MeNB in step ST1801, to specify an eNB to which the MME transmits the PWS message. The eNB is the MeNB herein. The MME may associate the information about the added SeNB, which has been received in step ST1801, and the MeNB, which has notified of the information, with each other to specify an eNB to which the MME transmits the PWS message using the MeNB information associated with the SeNB.

The MME that has specified an eNB to which the MME transmits the PWS message notifies the eNB of the PWS message. The eNB is the MeNB herein. In step ST1601, the MME also notifies the MeNB of the PWS message for the SeNB by the S1-MME interface.

The MME notifies the PWS message, as well as a tracking area ID list, warning area information, and global eNB ID. The "Write-Replace Warning Request" message is used as the message for the notification. Alternatively, the identifier specific to a PWS message may be notified.

In step ST1602, the MeNB that has received the PWS message in step ST1601 uses the warning area information to judge whether the PWS message is for the SeNB used in DC.

If the PWS message is not for the SeNB used in DC, the MeNB returns to the normal process without performing the procedure for transmitting a PWS message to the UE performing DC using the SeNB. If the PWS message is for the SeNB used in DC, the MeNB uses the warning area information to specify a SCG cell to which the MeNB transmits a PWS message.

In step ST1302, the MeNB notifies the UE performing DC using the SeNB of the PWS indication. In steps ST1303 and ST1304, the UE during DC that has received the PWS indication receives the PWS message notified by the MeNB. The method of the first modification of the first embodiment is applicable as the methods of steps ST1303 and ST1304, and thus, description thereof will be omitted here.

If judging in step ST1802 that the PWS message is for the SeNB during DC, the MME may notify the MeNB of the PWS message, as well as the information indicating that the PWS message is for the SeNB during DC. This enables the MeNB to explicitly recognize that the received PWS message is for the SeNB used in DC. The MeNB may use the information in the judgment of step ST1602. This reduces malfunctions.

The PWS message notification process as shown in FIG. 18 above enables the UE performing DC using the SeNB to receive a PWS message for the SeNB.

If the MME does not notify the MeNB of the PWS message for the SeNB, for example, if the MeNB and the SeNB are in different tracking areas, the MeNB can notify the UE during DC of a PWS message for the SeNB.

The UE during DC can receive the PWS message for the SeNB from the MeNB.

Although this modification has disclosed the method of notifying the UE during DC of a PWS indication before a PWS message, another method will be disclosed below.

The PWS indication to the UE during DC is eliminated. In other words, the UE during DC is notified of the PWS message alone.

Figure 19:
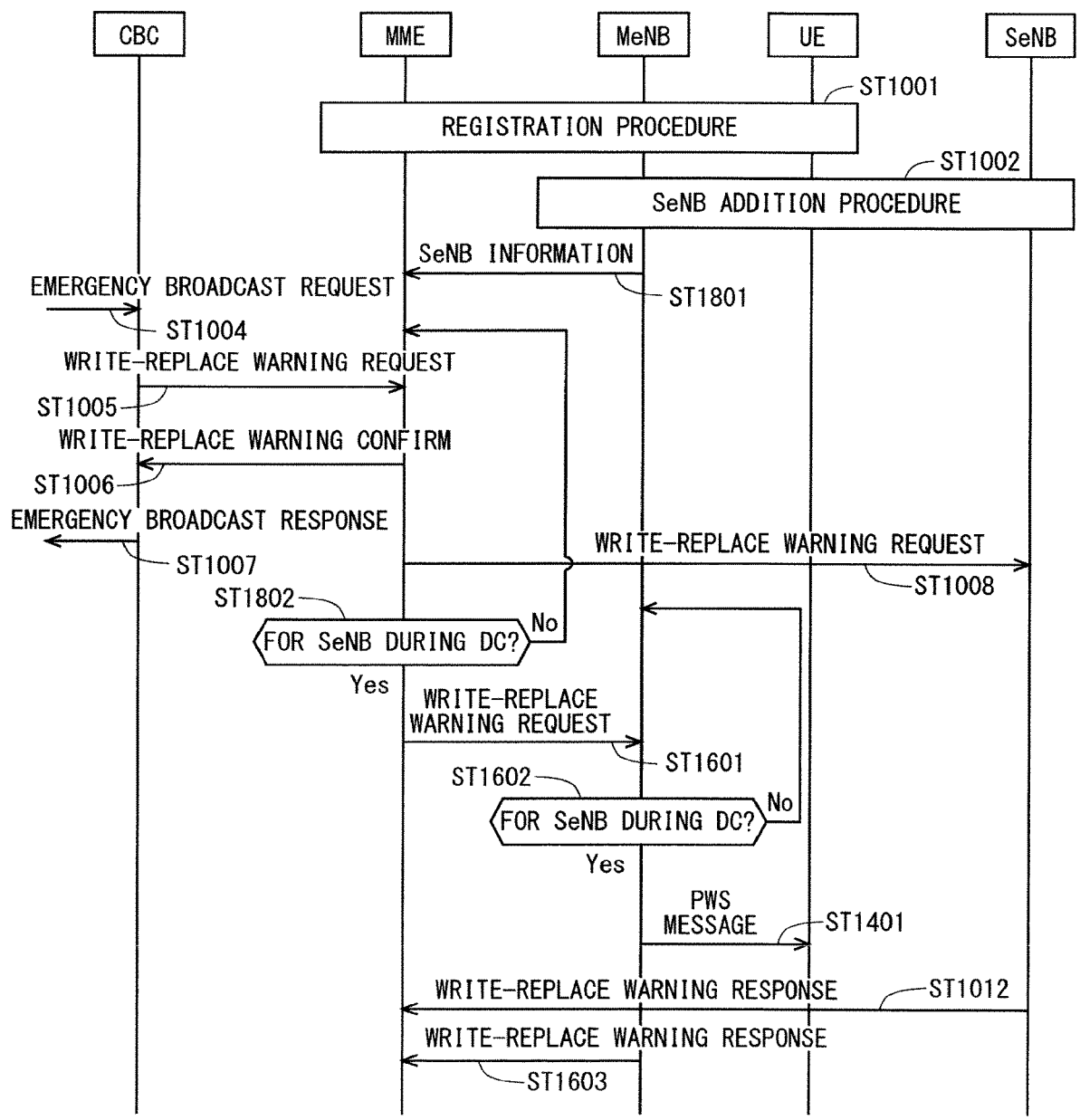
FIG. 19 shows another example of the sequence of the PWS message notification process in the communication system of the third modification of the first embodiment.

FIG. 19 shows another example of the sequence of the PWS message notification process in the communication system of the third modification of the first embodiment. FIG. 19 shows the case where the UE during DC is notified of a PWS message alone. The sequence shown in FIG. 19 is similar to the sequences shown in FIGS. 17 and 18, and thus, the same steps will be denoted by the same step numbers, and common description will be omitted.

In the example shown in FIG. 19, first, the procedures of steps ST1001, ST1002, ST1801, ST1004 to ST1008, ST1802, ST1601, and ST1602 are performed as in the case shown in FIG. 18 described above. Subsequently, the procedures of steps ST1401, ST1012, and ST1613 are performed as in the case shown in FIG. 17 described above.

As a result, the PWS indication transmission and reception procedures are not required also in this modification, thus preventing the process from becoming complicated as a system. Also, signaling for PWS indication is not required, thus reducing a signaling load.

Fourth Modification of First Embodiment

This modification will disclose another method in which the SeNB transmits a PWS message for the SeNB to the UE during DC.

This modification will describe the case where the MME connected to the MeNB differs from the MME connected to the SeNB.

In this case, the SeNB that has received the PWS message from the MME may transmit the PWS message for the SeNB to the UE during DC. The SeNB directly transmits the PWS message for the SeNB to the UE during DC. Alternatively, the SeNB may transmit the PWS message for the SeNB to the UE during DC via the MeNB.

The UE during DC receives a PWS message for the SeNB from the SeNB or the MeNB. The method disclosed in the first embodiment or the first modification of the first embodiment is applicable as the method used in such a case. The same applies to the case where a PWS message is notified to a specific SCG cell or specific SCG cells.

Figure 20:
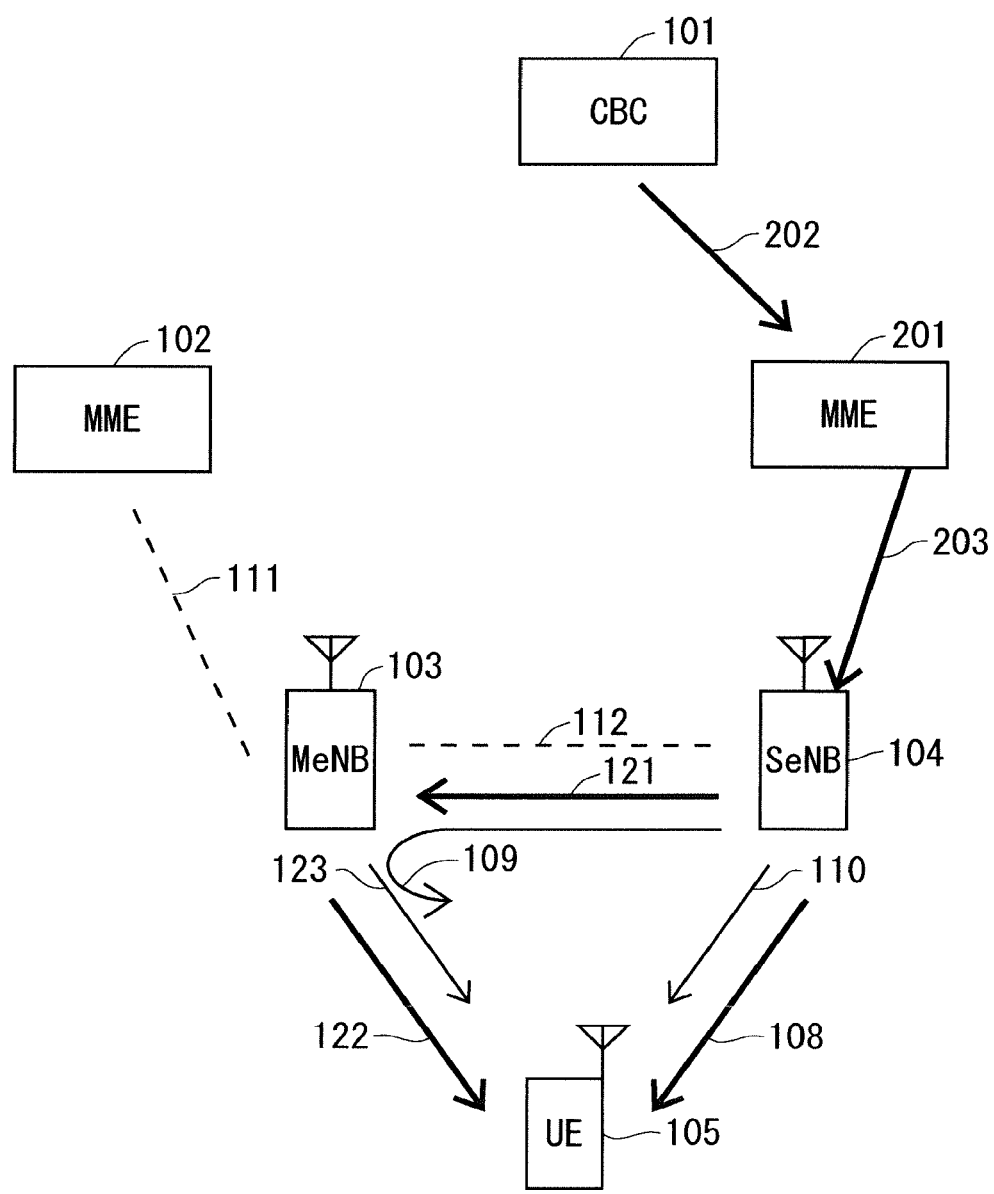
FIG. 20 shows an example flow of a PWS message in a communication system of a fourth modification of the first embodiment.

The PWS message notification method will be described. FIG. 20 shows an example flow of the PWS message in a communication system of a fourth modification of the first embodiment. The configuration shown in FIG. 20 is similar to the configurations shown in FIGS. 9 and 12, and thus, the same portions will be denoted by the same references, and common description will be omitted. With reference to FIG. 20, the flow of the PWS message is indicated by bold arrows 202 and 203 and the bold arrows 121, 122, and 108.

FIG. 20 shows the case where an MME connected to the SeNB 104 (hereinbelow also referred to as "MME for SeNB") 201 differs from the MME 102 connected to the MeNB 103 (hereinbelow also referred to as "MME for MeNB").

The CBC 101 is connected to the MME for SeNB 201. With reference to FIG. 20, the flow of the PWS message from the CBC 101 to the SeNB 104 is indicated by the bold arrows 202 and 203.

The PWS message is notified to the CBC 101 by the CBE (not shown), to the MME for SeNB 201 by the CBC 101, and to the SeNB 104 by the MME for SeNB 201.

When the eNB is used in DC, that is, when the eNB is the SeNB 104, the SeNB 104 notifies the UE 105 performing DC using the SeNB of a PWS message as indicated by the arrow 108. In this case, the PWS indication is also notified to the MeNB 103 and the UE 105 by the SeNB 104 as indicated by the arrows 109 and 110.

The SeNB 104 may notify the UE 105 performing DC using its own cell of a PWS message via the MeNB 103 as indicated by the arrows 121 and 122. In this case, the PWS indication is notified to the MeNB 103 and the UE 105 by the SeNB 104 as indicated by the arrows 110, 109, and 123.

The method disclosed in the first embodiment described above is applicable as the method of notifying of a PWS message and a PWS indication used in the case where the SeNB notifies the UE during DC of the PWS message. This method enables the UE performing DC using the SeNB to receive the PWS message from the SeNB.

The method disclosed in the first modification of the first embodiment described above is applicable as the method of notifying of a PWS message and a PWS indication used in the case where the SeNB notifies the UE during DC of a PWS message for the SeNB via the MeNB. This method enables the UE performing DC using the SeNB to receive the PWS message for the SeNB from the MeNB.

As a result, also when the MME connected to the MeNB differs from the MME connected to the SeNB, the UE performing DC using the SeNB can receive the PWS message for the SeNB.

The method disclosed in the third modification of the first embodiment described above is applicable to the case where the CBC is connected with the MME connected to the MeNB and the MME connected to the SeNB though the MME connected to the MeNB differs from the MME connected to the SeNB.

In this case, the CBC notifies the MME connected with the MeNB of the PWS message. The method disclosed in the third modification of the first embodiment described above is applicable as the method of notifying of a PWS message for the SeNB between the MME that has been notified of the PWS message and the UE during DC.

As a result, the UE performing DC using the SeNB can receive the PWS message for the SeNB.

The method disclosed in the second modification of the first embodiment described above is applicable to the case where the CBC is connected with the MME connected to the MeNB and the MIME connected to the SeNB though the MME connected to the MeNB differs from the MME connected to the SeNB and where the MeNB and the SeNB are located in the same tracking area (TA).

The UE performing DC using the SeNB can thus receive the PWS message for the SeNB. The same applies to the case where the MCG cell and the SCG cell are located in the same TA.

Both the MeNB and the SeNB may notify the UE being served thereby of the same PWS message. In other words, the PWS message for the MeNB is the same as the PWS message for the SeNB in some cases. In such a case, the use of the methods disclosed in this embodiment and the modification thereof enables the UE to receive the PWS message for the MeNB and the PWS message for the SeNB. In other words, the UE receives the same PWS message redundantly.

The UE is configured to receive the same PWS messages redundantly, and can accordingly receive any one of the PWS messages if it fails to receive the other PWS messages. This reduces a probability that the UE will fail to receive a PWS message. A robust system can therefore be constructed as a PWS.

The redundant reception of the same PWS message by the UE may lead to an increase in power consumption. The following three, (1) to (3), will be disclosed as the method for solving this problem.

(1) In the case where the UE is notified of the PWS messages by both the MeNB and the SeNB, the UE judges whether the PWS message notified by the MeNB is the same as the PWS message notified by the SeNB. A message-specific identifier notified together with the PWS message may be used in this judgment. A non-limiting example of the message-specific identifier is a message ID. The UE receives the PWS message notified first. During the reception, the UE records the message ID of the PWS message. The UE compares the message ID of the PWS message notified later with the message ID of the PWS message previously received.

If the message IDs are the same, the UE does not receive the PWS message notified later or may avoid the demodulation of the PWS message notified later. If the message IDs are different, the UE receives the PWS message notified later and records the message ID thereof. The UE repeats the operations above, thus preventing the redundant reception of the same PWS messages. This prevents an increase in the power consumption of the UE. The method (1) above is applicable to the case where the method disclosed in the first embodiment is used.

(2) In the case where the MeNB receives a PWS message from the SeNB, the MeNB may judge whether the PWS message for the MeNB is the same as the PWS message for the SeNB. The PWS indication notification method may be the method (2) or (3) described above.

The judgment method by the MeNB will be disclosed. The MeNB records the message ID of the PWS message for the MeNB and compares the recorded message ID of the PWS message for the MeNB with the message ID notified together with the PWS message received from the SeNB. If the message IDs are the same, the MeNB does not transmit the PWS message received from the SeNB to the UE performing DC using the SeNB. In this case, the MeNB may avoid notifying the UE of the PWS indication as well. If the message IDs are different, the MeNB transmits the PWS message received from the SeNB to the UE performing DC using the SeNB.

As a result, the redundant reception of the same PWS message by the UE can be prevented. This prevents an increase in the power consumption of the UE.

The method (2) above is applicable to the case where the method disclosed in the first modification of the first embodiment is used.

(3) In the case where the MeNB receives the PWS message for the SeNB from the MME, the MeNB judges whether the PWS message for the MeNB is the same as the PWS message for the SeNB.

The judgment method by the MeNB will be disclosed. The MeNB determines whether the PWS message received from the MME is for the SeNB and for the MeNB. In this case, the MeNB may make a judgment using the warning area information notified together with the PWS message by the MME. Specifically, the MeNB judges whether the warning area information includes both the MeNB and the SeNB performing DC with the MeNB as the information about the eNB or the cell to which the MeNB transmits the PWS message.

If the information includes both the MeNB and the SeNB, the MeNB judges that the PWS message for the MeNB is the same as the PWS message for the SeNB and transmits the PWS message only once to the UE performing DC using the SeNB. In this case, the MeNB may also notify the UE of the PWS indication only once. The MeNB may avoid performing the method of notifying of a PWS message for the SeNB. If the information includes neither the MeNB nor the SeNB, the MeNB notifies the UE of the PWS message by the respective PWS message notification methods.

In this manner, the UE can be prevented from redundantly receiving the same PWS message. This prevents an increase in the power consumption of the UE.

The method (3) above is applicable to the case where the method disclosed in the second modification of the first embodiment is used and the case where the method disclosed in the third modification of the first embodiment is used.

In the case where the method disclosed in the fourth modification of the first embodiment is used, the methods disclosed above may be applied as appropriate in accordance with the path for notification of the PWS message. Similar effects can therefore be achieved.

Second Embodiment

A problem to be solved in a second embodiment and a solution to the problem will be described below.

The emergency service such as an emergency call may conceivably require large volumes of data communications, such as map information, in the future. Thus, it is conceivably requested that DC be enabled to an emergency session for emergency service or an emergency bearer for emergency service.

3GPP has pursued the specification standard of the emergency service (see 4.3.12 of Non-Patent Document 13) but has discussed nothing about the introduction of DC to the emergency service.

Thus, when the procedure for performing DC, such as the SeNB addition procedure or the SeNB modification procedure under discussion of 3GPP (see (Non-Patent Document 9), is merely applied to an emergency bearer, DC using the SeNB cannot be performed to the emergency bearer in some cases.

For example, in the execution of DC to a bearer, the MeNB does not notify the SeNB of whether the bearer is an emergency bearer when notifying the SeNB of a SeNB addition request. The SeNB accordingly cannot recognize whether the SeNB addition request from the MeNB is for an emergency bearer.

In some cases, the SeNB rejects a SeNB addition request received from the MeNB, depending on the resource status of the SeNB or the SCG cell. Examples of such a case include the case where the SeNB is overloaded, the case where the SeNB is notified of the overload start procedure by the MME, and the case where the SeNB restricts access of the UE being a DC target such as the case of "not suitable". In such a case, the SeNB rejects a SeNB addition request from the MeNB.

The SeNB that does not recognize that the SeNB addition procedure is to an emergency bearer may reject the SeNB addition procedure depending on the status of the SeNB. The MeNB that has been rejected cannot perform DC to the emergency bearer. In other words, the MeNB cannot perform DC to the UE to which the MeNB provides an emergency service.

This embodiment will disclose the method of enabling DC to an emergency bearer. The solution in the second embodiment will be described below.

In the request for the procedure for performing DC from the MeNB, the SeNB does not reject the request if the request is a request for an emergency bearer. Examples of the request for the procedure for performing DC include a SeNB addition request and a SeNB modification request. When performing DC to the emergency bearer, the MeNB includes the information indicating that these requests are made to an emergency bearer in the SeNB addition request or the SeNB modification request.

FIG. 21 shows an example of the sequence of a DC execution process to an emergency bearer in a communication system of the second embodiment.

Although the MeNB and the SeNB are used when DC has been performed, the eNBs, which will be used in DC later, will be denoted by the MeNB and the SeNB for the sake of brevity.

First, description will be given of the flow of the emergency-bearer-related information in the establishment of an emergency bearer for emergency service.

In step ST2201, the UE that performs an emergency service includes the information indicating that an attach request or a PDN connectivity request is made because of an emergency (hereinbelow also referred to as "emergency information") in the attach request or the PDN connectivity request as a NAS message and notifies the MME of the request. In this embodiment, the UE includes the emergency information in a PDN connectivity request and then notifies the MME of the request.

At that time, the UE includes the emergency information in the RRC connectivity request message regarding an emergency service and notifies the MeNB of the message. For example, the UE includes the emergency information in an RRC connection establishment request message as an RRC connectivity request message and notifies the MeNB of the message.

The MeNB uses the emergency information to judge whether the request is for an emergency service. If the request is for an emergency service, the MeNB accepts the request without access restriction that is performed for a normal bearer.

The MeNB includes the emergency information in an initial NAS message as an S1 message and then notifies the MME of the message. The MME uses the emergency information of the initial NAS message or the emergency information included in the attach request or PDN connectivity request to judge whether such a request is for an emergency service.

If the request is for an emergency service, the MME selects a P-GW for emergency service (emergency P-GW). The MME then derives the address of the emergency P-GW.

In step ST2202, the MME includes the address of the emergency P-GW in a create session request message as an S11 message and then notifies the S-GW of the message. In step ST2203, the S-GW uses the address of the emergency P-GW to notify the emergency P-GW of a create session request as an S5 message.

In step ST2204, the emergency P-GW obtains an allocation and retention priority (ARP) value for emergency service from a policy and charging rules function (PCRF).

The emergency P-GW that has obtained the ARP value for emergency service uses the ARP value to derive QoS-related information for EPS bearer. Examples of the QoS-related information for EPS bearer include QCI, ARP, GBR, and MBR.

In step ST2205, the emergency P-GW includes the QoS-related information for EPS bearer in a create session response message and then notifies the S-GW of the message. In step ST2206, the S-GW includes the QoS-related information for EPS bearer in the create session response message and then notifies the MME of the message. The MME derives E-UTRAN radio access bearer (E-RAB) level QoS information from the received QoS-related information for EPS bearer.

In step ST2207, the MME includes the E-RAB level QoS information and the ARP value in an E-RAB setup request message and notifies the MeNB of the message. The S1 message is used in this notification. The MeNB performs a configuration for the E-RAB provided between the S-GW and the UE via the MeNB, based on the received E-RAB level QoS information.

In step ST2208, the MeNB includes a resource configuration for E-RAB in an RRC connection reconfiguration message based on the received E-RAB level QoS information and notifies the UE of the message.

The MME includes the QoS-related information for EPS bearer except for ARP in an attach response message or a PDN connectivity accept message and notifies the UE of the message. The accept response message or the PDN connectivity accept message may be an activate dedicated EPS bearer context request message.

The UE that has received the resource configuration for E-RAB through the RRC connection reconfiguration message performs a resource configuration for E-RAB, and in step ST2209, notifies the MeNB of an RRC connection reconfiguration complete message.

In step ST2210, the MeNB that has performed the configuration for E-RAB notifies the MME of a bearer setup response message.

The UE that has received the attach response message or the PDN connectivity accept message, which is a NAS message, notifies the MME of the completion of PDN connectivity through a direct transfer message in step ST2211 and a PDN connectivity complete message in step ST2212.

In step ST2213, a path configuration procedure is performed. As a result, an emergency bearer is configured, thus enabling UL/DL data communications to the emergency bearer as indicated by step ST2214.

The conventional method of performing DC will be described before disclosing the method of performing DC in an emergency bearer.

The MeNB that has determined to perform DC to the UE requests resources from the SeNB such that a total of the resource provided to the UE by the MeNB and the resource provided to the UE by the SeNB ensures the E-RAB level QoS requested from the MME.

The MeNB thus may configure a value, which is different from that of the E-RAB level QoS information requested from the MME, to the SeNB. The MeNB includes the E-RAB level QoS information requested for the SeNB in a DC execution request message to the SeNB, for example, SeNB addition request message, and notifies the SeNB of the message (see Non-Patent Document 9).

The SeNB addition request in the execution of DC that is under discussion of 3GPP is as described above.

In this method, however, the SeNB cannot recognize whether the bearer to which the execution of DC is requested by the MeNB is for an emergency service. This is because the MeNB configures a resource request to the SeNB, and accordingly, whether the MeNB includes an ARP value in the DC execution request message is not explicit. This is also because even when a DC execution request message including an APR value is made, the ARP may not have an ARP value for an emergency service.

As described above, the SeNB that does not recognize that the SeNB addition procedure is to an emergency bearer rejects the procedure depending on the status of the SeNB, and accordingly cannot perform DC to the UE to which the SeNB provides an emergency service.

The method for solving such a problem will be disclosed.

The MeNB includes the information indicating that the request is a DC execution request to an emergency bearer in a DC execution request to the SeNB. The SeNB that has received the DC execution request to an emergency bearer does not reject the DC execution request, that is, allows the execution of DC.

An example of the method of performing DC to an emergency bearer will be described with reference to FIG. 21.

As described above, in step ST2214, the UL/DL data communications to the emergency bearer are performed. In step ST2215, the MeNB notifies the SeNB of a DC execution request message to the SeNB, for example, a SeNB addition request message.

In this case, the information indicating that the request is made to the emergency bearer is included in the DC execution request message to the SeNB, for example, the SeNB addition request message, and is notified. The information indicating that the request is made to an emergency bearer may be included in the SeNB addition request message together with the E-RAB level QoS information requested for the SeNB and may be notified. Alternatively, a new message for notifying the information indicating that a DC execution request is made to an emergency bearer may be provided.

The MeNB may also notify the SeNB of the new message in making a DC execution request to an emergency bearer. An X2 interface or an Xn interface may be used in the notification of the information. Alternatively, the information may be an indication or cause information.

The SeNB can accordingly recognize that the request is a DC execution request message to an emergency bearer. The SeNB that has received the information indicating that the request is made to an emergency bearer in step ST2215 uses this information to judge whether the request is a DC execution request to an emergency bearer.

If the request is not a DC execution request to an emergency bearer, the SeNB determines whether to reject or accept the request in accordance with the status of the SeNB or the SCG cell. If the request is a DC execution request to an emergency bearer, the SeNB does not reject the request, that is, accepts the request.

Since FIG. 21 shows the case where a request is a DC execution request to an emergency bearer, the SeNB does not reject but accepts a DC execution request.

In step ST2216, the SeNB notifies the MeNB of DC execution request acknowledge, for example, SeNB addition request acknowledge. In step ST2217, the MeNB configures a radio resource for execution of DC to the UE through an RRC connection reconfiguration message.

In step ST2218, the UE that has configured the radio resource for DC using the SeNB notifies the MeNB of the completion of the configuration through an RRC connection reconfiguration complete message.

In step ST2219, the MeNB notifies the SeNB that the configuration of a radio resource for DC using the SeNB has completed through a SeNB reconfiguration complete message. As a result, in step ST2220, a DC execution process to an emergency bearer is performed among the MeNB, the SeNB, and the UE.

In step ST2215, the MeNB may notify the SeNB of a bearer configuration for emergency bearer in the DC execution request message for an emergency bearer, for example, a SeNB addition request or a SeNB modification request. In other words, the MeNB may request the bearer configuration identical to the bearer configuration configured to itself from the SeNB.

In other words, the MeNB does not configure a value, which differs from a value of the E-RAB level QoS information requested from the MME, to the SeNB to request a resource from the SeNB for an emergency bearer. The MeNB configures the same value to the SeNB.

For example, the MeNB configures the E-RAB level QoS information for an emergency bearer, notified by the MME, to the SeNB and makes a DC execution request. An ARP value may be included as the E-RAB level QoS information for an emergency bearer.

The SeNB can accordingly recognize that the request is a DC execution request to an emergency bearer, and thus, does not reject the DC execution request to the emergency bearer. This eliminates the case where the SeNB rejects a DC execution request depending on the status of the SeNB or the SCG cell. The SeNB can therefore perform DC to the UE to which the SeNB provides an emergency service.

In step ST2215, the MeNB may notify the SeNB of an ARP value indicating that a request is made for an emergency bearer in a DC execution request message for an emergency bearer, for example, a SeNB addition request or a SeNB modification request. The SeNB may recognize an ARP value for an emergency bearer in advance. For example, an ARP value may be determined statically in specifications in advance or may be set by an operator.

In another method, the P-GW may obtain an ARP value for an emergency bearer from the PCRF and notify the SeNB of the ARP value via the MME. In still another method, the MME may obtain an ARP value for an emergency bearer from the P-GW and notify the SeNB of the ARP value. The ARP value may be dedicated to an emergency bearer.

As a result, the SeNB can make a judgment based on an ARP value without the use of the information indicating that the request is made to an emergency bearer. This eliminates the need for the MeNB to notify the SeNB of the information, thus reducing an information amount between X2's or Xn's.

First Modification of Second Embodiment

The SeNB does not allow the establishment of an emergency bearer in some cases, for example, the case where a local regulation or an operator's policy does not permit the establishment of an emergency bearer. In such a case, even when the MeNB shows the SeNB that the execution of DC is requested to an emergency bearer, the SeNB cannot accept the request.

The method disclosed in the second embodiment may prevent the SeNB from rejecting a request even in such a case.

This modification will disclose the method of solving this problem.

When the SeNB does not allow the establishment of an emergency bearer, the SeNB rejects a DC execution request from the MeNB, for example, a SeNB addition request or a SeNB modification request if the request is for an emergency bearer. The SeNB may notify the MeNB of a reject message. The message may include reject cause information. The information indicating that the establishment of an emergency bearer is not allowed may be provided as the reject cause information. If the SeNB does not allow the establishment of an emergency bearer, the SeNB may include the information indicating that the establishment of an emergency bearer is not allowed in a reject message and notify the MeNB of the message when rejecting a DC execution request to the emergency bearer from the MeNB. The MeNB that has received the information indicating that the establishment of an emergency bearer is not allowed does not perform DC to the UE using the SeNB.

The MeNB that has received the reject message can judge whether to perform DC using another SeNB. For the MeNB that has received the reject message to perform DC using another SeNB, the MeNB that has received the reject message may prohibit a DC execution request to the SeNB that has been notified of the reject message for a predetermined period. This eliminates the need for unnecessary notification of a DC execution request message, thus reducing a signaling amount.

A predetermined period may be determined statically in advance, for example, may be determined in specifications. Statically determining a predetermined period can facilitate the process. Alternatively, the SeNB may include a predetermined period in a reject message and notify the MeNB of the message. In this case, the SeNB can set a predetermined period flexibly in accordance with its status. As a result, the communication system can be operated flexibly. The method described above is applicable to any reject message in addition to a reject message that is provided because the establishment of an emergency bearer is not allowed.

Another method of solving the problem described in this modification will be disclosed.

Also in the case where the SeNB does not allow the establishment of an emergency bearer, the SeNB notifies the MeNB of a DC execution request acknowledge message once. The information indicating that the establishment of an emergency bearer is not allowed is included in the DC execution request acknowledge message. When receiving the information indicating that the establishment of an emergency bearer is not allowed from the SeNB, the MeNB notifies the SeNB of a DC execution release message, for example, a SeNB release message. The MeNB does not notify the UE of an RRC connection reconfiguration message. The MeNB accordingly does not use the SeNB in DC for an emergency bearer. Not only the method disclosed in the second embodiment but also this method is applicable to the conventional case where the SeNB cannot recognize whether a bearer for which the execution of DC is requested from the MeNB is for an emergency service.

Another method of solving the problem described in this modification will be disclosed.

The SeNB may notify in advance a neighboring eNB of the information indicating that its own cell does not allow the establishment of an emergency bearer. The neighboring eNB may be an eNB that is possibly subjected to DC. The SeNB may notify a neighboring eNB of the information via the MME. The MeNB uses this information to judge whether to perform DC of an emergency bearer to the SeNB. In the case where the SeNB does not allow the establishment of an emergency bearer, the MeNB does not perform DC to an emergency bearer using the SeNB. Not only the method disclosed in the second embodiment but also this method is applicable to the conventional case where the SeNB cannot recognize whether a bearer for which the execution of DC is requested from the MeNB is for an emergency service.

In the case where the MME has recognized that the SeNB does not allow the establishment of an emergency bearer, the MME may notify in advance the MeNB that possibly performs DC with the SeNB of the identifier of the SeNB and the information indicating that the SeNB does not allow the configuration of an emergency bearer. The MeNB accordingly uses this information to judge whether to perform DC of an emergency bearer to the SeNB. In the case where the SeNB does not allow the establishment of an emergency bearer, the MeNB does not perform DC to an emergency bearer using the SeNB.

These methods can prevent the SeNB from allocating a resource for an emergency bearer in the case where the SeNB does not allow the establishment of an emergency bearer. A system reflecting a local regulation and an operator's policy can be constructed.

Second Modification of Second Embodiment

An attempt to cause an emergency bearer to support DC requires additional procedures described in the second embodiment and the first modification of the second embodiment, thus increasing the complexity of the process as a system. The complicated procedure will reduce the stability of the system.

This modification will disclose the method for constructing a stable system.

DC is not performed to an emergency bearer. The eNB judges whether the bearer to which the eNB should perform DC is an emergency bearer in judging whether to perform DC. If a relevant bearer is an emergency bearer, the eNB does not perform DC, that is, does not activate the DC execution process. If a relevant bearer is not an emergency bearer, the eNB performs DC, that is, enables the DC execution process.

DC is not performed to an emergency bearer as described above, thus enabling the construction of a stable system.

For an emergency bearer, whether to support DC may be appropriately determined in accordance with the status of a communication system.

For example, it may be more preferable to construct a stable system than to support DC for an emergency bearer in a place with a low demand for high throughput (a place not congested). Thus, DC can be performed to an emergency bearer in a place with a high demand for high throughput, and DC is not performed to an emergency bearer in a place with a low demand for high throughput. The eNB may make a judgment based on a threshold provided in the demand for throughput. The threshold may be determined statically in advance in, for example, specifications, or may be notified to the eNB by the MME.

As a result, the execution of DC to an emergency bearer can be changed in accordance with the status of the communication system, thus enabling a flexible operation according to the status of the communication system.

For an emergency bearer, whether to support DC may be appropriately determined in accordance with the power consumption of the UE.

For example, upon execution of DC based on architecture 3C, the UE needs to communicate with both the MeNB and the SeNB, leading to an increase in the power consumption of the UE. It is preferred to avoid a situation in which an emergency service will be interrupted due to UE's battery exhaustion. The power consumption of the UE needs to be reduced as much as possible in accordance with a situation. Thus, DC can be performed to an emergency bearer if the UE is at a high remaining battery level, and DC is not performed to an emergency bearer if the UE is at a low remaining battery level.

The UE transmits remaining battery level information to the eNB. The eNB may receive the UE's remaining battery level information and use the remaining battery level information to judge whether to cause the UE to perform DC to the emergency bearer.

The eNB may notify the UE of a remaining battery level information request message to obtain the remaining battery level information from the UE. The eNB may notify the UE through an RRC message or a UE-dedicated message. For example, the eNB may include the information for requesting the remaining battery level information in a UE information request message and notify the UE of the message. In the case where the UE information request message includes the information for requesting the remaining battery level information, the UE that has received the UE information request message notifies the eNB of a UE information response message including the remaining battery level information.

As a result, the eNB can receive the remaining battery level information from the UE, and the eNB can judge whether to support DC for the emergency bearer in accordance with the power consumption of the UE. For an emergency bearer, whether to support DC can be appropriately determined in accordance with the power consumption of the UE.

Turning a small cell on or off is discussed to reduce the power consumption of the small cell or reduce interference in the operation of a large number of small cells. In the procedure for turning on a small cell for use in an emergency bearer, the small cell may be configured not to reject the procedure for turning on the small cell. In the case where a small cell is used in the emergency bearer, the small cell may be configured to reject the procedure for turning off the small cell. The methods disclosed in this embodiment and the modifications thereof are applicable as appropriate as the method used in such a case. For example, the information indicating that a message for requesting turning on a small cell is for an emergency bearer is included in this message.

Third Embodiment

A problem to be solved in a third embodiment and a solution to the problem will be described below.

In the current specifications, the UE is allowed to request a modification of bearer resources (allocation or release of resources) from the configured bearer (see 5.4.5 of Non-Patent Document 13). The UE requests a bearer modification for the P-GW via the MME. The P-GW can configure EPS bearer QoS-related information, and accordingly, the P-GW that has received a bearer modification request from the UE modifies the EPS bearer QoS-related information, for example, QCI, GBR, MBR, or ARP.

The MME performs a bearer configuration to the eNB, that is, makes an E-RAB setup request based on the EPS bearer QoS-related information notified by the P-GW via the S-GW. The MME configures an E-RAB level QoS parameter. When the P-GW modifies a bearer configuration, the MME accordingly modifies the bearer configuration to the eNB.

In the case where DC is not performed to a bearer, the bearer is established using one eNB. The configuration of the bearer thus can be modified in response to a bearer resource modification request from the UE in the conventional specifications.

In the case where DC is performed to a bearer, the configuration of the bearer cannot be modified in response to a bearer resource modification request from the UE in the conventional specifications. The E-RAB configuration cannot be modified in the MeNB or the SeNB.

In the discussion about DC in 3GPP, it is discussed that the MeNB derives a bearer configuration requested for a SeNB, from the bearer configuration requested from the MME in the DC execution process. In the DC execution process, the MeNB requests a resource from the SeNB such that a total of a resource provided by the MeNB and a resource provided by the SeNB ensures the E-RAB level QoS requested from the MME or is not lower than the E-RAB level QoS.

The MeNB thus needs to set a value different from that of the E-RAB level QoS information requested from the MME to the SeNB in some cases. The MeNB includes the E-RAB level QoS information requested for the SeNB in a DC execution request message to the SeNB, for example, a SeNB addition request message and notifies the SeNB of the message. In this manner, the MeNB configures a bear to the SeNB.

The mechanism in which the UE requests a modification for the bearer configuration of the SeNB, which is performed by the MeNB in DC, is not provided in a bearer resource modification request from the UE to the P-GW in the conventional specifications. A request for modifying the bearer configuration of the SeNB, or a request for modifying the configuration for allocation of bearers to the MeNB and the SeNB cannot be made.

This embodiment will disclose the method for solving such a problem.

At least one of the bearers of the MeNB and the SeNB (hereinbelow also referred to as a "DC bearer") can be modified in response to the activation of the UE. The UE-activated DC bearer modification process may be provided. The message for the UE-activated DC bearer modification request may be provided.

The UE-activated DC bearer modification process will be disclosed. The UE makes a DC bearer modification request to the MeNB. The UE notifies the MeNB of a DC bearer modification request message.

The following eleven, (1) to (11), will be disclosed as examples of the information included in the DC bearer modification request message.

(1) Information indicating a DC bearer modification request message.
(2) Identifier for specifying a bearer, for example, EPS bearer identifier, EPS bearer ID, E-RAB identifier, or E-RAB ID.
(3) Information indicating that a predetermined QoS cannot be retained.
(4) E-RAB level QoS information requested, for example, QCI or GBR.
(5) Information indicating a request for improving the QoS of a SeNB, for example, information indicating a request for improving the E-RAB level QoS.
(6) Information indicating a request for improving the QoS of a MeNB, for example, information indicating a request for improving the E-RAB level QoS.
(7) Information indicating a request for modifying a packet flow ratio between a MeNB and a SeNB, for example, information indicating a request for increasing a ratio of the MeNB or information indicating a request for improving a ratio of the SeNB.
(8) SeNB identifier or SCG cell identifier.
(9) UE identifier.
(10) UE aggregate maximum bit rate (AMBR).
(11) Combination of (1) to (10) above.

The MeNB that has received a DC bearer modification request message from the UE uses the information included in the message to modify the bearer configuration of the SeNB or the configuration for allocation of bearers to the MeNB and the SeNB. In this case, the MeNB may make a modification such that a total of the resource provided by the MeNB and the resource provided by the SeNB ensures the E-RAB level QoS requested from the MME or is not lower than the E-RAB level QoS.

The MeNB activates the SeNB modification procedure to perform the modified bearer configuration to the SeNB. The MeNB may include the E-RAB level QoS information requested for the SeNB in a message and notify the SeNB of the message.

The MeNB may judge not to perform a bearer configuration to the SeNB. In other words, the MeNB may judge to release the bearer configuration to the SeNB. This increases modification alternatives. The MeNB may activate the SeNB release procedure.

The MeNB may modify a packet flow ratio between a MeNB and a SeNB without modifying a DC bearer. This increases modification alternatives. For example, the MeNB may make such a modification in the case of receiving the information indicating a request for modifying a packet flow ratio between a MeNB and a SeNB from the UE. This eliminates the need for performing the process for modifying the bearer configuration of at least any one of the MeNB and the SeNB, resulting in a simplified procedure.

FIG. 22 shows an example of the sequence of the UE-activated DC bearer modification process in a communication system of the third embodiment.

In step ST2301, the SeNB addition procedure is performed among the UE, the MeNB, and the SeNB, so that DC using the MeNB and the SeNB is performed to the UE (see Non-Patent Document 9). In the case of DC architecture 1A, the SeNB addition procedure is performed among the UE, the MeNB, the SeNB, the MME, and the S-GW, so that DC using the MeNB and the SeNB is performed to the UE.

In this case, the MeNB performs the bearer configuration of the SeNB or the configuration for allocation of bearers to the MeNB and the SeNB as described above.

In step ST2302, the UE judges whether to request a bearer modification. The UE may judge whether a desired QoS has been obtained for the bearer. Alternatively, the UE may judge whether the QoS for the bearer of the MeNB or the QoS for the bearer of the SeNB has been obtained.

The UE that has judged that a bearer modification does not need to be requested continuously performs DC currently performed.

In step ST2303, the UE that has judged to request a bearer modification notifies the MeNB of a DC bearer modification request. The UE may notify the MeNB of a request through a message provided for the DC bearer modification request. This request may be notified through an RRC message or UE-dedicated signaling. The UE may include the information described above in the DC bearer modification request message.

In step ST2304, the MeNB that has received the message for the DC bearer modification request in step ST2303 uses the information included in the message to modify the resource configuration of the SeNB. The bearer configuration or the configuration for allocation of bearers to the MeNB and the SeNB is modified as the modification of the resource configuration of the SeNB. The E-RAB level QoS information may be configured as the bearer configuration. In this case, the MeNB makes a modification such that a total of the resource provided by the MeNB and the resource provided by the SeNB ensures the E-RAB level QoS requested from the MME or is not lower than the E-RAB level QoS.

In step ST2305, the MeNB activates the SeNB modification procedure for performing the modified bearer configuration to the SeNB. The MeNB may include the E-RAB level QoS information requested for the SeNB in a message and then notify the SeNB of the message. As a result, the SeNB modification procedure is performed among the UE, the MeNB, and the SeNB. In the case of DC architecture 1A, the SeNB modification procedure is performed among the UE, the MeNB, the SeNB, the MME, and the S-GW. The resource configuration of the SeNB is modified through the SeNB modification procedure.

As a result, the UE can make a DC bearer resource modification request.

In the case where a DC bearer modification is not performed, the MeNB notifies the UE of a reject message.

A non-limiting example of the case where a DC bearer modification is not performed is the case where the MeNB makes a judgment. For example, when receiving a DC bearer modification request message from the UE, the MeNB judges that the request from the UE indicated by the information included in the message cannot be satisfied by modifying the resource configuration of the SeNB.

The MeNB may notify the UE of a reject message in response to the DC bearer modification request in such a case.

When receiving a modification reject message from the SeNB in the MeNB-activated SeNB modification procedure, the MeNB may judge that the DC bearer modification request from the UE cannot be satisfied and notify the UE of a reject message in response to the DC bearer modification request.

Notifying the UE of a reject message in this manner enables the UE to recognize that a DC bearer modification will not be performed. The UE can use the reject message to judge the execution of another bearer modification means, for example, a conventional UE-activated EPS bearer modification request.

The reject message may include cause information. The following nine, (1) to (9), will be disclosed as examples of the cause information.

(1) A UE-activated DC bearer modification is not supported.
(2) A total of resources of a MeNB and a SeNB is insufficient.
(3) The resource of a MeNB is insufficient.
(4) The resource of a SeNB is insufficient.
(5) The requested EPS level QoS is not accepted.
(6) The EPS bearer identifier is invalid.
(7) The E-RAB identifier is invalid.
(8) A QCI value is not supported.
(9) A SeNB modification request is rejected, in which case the reject cause information may be included.

The UE that has received the reject message may prohibit the execution of a DC bearer modification request for a predetermined period.

This eliminates the need for unnecessary notification of a DC bearer modification request message, thus reducing a signaling amount.

The predetermined period may be determined statically in advance, for example, determined in specifications. Determining a predetermined period in advance can facilitate the procedure.

Alternatively, the MeNB may include a predetermined period in a reject message and notify the UE of the message. In this case, the MeNB can set a predetermined period flexibly in accordance with a situation. The communication system can thus be operated flexibly.

It has been disclosed that when receiving a SeNB modification reject message from the SeNB, the MeNB may judge that the DC bearer modification request from the UE cannot be satisfied and notify the UE of a reject message in response to the DC bearer modification request.

In another method, when receiving a SeNB modification reject message from the SeNB, the MeNB may judge that a DC bearer modification request from the UE cannot be satisfied and activate the change of the SeNB to be used in DC. In the presence of another SeNB capable of DC to the UE, the MeNB may activate the process for changing the current SeNB to the other SeNB. The DC bearer modification request from the UE can thus be satisfied.

First Modification of Third Embodiment

This modification will disclose another method for solving the problem in the third embodiment.

The UE makes a DC bearer modification request to the MeNB via the MME. The UE notifies the MME of a DC bearer modification request message.

The information disclosed in the third embodiment is applicable as the information included in the DC bearer modification request. Other examples of such information will be described below.

(1) The identifier of a MeNB performing DC, which may be the identifier of a PCell. The identifier of a MeNB performing DC. Or, the information may be the identifier of a PCell. This information is applicable in combination with the information disclosed in the third embodiment.

For example, the MME does not need to recognize that DC is being performed in DC architecture 3C. In such a case, the MME thus cannot perform a procedure corresponding to a DC bearer modification request message even when receiving the message from the UE.

The MME that has received the DC bearer modification request message from the UE can use the information (1) disclosed above to recognize the MeNB performing the DC.

The MME that has received the DC bearer modification request message from the UE notifies the MeNB performing DC of the DC bearer modification request message. The information disclosed in the third embodiment is applicable as the information included in the DC bearer modification request message.

The MeNB that has received the DC bearer modification request message from the MME uses the information included in the message to, for example, modify the bearer configuration of the SeNB or the configuration for allocation of bearers to the MeNB and the SeNB. The methods disclosed in the third embodiment are applicable to these procedures.

FIG. 23 shows another example of the sequence of the UE-activated DC bearer modification process in the communication system of the third embodiment. The same steps as those of FIG. 22 will be denoted by the same step numbers, and description thereof will be omitted.

In step ST2401, the UE that has judged to request a bearer modification in step ST2302 notifies the MME of a DC bearer modification request. The UE may provide a message for the DC bearer modification request and notify the message. The request may be made through a NAS message. The UE may notify the MME via the MeNB. The UE may notify the MeNB through an RRC message, and the MeNB may notify the MME through the S1 message.

UE-dedicated signaling may be used. The UE may include the information described above in the DC bearer modification request message.

The MME that has received the message for DC bearer modification request in step ST2401 uses the information included in the message to recognize, for example, that the request is a DC bearer modification request, and a MeNB that performs the DC.

In step ST2402, the MIME notifies the MeNB that is to perform DC of the DC bearer modification request message. This request may be made through an S1 message or through UE-dedicated signaling. The MME may include the information disclosed in the third embodiment in the DC bearer modification request message.

The MeNB accordingly receives the DC bearer modification request message from the UE.

The process after the MeNB has received the DC bearer modification request message in step ST2402 is similar to that of the third embodiment, and accordingly, description thereof will be omitted.

The UE can thus request a DC bearer resource modification as in the third embodiment.

The message for a DC bearer modification request notified to the MME by the UE may be a UE-activated request bearer resource modification message notified to the MME by the UE in the conventional specifications.

In this case, the message may include the information indicating that the message is notified for a DC bearer modification request and the identifier information about a MeNB performing the DC, for differentiation from the conventional information. The message may include the information disclosed in the third embodiment and the information disclosed above.

The MME may use the information above to judge whether to make a bearer resource modification request to the P-GW, which is the procedure in the conventional specifications, or make a DC bearer modification request to the MeNB. For example, the MME may make a DC bearer modification request to the MeNB in the case of the DC bearer modification request or make a bearer resource modification request to the P-GW in other cases.

This eliminates the need for newly providing a message from the UE to the MME, thus preventing the message procedure from becoming complicated.

In notifying the UE of a reject message, the MeNB may notify the UE via the MME. In this case, the reject message may include the information disclosed in the third embodiment, as well as the information indicating that the message is provided to reject the DC bearer modification request, and the identifier of the UE that has made the DC bearer modification request. The MME can notify the UE of the reject message.

Although the second embodiment has disclosed the method of making DC applicable to an emergency bearer, a DC bearer may not be modified in the case of an emergency bearer.

For example, the UE may avoid requesting a DC bearer modification for an emergency bearer.

In another example, the MeNB may reject a DC bearer change request to an emergency bearer even when receiving the request from the UE. The information indicating that the rejection is for an emergency bearer may be provided as the cause information and included in a reject message.

Fourth Embodiment

A problem to be solved in a fourth embodiment and a solution to the problem will be described below.

The current 3GPP specifications include functionalities regarding the UE location information. A non-limiting example of such functionalities is immediate minimization of drive test (MDT) functionality in MDT (see 3GPP TS37.320 V12.0.0, which will be hereinbelow referred to as "Non-Patent Document 15" as well). The immediate MDT is applicable to the UE in RRC_Connected. The immediate MDT is performed through the RRC measurement procedure. In the measurement configuration, whether location information is included in a measurement report is configured for the UE. When such a configuration is performed, the UE includes location information in a measurement report and notifies the eNB of the report.

Upon notification of another configuration message (OtherConfig) including predetermined information (obtain Location) by the eNB, the UE includes detailed location information based on a global navigation satellite system (GNSS) in the location information and notifies the information when transmitting a measurement report.

The UE measures the detailed location information with a highly accurate GNSS. Due to the use of the GNSS, however, the UE cannot measure the information in the indoor environment, for example, in an underground mall or an underground garage. In such a case, another piece of highly accurate location information is thus required.

This embodiment will disclose the method of solving such a problem.

In the case where location information is configured to be included in a measurement report in the measurement configuration, the UE performing DC includes a SeNB identifier in the measurement report as the location information and notifies the MeNB of the information. A global eNB identifier (ID) may be configured as the SeNB identifier. Alternatively, the UE may include the SCG cell identifier as the location information and notify the MeNB of the information. The UE may configure a CGI or PCI as the cell identifier.

The following five, (1) to (5), will be disclosed as specific examples of the SCG cell.
(1) All SCG cells configured for DC.
(2) A SPCell.
(3) A SCG cell with the best reception quality (which may be reception power).
(4) A SCG cell with the smallest path loss.
(5) A cell of the smallest cell size.

The MeNB can accordingly recognize the location of the UE with an accuracy corresponding to the coverage size of the SCG cell. It has been described above that the coverage size of the SCG cell is relatively small. It is conceivable that a SCG cell having a particularly small coverage size will be operated in the indoor environment. Highly accurate location information is thus obtained.

Although the MeNB is notified, an eNB having an RRC functionality may be notified in DC.

Another method will be disclosed.

Information indicating a report of the identifier on a SeNB or a SCG cell is newly provided. The eNB may notify the UE of the information through an RRC message. The information may be included in another configuration message (OtherConfig) and notified. When being notified of the information indicating a report on the identifier of the SeNB or the SCG cell through the other configuration message, the UE performing DC may include the identifier of the SeNB or the SCG cell in the measurement report and notify the MeNB of the report. Newly providing the information enables the eNB to explicitly request a report on the identifier of the SeNB or the SCG cell. This method enables the eNB to obtain the UE location information flexibly as appropriate.

Alternatively, the existing information may be used. When being notified of predetermined information (obtain Location) through another configuration message, the UE performing DC may include the identifier of the SeNB or the SCG cell in a measurement report and notify the MeNB of the report.

In the use of the existing information, the UE may include the identifier of the SeNB or the SCG cell in a measurement report and notify the MeNB of the report in the case where the GNSS is unavailable to the UE.

The use of the existing information eliminates the need for providing new information, thus preventing the process from becoming complicated as a system.

Another RRC message, not the measurement report, may be used to include the identifier of the SeNB or the SCG cell therein and notify the MeNB. An RRC message for notification of the information may be newly provided. The use of a message different from the measurement report enables the eNB to obtain the UE location information more flexibly.

The use of the method disclosed in this embodiment enables the eNB to obtain detailed location information about the UE. The eNB can recognize in the coverage of which SeNB or which SCG cell the UE is located.

The method disclosed in this embodiment is applicable to the case where a radio link failure (RLF) or a handover failure (HOF) has occurred.

When the UE performing DC has an RLF or a HOF, the UE may include the identifier of the SeNB or the SCG cell in the RLF report message as the location information.

When receiving the message including the RLF report request from the eNB, the UE may notify the eNB of an RLF report message including the location information.

For example, the message including an RLF report request may be a UE information request message. The eNB configures RLF report request information in a UE information request message and notifies the UE of the message. The UE that has received the RLF report request information includes the location information including the identifier of the SeNB or the SCG cell in a UE information response message and notifies the eNB of the message.

The eNB can accordingly obtain the detailed location information about a UE in which an RLF or a HOF has occurred.

The current 3GPP specifications include other functionalities regarding the UE location information. Examples of such functionalities include UE positioning (see 3GPP TS36.305), LTE positioning protocol (LPP, see 3GPP TS36.355), and location service (LCS, see 3GPP TS23.271). In these functionalities, the identifier of the SeNB or the SCG cell may be used as the UE location information. The identifier of the SeNB or the SCG cell connected to the UE during DC is used as the UE location for derivation.

The UE performing DC using the SeNB is located within the coverage of the SeNB. When up to the SCG cell is specified further, the UE performing DC using the SCG cell is located within the coverage of the SCG cell. Thus, the use of the identifier of the SeNB or the SCG cell connected to the UE during DC enables the location of the UE to be derived. As described above, the coverage size of the SCG cell is relatively small. Thus, highly accurate UE location information is obtained.

For example, an enhanced cell ID (E-CID) mechanism is used in these functionalities. This mechanism uses the information about the serving eNB or cell for the UE to obtain the location of the UE. Thus, the UE during DC has conventionally used the information about the MeNB or PCell.

In a new method, the UE during DC uses the information about the SeNB or the SCG cell connected to the UE during the DC to obtain the location of the UE. The information about the SeNB or the SCG cell may be the eNB identifier or the cell identifier. The information about the transmission or reception time between the UE and the SeNB or the SCG cell may be used. For example, a time difference between the transmission and reception of the UE (UE Tx-Rx time difference) may be used. As a result, the UE location information whose accuracy is higher than the accuracy of the conventional E-CID method using a MeNB is obtained.

First Modification of Fourth Embodiment

A problem to be solved in a first modification of the fourth embodiment and a solution to the problem will be described below.

The current 3GPP specifications include functionalities regarding the mobility state of the UE. Examples of the functionalities include speed dependent scaling of measurement related parameters (see 3GPP TS36.331 V12.1.0, which will be hereinbelow referred to as "Non-Patent Document 16" as well).

The eNB configures parameters of the mobility state indicating the moving speed of the UE to the UE through the measurement configuration. Examples of the parameters include a measurement period, a threshold of the number of HOs, and a scaling factor. The UE that has received the measurement configuration detects the number of HOs within a measurement period. The UE uses the detected number of HOs and the threshold of the number of HOs to derive the mobility state of the UE. The mobility state is classified as "high", "medium", or the other (hereinbelow also referred to as "normal"). The UE that has derived the mobility state of the UE derives a scaling factor corresponding to the mobility state, multiplies the value of a measurement-related parameter by the scaling factor, and configures a resultant value. A non-liming example of the measurement-related parameter is a time to trigger (TTT).

In the conventional specifications, the UE detects the number of HOs to derive the mobility state of the UE as described above.

The UE performing DC changes the MeNB through HO but does not change the SeNB through HO. The mobility state of the UE performing DC is accordingly judged using the MeNB. For example, in the case where the UE performing DC moves within the MeNB, the mobility state is set to "normal".

The small cell, however, has a relatively small coverage. The UE thus moves between SeNBs or between SCG cells in a short period. In such a case, the mobility state of the UE is no longer substantially "normal".

The measurement of the SCG cell is used for the MeNB to judge the configuration of the SeNB or the SCG cell to be used in DC. It is not sufficient to use the mobility state of the UE, which is judged based on the number of HOs of the MeNB, in the configuration of a measurement-related parameter of the SCG cell. The measurement of the SCG cell requires the configuration of a more accurate measurement-related parameter, that is, a measurement-related parameter suitable for the coverage of the small cell. Such a configuration requires the acquisition of a more accurate mobility state of the UE.

This modification will disclose the method of obtaining a more accurate mobility state of the UE.

The number of changes of the SeNB is used to derive the mobility state of the UE performing DC. The UE performing DC detects the number of changes of the SeNB. The UE may record the detected number of changes of the SeNB.

The MeNB instructs the UE to count the number of changes of the SeNB when performing the procedure for adding a SeNB to be used in DC. Notification may be made through RRC signaling or dedicated signaling.

The information that instructs the detection of the number of changes of a SeNB may be included in an RRC message and notified. For example, the MeNB may include the information in an RRC connection reconfiguration message and notify the UE of the message. The information may be included in a "Radio Resource Configuration Dedicated" message and notified. In another example, the MeNB may include the information in a measurement configuration and notify the UE of the configuration. The information may be included in a measurement report configuration and notified. The measurement configuration may be the measurement configuration of the SeNB or the SCG cell to be used in DC.

In another example, the MeNB may notify the UE of the information when performing an RRC connection reconfiguration regarding the SeNB. For example, the MeNB may notify the UE of the information in the SeNB addition procedure. In another example, the MeNB may notify the UE of the information in the SeNB change procedure or the SeNB modification procedure. In still another example, the MeNB may notify the UE of the information when changing a SPCell.

These notification methods may be used in combination, thus enabling a flexible operation as a system.

The UE that has received an instruction to detect the number of changes of a SeNB detects the number of changes of a SeNB and uses the detection result to derive the mobility state of the UE.

A specific example of the method of deriving the mobility state of a UE will be disclosed. The MeNB instructs the detection of the number of changes of a SeNB and also configures a parameter of the mobility state indicating the moving speed of the UE. This parameter is a parameter related to the SeNB. Examples of the parameter include a measurement period, a threshold of the number of changes of a SeNB, and a scaling factor.

The UE that has received the parameter configuration detects the number of changes of a SeNB within the measurement period. The UE uses the detected number of changes of a SeNB and the threshold of the number of changes of a SeNB to derive the mobility state of the UE. The mobility state is classified as "high", "medium", or the other (hereinbelow referred to as "normal").

As a result, the UE can derive the mobility state of the UE.

The UE that has derived the mobility state of the UE derives a scaling factor corresponding to the mobility state and multiplies a measurement-related parameter by the scaling factor. A non-limiting example of the measurement-related parameter is a TTT.

The measurement-related parameter multiplied by the scaling factor derived using the number of changes of a SeNB, which has been detected by the UE, is used to measure the SeNB or the SCG cell.

As a result, the UE can detect the number of changes of a SeNB and use the detection result to derive a more accurate mobility state of the UE.

The use of the mobility state to measure the SCG cell enables the UE to configure a more accurate measurement-related parameter, that is, a measurement-related parameter suitable for the coverage of a small cell.

The use of the method disclosed in this modification enables the UE to configure a more accurate measurement-related parameter, that is, a measurement-related parameter suitable for the coverage of a small cell. The MeNB can obtain a more accurate measurement result of the SCG cell from the UE. The MeNB can thus judge the configuration of a SeNB or a SCG cell to be used in DC more accurately in accordance with the mobility state of the UE.

As a result, the throughput of the UE can be improved, and also, the communication capacity can be improved as a system.

In the method above, the MeNB includes the information that instructs the detection of the number of changes of a SeNB in an RRC message and notifies the UE of the message, so that the UE detects the number of changes of a SeNB and uses the detection result to measure the SCG cell.

In another method, the MeNB notifies the UE of the configuration of the parameter of the mobility state indicating the moving speed of the UE, which relates to the SeNB, in place of instructing the detection of the number of changes of a SeNB. When receiving the configuration of the parameter of the mobility state indicating the moving speed of the UE, which relates to the SeNB, the UE detects the number of changes of a SeNB and uses the detection result to measure the SCG cell.

As a result, the information that instructs the detection of the number of changes of a SeNB and signaling for the information can be reduced.

Although it has been disclosed that the number of changes of a SeNB is used to derive the mobility state of the UE performing DC, the number of changes of a SPCell may be used. The UE performing DC detects the number of changes of a SPCell. The UE may record the detected number of changes of a SPCell. As a result, a change of a SPcell within a SeNB can be taken into consideration, and a more detailed mobility state of the UE can be derived.

The number of changes of a SCG cell may be used. The UE performing DC detects the number of changes of a SCG cell. The UE may record the detected number of changes of a SCG cell. Also when the SeNB is performing CA through the RRH or the like, the number of changes of a SCG cell can be recorded to derive a more detailed mobility state of the UE.

Whether to use the number of changes of a SeNB, whether to use the number of changes of a SPCell, or whether to use the number of changes of a SCG cell may be selected as appropriate. The MeNB may instruct the UE which number of changes to use. The MeNB may notify the UE of the information about which number of changes to use together with the information that instructs the detection of the number of changes.

Figure 24:
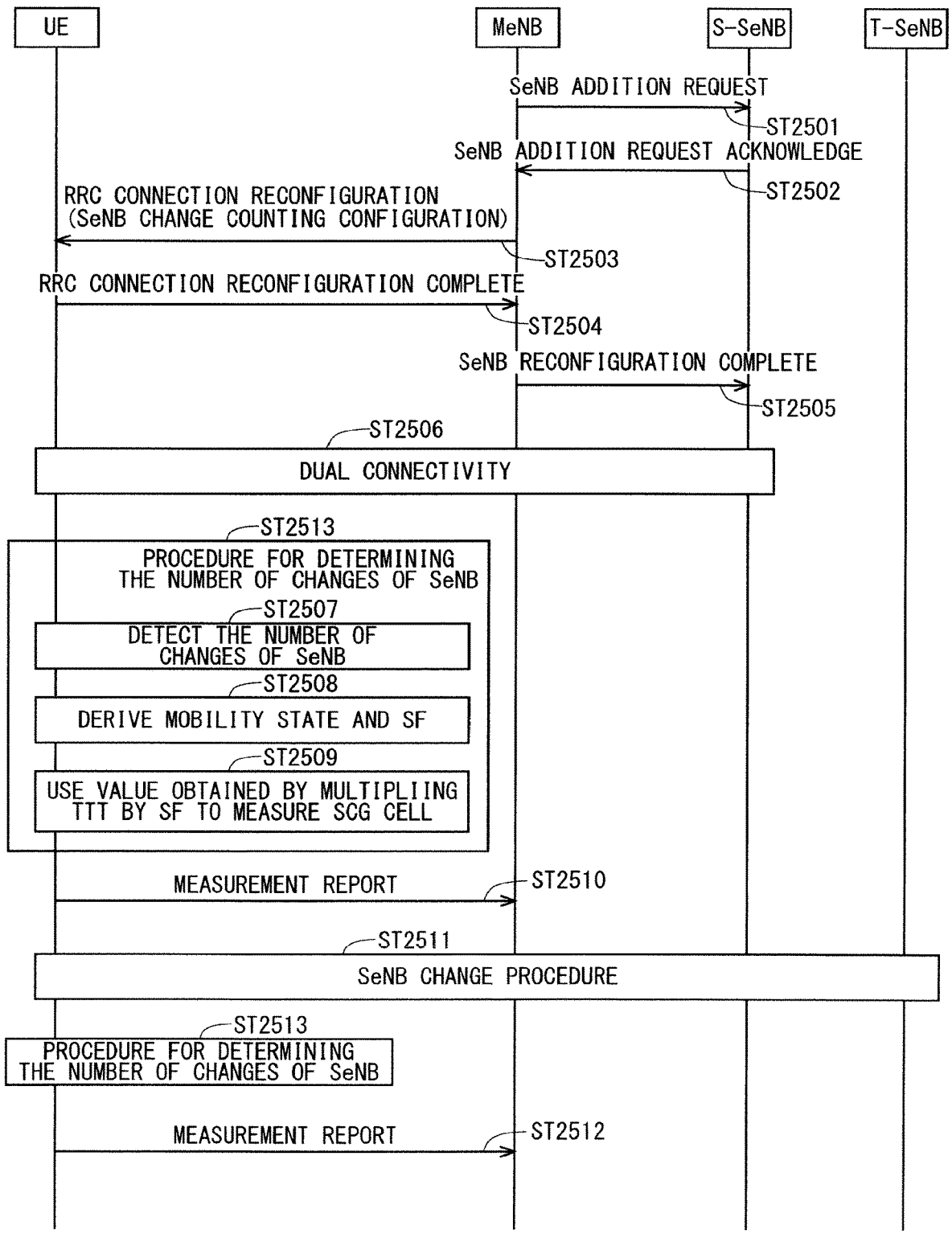
FIG. 24 shows an example of a sequence of a SCG cell measurement process in a communication system of a first modification of a fourth embodiment.

FIG. 24 shows an example of the sequence of a SCG cell measurement process in a communication system of the first modification of the fourth embodiment.

In step ST2501, the MeNB notifies the SeNB (S-SeNB herein) of a SeNB addition request message to perform DC to the UE.

In step ST2502, the SeNB that has received the SeNB addition request message in step ST2501 and judged that the resource of the SeNB is available for DC notifies the MeNB of a SeNB addition request acknowledge message.

In step ST2503, the MeNB that has received the SeNB addition request acknowledge message notifies the UE of the configuration for causing the UE to perform DC. An RRC connection reconfiguration message is used in this notification. To cause the UE to detect the number of changes of a SeNB, the MeNB includes the configuration of a parameter of the mobility state indicating the moving speed of the UE, which relates to the SeNB, in the message.

The UE that has received the message in step ST2503 performs the resource configuration for the execution of DC.

In step ST2504, the UE notifies the MeNB of an RRC connection reconfiguration complete message.

In step ST2505, the MeNB notifies the SeNB of a SeNB reconfiguration complete message.

In step ST2506, accordingly, a DC execution process is performed among the UE, the MeNB, and the SeNB.

The UE that has received the RRC connection reconfiguration message in step ST2503 and recognized that the message includes the configuration of the parameter of the mobility state indicating the moving speed of the UE, which relates to the SeNB, assumes that it has been instructed to detect the number of changes of a SeNB, and in step ST2513, uses the parameter to perform the SCG cell measurement process.

Specifically, in step ST2507, the UE detects the number of changes of a SeNB within a measurement period.

In step ST2508, the UE uses the detected number of changes of a SeNB and the threshold of the number of changes of a SeNB to derive the mobility state of the UE. The mobility state is classified as "high", "medium", or the other (hereinbelow referred to as "normal").

In step ST2508, the UE derives a scaling factor (SF) corresponding to the derived mobility state of the UE.

In step ST2509, the UE multiplies the measurement-related parameter, for example, TTT by the derived scaling factor. The resultant value is set to the TTT for measuring the SCG cell, and the SCG cell is measured.

In step ST2510, the UE notifies the MeNB of the measurement result. The measurement result also includes the measurement result of the SCG cell.

In step ST2511, the MeNB that has received the measurement result including the SCG cell from the UE in step ST2510 uses the measurement result to determine to change the SeNB. The MeNB that has determined to change the SeNB activates a SeNB change procedure, so that the SeNB change procedure is performed among the UE, the MeNB, the S-SeNB, and the T-SeNB. The S-SeNB is a SeNB before change, that is, a source SeNB. The T-SeNB is a SeNB after change, that is, a target SeNB.

In step ST2513, the UE continuously uses the parameter of the mobility state indicating the moving speed of the UE, which relates to the SeNB, to perform the SCG cell measurement process.

The SeNB has been changed in step ST2511, and accordingly, the number of changes of a SeNB within the measurement period is incremented by one. The UE uses the detected number of changes of a SeNB and the threshold of the number of changes of a SeNB to derive a new mobility state of the UE. The UE derives a measurement-related parameter from the newly derived mobility state of the UE to measure the SCG cell.

In step ST2512, the UE notifies the MeNB of a measurement result. The measurement result also includes the measurement result of the SCG cell.

The UE detects the number of changes of a SeNB in this manner to derive a more accurate mobility state of the UE.

The UE uses the mobility state in the measurement of the SCG cell to configure a more accurate measurement-related parameter, that is, a measurement-related parameter suitable for the coverage of the small cell.

The MeNB can thus obtain a more accurate measurement result of the SCG cell from the UE, and accordingly, can more accurately judge the configuration of the SeNB or the SCG cell to be used in DC in accordance with the mobility state of the UE.

The method disclosed in this modification may be performed separately from the conventional procedure for deriving the mobility state for eNB. The conventional procedure for eNB, that is, the procedure for deriving the mobility state from the result on the detection of the number of HOs may be performed separately from or in parallel with the method disclosed in this modification, that is, the procedure for deriving the mobility state from the result on the detection of the number of changes of a SeNB.

The method of deriving a mobility state and the measurement method disclosed in this modification may be dedicated to the measurement of a SCG cell. This enables an appropriate measurement according to the coverage range of a cell.

The conventional method of deriving a mobility state and the conventional measurement method can be used to measure the MeNB.

The method of deriving a mobility state and the measurement method, disclosed in this modification, may be used to measure the frequency layer of a SCG cell or to measure a frequency layer at which a small cell is operated.

An appropriate measurement according to the coverage range of a small cell as well as a SCG cell can be performed.

The source MeNB may notify the target MeNB (eNB) of the configuration of the parameter of the mobility state indicating the moving speed of the UE, which relates to the SeNB. For example, in the case of a change of a MeNB or a HO of an eNB, the target MeNB (eNB) can accordingly recognize the parameter configuration of the mobility state indicating the moving speed of the UE, which relates to the SeNB, configured by the source MeNB for the UE being a HO target. The target MeNB can thus contribute to the parameter configuration of the mobility state indicating the moving speed of the UE, which relates to the SeNB, in the MeNB (eNB).

Also in the target MeNB (eNB), the parameter configuration of the mobility state indicating the moving speed of the UE, which is the same as that of the source MeNB, may be continuously made effective until a new parameter configuration of the mobility state indicating the moving speed of the UE is performed. The UE continuously uses the parameter configuration of the mobility state indicating the moving speed of the UE, which is the same as that of the source MeNB, to detect and record the number of changes of a SeNB until the target MeNB (eNB) notifies the UE of a new parameter configuration of the mobility state indicating the moving speed of the UE. This enables the long-term detection of the mobility state of the UE.

Conversely, the UE may reset the detection and record of the number of changes of a SeNB through HO of the MeNB (eNB). The measurement of the SCG cell using the number of changes of a SeNB may be reset in accordance with the reset of the detection and record of the number of changes of a SeNB. The UE may perform the measurement again in accordance with the reception of the measurement configuration notified by a MeNB (eNB) being a change destination. This eliminates the need for notifying a target MeNB of the measurement configuration by a source MeNB. An increase in signaling amount during HO can therefore be prevented.

Although this modification has described HO of a MeNB (eNB), this modification is also applicable to the case where a serving cell that notifies the UE of the measurement configuration is changed, for example, in the case where a MeNB is changed or a PCell is changed.

The detection and record of the number of changes of a SeNB may be reset when a SeNB release procedure is performed. The UE may reset the detection and record of the number of changes of a SeNB when being notified of the SeNB release procedure. The UE may reset the detection and record of the number of changes of a SeNB upon completion of DC.

The measurement of a SCG cell using the number of changes of a SeNB may be reset in response to the reset of the detection and record of the number of changes of a SeNB.

The method disclosed in this modification may be applied to TTT, as well as to any other measurement-related parameter. The method can be used in the case where a more accurate mobility state is required.

Second Modification of Fourth Embodiment

A problem to be solved in a second modification of the fourth embodiment and a solution to the problem will be described below.

The current specifications of 3GPP include the functionalities regarding the mobility state of a UE. A non-limiting example of the functionalities is mobility history information (see Non-Patent Document 16).

The mobility history information is applied to UEs in RRC_Idle and RRC_Connected. In response to a change of the serving cell during RRC_Idle or a change of the PCell during RRC_Connected, the UE records the cell identifier of the cell (cell before change) and a time of stay in the relevant cell. To first enter the E-UTRA cell from an out-of-service area or from another RAT, the UE records only the time of stay in the area out of the E-UTRA.

The UE includes the recorded cell identifier of the PCell or the serving cell and the time of stay in a UE information response message in response to the UE information request from the eNB and notifies the eNB of the message. The eNB can thus obtain the mobility state of the UE.

As described above, the PCell is a target cell during RRC_Connected in the conventional specifications.

The SCG cell used in DC is not the PCell, and thus is not a target of the mobility history information. The mobility state of the UE performing DC is determined in response to a change of the PCell for the MeNB.

As described in the first modification of the fourth embodiment, accordingly, an eNB cannot obtain the accurate mobility state of the UE that is suitable for the coverage of a small cell in the conventional specifications.

This modification will disclose the method in which the eNB obtains more accurate mobility state of the UE.

The UE records the cell identifier of the SPCell performing DC and the time of stay in the cell. In response to a change of a SPCell, the UE performing DC records the cell identifier of the cell (cell before change) and the time of stay in the relevant cell. The UE may record the carrier frequency of the cell. The cell identifier may be CGI or PCI.

The UE may separately provide a list in which the information about a conventional PCell is recorded and a list in which the information about a SPCell is recorded. The UE records the information about a PCell and the information about a SPCell in the different lists.

The method in which the eNB obtains the list recorded by the UE will be disclosed.

The MeNB requests the list in which the information about the SPCell is recorded for the UE performing DC. An RRC message for the request may be newly provided and notified. Alternatively, the information indicating that the list in which the information about the SPCell is recorded is requested may be included in the existing RRC message and notified. Notification may be made through dedicated signaling.

For example, the MeNB may include the information in an RRC connection reconfiguration message and notify the UE of the message. The information may be included in a "Radio Resource Configuration Dedicated" message and notified.

The MeNB may notify the UE of the information when performing an RRC connection reconfiguration regarding the SeNB. In one example, the MeNB may notify the UE of the information in performing a SeNB addition procedure. In another example, the MeNB may notify the UE of the information when performing the SeNB change procedure or the SeNB modification procedure. In still another example, the MeNB may notify the UE of the information when changing a SPCell.

These notification methods may be used in combination, resulting in a flexible operation as a system. In another example, the information may be included in a UE information request message that is the same message as the conventional message. The message may include the information indicating either of the list where the information about a PCell is recorded or the list where the information about a SPCell is recorded is requested.

When receiving a request for the list in which the information about a SPCell is recorded from the MeNB, the UE notifies the MeNB of the list in which the information about a SPCell is recorded. The UE may newly provide an RRC message for the request for notification. Alternatively, the UE may include the information indicating that the list in which the information about a SPCell is recorded is requested in the existing RRC message for notification. Notification may be made through dedicated signaling.

For example, when using the UE information request message that is the same as the conventional message to request the list in which the information about a SPCell is recorded, the UE may use the UE information response message for notification. The UE includes the list in which the information about a SPCell is recorded in a UE information response message and notifies the MeNB of the message.

The MeNB may individually request the list in which the information about a PCell is recorded and the list in which the information about a SPCell is recorded for the UE. For example, the UE information request message may be used for both the requests. The UE can recognize which information the UE will notify the MeNB by including the information indicating either of the list, where the information about a PCell is recorded, or the list, where the information about a SPCell is recorded, in the message. The UE may report a corresponding list to the MeNB in accordance with the information.

The MeNB may request both the list in which the information about a SPCell is recorded and the list in which the information about a PCell is recorded through one message. The MeNB may notify the UE of the information indicating that the MeNB will request both the lists. The UE that has received the message notifies the MeNB of both the list in which the information about a SPCell is recorded and the list in which the information about a PCell is recorded. Notification may be made through one message.

One message may always indicate that both the lists are requested, which may be determined statically in advance in, for example, specifications. When the MeNB notifies the UE of the message, the UE notifies the MeNB of both the list in which the information about a SPCell is recorded and the list in which the information about a PCell is recorded. Notification may be made through one message.

The method of creating the list in which the information about a SPCell is recorded will be disclosed.

In response to a change of a SPCell during DC, the UE records, for example, the cell ID of the cell (cell before change) and the time of stay in the cell. The UE may also record the carrier frequency of the cell or the cell size of the cell.

The maximum number of cells to be recorded in a list may be determined. For example, n cells may be recorded at the maximum, and if the number of cells exceeds n, the UE discards the extra cells, starting with the oldest cell record. The recording capacity of the UE can be prevented from increasing enormously. The maximum number of cells n may be determined statically in, for example, specifications or may be notified by the MeNB.

The UE may discard the list in which the information about a SPcell is recorded when the SeNB release procedure is performed. The UE may newly create the list in which the information about a SPcell is recorded when the SeNB addition procedure is performed. The case where the SeNB release procedure is performed may be the case where the UE releases or resets the resource for the SeNB.

When the SeNB release procedure is performed, the UE may retain the list in which the information about a SPCell is recorded for a predetermined period. When a SeNB addition procedure is newly performed before the expiration of a predetermined period from the execution of the SeNB release procedure, the UE records the information about a SPCell in the list that has been created. When a predetermined period expires from the execution of the SeNB release procedure without the SeNB addition procedure being newly performed, the UE discards the list.

As a result, even when DC is intermittently performed in a situation in which the coverage of the SeNB is not seamless, the list in which the information about a SPCell is recorded will not be discarded unnecessarily. A predetermined period may be determined statically in advance in, for example, specifications. Alternatively, a predetermined period may be notified to the UE by the MeNB. In a notification method, a predetermined period may be notified through RRC message or through dedicated signaling. Alternatively, the MeNB may broadcast the predetermined period to the UE being served thereby. The predetermined period may be included in the SIB and notified.

The UE may record the time in which DC is not performed during RRC_CONNECTED. For example, the UE may record a time from a shift to RRC_CONNECTED to the execution of the SeNB addition procedure, a time from the execution of the SeNB release procedure to the execution of the SeNB addition procedure, or a time from the execution of the SeNB release procedure to the end of the RRC_CONNECTED state. The UE may record the respective times separately. The UE may record the respective times at the occurrence of a time in which DC is not performed. The UE may avoid recording the cell identifier of the SPCell and the carrier frequency information during the time in which DC is not performed but may record the relevant time as a time of stay.

The UE can accordingly record the situation of the change of a SPCell in the RRC_CONNECTED state also in the case where the SPCell is not used. The MeNB can obtain the information from the UE to recognize more detailed mobility state of the UE.

The UE may discard the list in which the information about a SPCell is recorded when a HO of the MeNB is performed.

The UE may retain the list in which the information about a SPCell is recorded for a predetermined period when a HO of the MeNB is performed. When a SeNB addition procedure or a SPCell change procedure has been performed before the expiration of a predetermined period from the execution of the HO procedure, the UE records the information about a SPCell in the list that has been created. When a predetermined period expires from the execution of the HO procedure without the SeNB addition procedure or the SPCell change procedure being newly performed, the UE discards the list.

When a HO of the MeNB is performed, the UE may notify the MeNB (eNB) being a HO destination of the list in which the information about a SPCell is recorded and then discard the list.

The UE may notify the MeNB (eNB) being a HO destination of the list in which the information about a SPCell is recorded in response to a request from the MeNB, after the execution of the HO procedure.

In the case of HO of the MeNB, the MeNB being a HO source may notify the MeNB (eNB) being a HO destination of the list in which the information about a SPCell is recorded, which has been obtained from the UE. If the list does not include the cell size, the MeNB may add the cell size to the list and notify the list. This is effective in the case where the MeNB has recognized the cell size of the SPCell. Notification may be made through X2 signaling or through S1 signaling via the MME.

This method allows the MeNB (eNB) being a HO destination to continuously use the information.

The MeNB being a HO source may notify the MeNB (eNB) being a HO destination of the list in which the information about a SPCell is recorded, which has been obtained from the UE. Notification may be made together with the list in which the information about a PCell is recorded, which has been obtained from the UE. The lists may be included in the same message and notified.

In the method described above, the UE records the information about a PCell and the information about a SPCell in the different lists. In another method, the UE may record the information about a PCell and the information about a SPCell in one list. Alternatively, the information about a SPCell may be included in the conventional list of the information about a PCell.

In this case, a parameter indicative of a SPCell may be provided and be recorded in association with the SPCell to create a list.

In the case where the list includes a cell size, no parameter indicative of the SPCell may be recorded.

As a result, the UE can use only one list, thus reducing recording capacity and facilitating the list creation procedure. This reduces requests for a list between the MeNB and the UE and information or messages included in a notification message. The signaling load can therefore be reduced.

In the method described above, the UE records the information about a SPCell to create a list. In another method, the UE may record the information about a SeNB and create a list. In response to a change of a SeNB, the UE performing DC records the eNB identifier of the SeNB (SeNB before change) and a time of stay in the eNB. The UE may record the carrier frequency used by the eNB. Although the relevant information is not as refined as the information about a SPCell, the recording capacity and signaling load can be reduced.

The UE may record the information about a SCG cell and create a list. In response to a change of a SCG cell, the UE performing DC records the cell identifier of the SCG cell (SCG cell before change) and a time of stay in the cell. The UE may record the carrier frequency of the cell or may also record the cell size of the cell. The MeNB can obtain the list in which the information about a SCG cell is recorded to derive a more detailed mobility state of the UE.

A list can be selected from among the list in which the information about a SPCell is recorded, the list in which the information about a SeNB is recorded, and the list in which the information about a SCG cell is recorded. A list may be determined statically in advance in, for example, specifications. Alternatively, the Me-NB may instruct the UE to create which list. The MeNB may notify the UE of the information about which list to be created. For example, the MeNB may notify the UE in entering the RRC_Connected state. The MeNB may notify the UE through an RRC message or dedicated signaling.

Third Modification of Fourth Embodiment

A problem to be solved in a third modification of the fourth embodiment and a solution to the problem will be described below.

The current 3GPP specifications include functionalities regarding the mobility state of a UE. A non-limiting example of such functionalities is UE history information (see Non-Patent Document 1).

For the UE history information, the eNB that serves a UE creates a "last visited cell list" of an active UE.

When the UE performs HO, the eNB being a HO source adds a PCell to the "last visited cell list" of the UE and notifies the eNB being a HO destination of the list through S1 or X2. The eNB being a HO destination performs a similar procedure to the eNB being a subsequent destination and notifies the eNB of the list. The network creates and retains the UE's HO history information. Examples of the information recorded in the "last visited cell list" include a cell identifier such as a CGI, a cell size, a time of stay in a cell, and a HO cause.

In this manner, the eNB records the HO history information in a list in the conventional specifications.

The SeNB to be used in DC is not changed through HO. No matter how many times the UE performing DC repeatedly changes a SeNB, therefore, the change is not recorded in the list.

In the conventional specifications, thus, the eNB cannot obtain accurate mobility state of the UE that is suitable for the coverage of a small cell, as described in the second modification of the fourth embodiment.

This modification will disclose another method in which an eNB obtains more accurate mobility state of the UE.

The MeNB creates a list of SPCells connected with a UE performing DC. In the description below, the list of SPCells that have been connected with a UE performing DC may be referred to as a "SPCell change history list".

When the SPCell used in DC is changed for the UE, the MeNB adds the SPCell before change to the SPCell change history list. Alternatively, when the SeNB release procedure is performed, the MeNB adds the SPCell that has been connected with the UE before release to the SPCell change history list of the UE.

Examples of the information recorded in the SPCell change history list include a cell identifier such as a CGI, a cell size, a time of stay in a cell, a SPCell change cause, and a SeNB release cause.

As a result, the MeNB can record the SPCell history information on the UE performing DC in a list. The MeNB can accordingly obtain the mobility state of the UE suitable for the coverage of a small cell.

The MeNB may separately provide the conventional list in which the HO history information is recorded and the list in which the SPCell change history information is recorded. The MeNB records the HO history information and the SPCell change history information in the different lists.

When the SeNB release procedure is performed to the UE performing DC, the MeNB may discard the list in which the SPcell change history information on the UE is recorded. When the SeNB addition procedure is performed to the UE, the MeNB may newly create a list in which the SPcell information on the UE is recorded. The case where the SeNB release procedure is performed may be the case where the MeNB instructs the UE to release the resource of the SeNB.

When the SeNB release procedure is performed to the UE performing DC, the MeNB may retain the list in which the SPCell information on the UE is recorded for a predetermined period. When the SeNB addition procedure is newly performed before the expiration of a predetermined period from the execution of the SeNB release procedure to the UE performing DC, the MeNB records the procedure in the list that has been created. When the predetermined period expires from the execution of the SeNB release procedure to the UE performing DC without the SeNB addition procedure being newly performed, the MeNB discards the list.

As a result, even when DC is intermittently performed in a situation in which the coverage of the SeNB is not seamless, the list in which the SPCell change history information is recorded will not be discarded unnecessarily. A predetermined period may be determined statically in advance in, for example, specifications or may be determined semi-statically or dynamically. The MME or the operation and maintenance (O&M) may determine a predetermined period and notify the MeNB of the predetermined period.

The MeNB may record the time in which the MeNB does not perform DC to the UE in RRC_Connected in a list. For example, the MeNB may record a time from the completion of the RRC connection establishment procedure between the UE and the MeNB to the execution of the SeNB addition procedure, a time from the execution of the SeNB release procedure to the execution of the SeNB addition procedure, and a time from the execution of the SeNB release procedure to the end of the RRC_CONNECTED state. The MeNB may separately record the times. The MeNB may record these times at the occurrence of a time in which DC is not performed. For the time in which DC is not performed, the cell identifier and the carrier frequency information of the SPCell are not recorded and only a time of stay may be recorded.

The MeNB can accordingly record the situation of the change of a SPCell in the RRC_CONNECTED state also in the case where the SPCell is not used. The MeNB can recognize more detailed mobility state of the UE.

The MeNB may discard the list in which the SPCell change history information on the UE being a HO target is recorded when a HO of the MeNB is performed.

The MeNB may retain the list in which the SPCell change history information on the UE being a HO target is recorded for a predetermined period when a HO of the MeNB is performed. The list is available when the UE being a HO target is switched back to the MeNB being a HO source.

In the case of HO of the MeNB, the MeNB being a HO source may notify the MeNB (eNB) being a HO destination of the list in which the SPCell change history information is recorded. The list may be notified through X2 signaling or through S1 signaling via the MME. This method enables the MeNB (eNB) being a HO destination to continuously use the information.

The MeNB being a HO source may notify the MeNB (eNB) being a HO destination of the list in which the PCell HO history information is recorded. The list may be notified together with a list in which the SPCell change history information is recorded. The lists may be included in the same message and notified.

When receiving a list in which the SPCell change history information on the UE being a HO target from the MeNB being a HO source, the MeNB (eNB) being a HO destination may retain the list in which the SPCell change history information on the UE being a HO target is recorded for a predetermined period.

When the MeNB (eNB) being a HO destination is newly subjected to the SeNB addition procedure or the SPCell change procedure before the expiration of a predetermined period from the execution of the HO procedure, the information about a SPCell is recorded in the list that has been created. The MeNB (eNB) being a HO destination discards the list when a predetermined period expires without the SeNB addition procedure or the SPCell change procedure being newly performed.

In the method described above, the MeNB records the PCell HO history information and the SPCell change history information in the different lists. In another method, the PCell HO history information and the SPCell change history information may be recorded in one list. Alternatively, the SPcell change history information may be included in the list of the conventional PCell HO history information.

In this case, a parameter indicative of a SPCell may be provided and recorded in association with the SPCell to create a list.

In the case where the list includes a cell size, no parameter indicative of the SPCell may be recorded.

As a result, the MeNB can use only one list, thus reducing recording capacity and facilitating the list creation procedure.

In the method described above, the MeNB records the SPCell change history information to create a list. In another method, the MeNB may record the SeNB change history information and create a list. For the UE performing DC, the MeNB records the eNB identifier of the SeNB (SeNB before change) and a time of stay in the eNB in response to a change of a SeNB. The MeNB may record the carrier frequency used by the eNB or the change cause. Although the relevant information is not as refined as the SPCell information, the recording capacity can be reduced.

The MeNB may record the SCG cell change history information to create a list. For the UE performing DC, the MeNB records the cell identifier of the SCG cell (SCG cell before change) and a time of stay in the cell in response to a change of a SCG cell. The MeNB may record the carrier frequency of the cell or may also record the cell size of the cell. The MeNB may record the change cause. The MeNB can obtain the list in which the SCG cell change history information is recorded to derive a more detailed mobility state of the UE.

A list can be selected from among the list in which the SPCell change history information is recorded, the list in which the SeNB change history information is recorded, and the list in which the SCG cell change history information is recorded. A list may be determined statically in advance in, for example, specifications, or may be determined semi-statically or dynamically. The MME or O&M may determine a list and notify the MeNB of the list.

Fifth Embodiment

This embodiment will disclose the method of enabling communications with appropriate amounts of resources such as frequency, time, and transmission power using a sounding reference signal (SRS) transmitted from a UE being a CoMP target at the start of the coordinated multipoint transmission and reception (CoMP) described in Non-Patent Document 7.

Herein, the "sounding reference signal" refers to a training sequence signal that is always or intermittently transmitted also in the absence of transmission data as described in, for example, Non-Patent Document 14.

Figure 25:
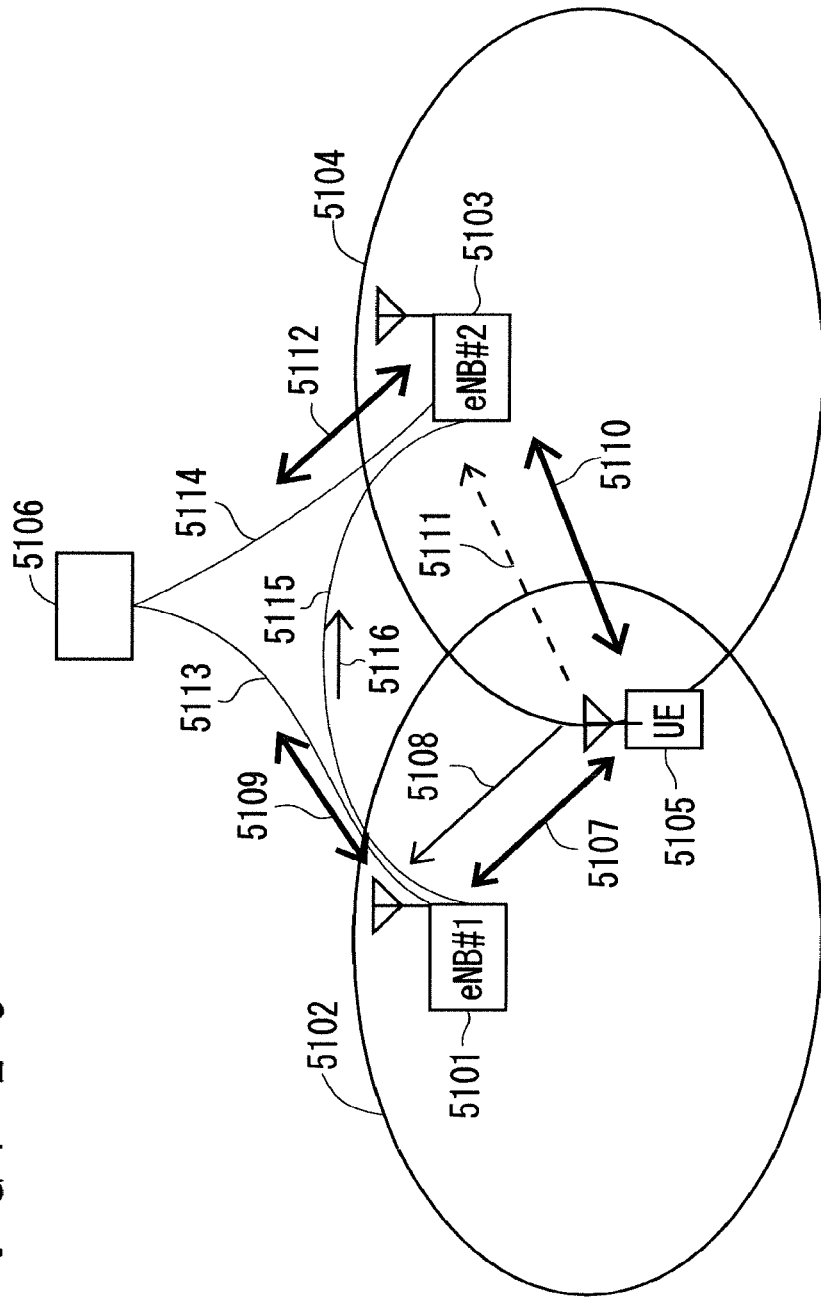
FIG. 25 shows the concept of UL CoMP under discussion of 3GPP.

First, uplink will be described. FIG. 25 shows the concept of UL CoMP under discussion of 3GPP. With reference to FIG. 25, an eNB #1 is denoted by reference "5101", an eNB #2 is denoted by reference "5103", the communication area, that is, coverage of the eNB #1 is denoted by reference "5102", and the communication area, that is, coverage of the eNB #2 is denoted by reference "5104". A central entity or a mobile management entity (MIE) is denoted by reference "5106".

When performing UL CoMP, that is, uplink coordinated multiple point reception, the eNB #1 5101 and the eNB #2 5103 perform a coordinated operation between the eNBs via the central entity or the mobile management entity (MME) 5106. For example, coordinated scheduling (CS) in which coordinated multiple point scheduling is performed is studied, where communication data 5107 and communication data 5110 with a UE 5105 located at the cell edge, transmission power, and the like can be scheduled in accordance with the communication status of each eNB to improve a throughput and increase a system throughput. The central entity is a functional unit for coordinated multiple point. The central entity exchanges signals for coordinated multiple point between the eNBs in the case of the operation via the MME and the actual coordination control is performed between the eNBs.

In UL CoMP during CS, the user equipment (UE) 5105 being served by the eNB #1 5101 transmits a scheduling request (SR) to the eNB #1 5101 at the occurrence of the data 5107 that the UE 5105 wants to transmit to the eNB #1 5101. The eNB #1 5101 confirms the availability of a resource, such as the communication status of another UE, and transmits a grant signal indicating an allowed range if the transmission is allowed.

When receiving the grant signal, the UE 5105 transmits the data 5107, which the UE 105 wants to transmit, within a range allowed by the grant signal.

When detecting that the UE 5105 is located at a cell boundary or near another cell, the eNB #1 5101 uses radio resource control (RRC) to notify the UE 5105 of an SRS transmission instruction.

The eNB #1 5101 may determine that the UE 5105 is located at the cell boundary based on whether a report value of its own cell that has been reported from the UE 5105 through a measurement report message, specifically, reference signal received power (RSRP), reference signal received quality (RSRQ), or both of them are not greater than a specific threshold.

The eNB #1 5101 may determine that the UE 5105 is near another cell based on whether a report value of another cell that has been reported from the UE 5105 through a measurement report message, specifically, RSRP, RSRQ, or both of them are not smaller than a specific threshold.

According to Non-Patent Document 14 (see 5.5.1.5), a parameter $n^{RS}_{ID}$ for generating a pseudo-random number that defines an SRS signal is $N_{cell}^{ID}$, and is a value provided per cell (cell ID). In the present invention, at least one UE-dedicated parameter is specified by the SRS transmission instruction. In other words, the UE 5105 transmits not a cell-specific SRS signal but a UE-specific SRS signal.

The SRS signal may always be a UE-specific signal. Alternatively, upon detection that a UE is located at a cell boundary or near another cell, a cell-specific SRS signal may be switched to a UE-specific signal.

The methods of transmitting data by a UE are classified into two methods below. In one of the methods, the same configuration (same PUSCH config, same PUCCH config) is provided when the UE transmits data to the eNB #1 and when the UE transmits data to the eNB #2. In the other method, a different configuration is provided when the UE transmits data to the eNB #1 and when the UE transmits data to the eNB #2.

For example, in the example shown in FIG. 25, when the UE 5105 transmits data to the eNBs 5101 and 5103 using different configurations, the eNB #2 5103 notifies the eNB #1 5101 of a parameter for CoMP configuration to be used in the eNB #2 5103, such as "PUCCH config" or "PUSCH config", via an X2 interface 5115. The notification may be made via the central entity or the MME 5106. The eNB #1 5101 notifies the UE 5105 of such config information.

In the transmission to the eNB #2 5103, the UE 5101 can thus transmit the data using the configuration with which the eNB #2 5103 can receive the data. This method is effective when eNBs are not synchronized with each other, such as when a large delay time occurs in the backhaul of the eNB.

When the UE 5105 transmits data using a common configuration irrespective of whether transmission is to the eNB 5101 or 5103, the eNB #1 5101 notifies the eNB #2 5103 of a parameter for CoMP configuration, such as "PUCCH config" or "PUSCH config", via the X2 interface 5115. The notification may be made via the central entity or the MME 5106.

The eNB #2 5103 can thus receive the data transmitted from the UE 5105. This method enables the UE to transmit the same data without considering to which eNB the UE transmits data, thus facilitating the control procedure.

The eNB #1 5101 directly notifies the eNB #2 5103 adjacent to the eNB #1 5101 that possibly performs UL CoMP of an SRS config 5116 via the X2 interface 5115. The eNB #2 5103 starts receiving an SRS of the UE 5105 in accordance with the SRS config 5116.

In this case, it suffices that the eNB #1 5101 and the eNB #2 5103 are synchronized with each other in advance, or that the eNB #1 5101 and the eNB #2 5103 are synchronized with each other within a specific time range. It is also effective to achieve synchronization not only between OFDM symbols but also between subframe numbers, slot numbers, or system frame numbers each indicating a time corresponding to an OFDM symbol length (corresponding to those specified in TS36.211).

The eNB is enabled to receive signals within a predetermined time range, which is longer than a CP length, from the designated SRS transmission time. It is also effective to make the CP length of only the OFDM symbol of an SRS longer than the CP length of any other piece of data. It is also effective to provide a slot format of large CP length including the data portion upon start of the SRS transmission. Alternatively, it is also effective to change a reference timing of the UE's transmission per eNB, for example, a head timing of the subframe number, slot number, or system frame number.

As a result, the eNB #2 5103 that is a UL CoMP target can recognize the uplink communication quality through the reception of an SRS of the UE 5105 before starting UL CoMP. Both the eNB #1 5101 and the eNB #2 5103 report uplink reception qualities 5109 and 5112 to the central entity 5106, thus enabling the central entity 5106 to optimally allocate resources to the two eNBs.

A delay time before the start of UL CoMP (a time during which uplink quality is measured after an instruction for start) is not required and an immediate start of UL CoMP is enabled, thus eliminating the need for allocation of a yet-to-be-optimized frequency, time, or transmission power that occurs during the delay time.

Although transmission is performed via the X2 interface 5115 in the method of notifying SRS config, transmission may be performed via the central entity or the MME 5106.

In this case, the central entity notifies the selected eNB of the eNB identifier of the eNB #1 5101. The central entity may select a plurality of eNBs.

The central entity may notify the UE 5105 of the eNB identifier of the selected eNB.

In the procedure before starting CoMP described above, an instruction to transmit an SRS is provided to the UE that is a CoMP target, and then, the SRS config 5116 is notified to the adjacent eNB #2 5103. Alternatively, the adjacent eNB may be notified of SRS config before the UE is notified of SRS config, considering the case where the resource for SRS, which is desirably allocated by the adjacent eNB #2 5103, such as frequency, time (subframe number), or resource block number has been used.

To prevent the resource for SRS of SRS config and the resource for SRS being used by the eNB #2 5103 from being identical to each other, the eNB #2 5103 may notify the eNB (eNB #1 5101) adjacent thereto of the use status of a resource upon start of the use of the SRS of the eNB #2. Preventing the use of the same resource as the resource for SRS from another UE being served by the eNB #2 5103 further improves the reception quality of an SRS from the UE in the eNB #2 5103.

In the example in which a start of SRS transmission is judged as described above, the eNB #1 5101 notifies the UE 5105 of an instruction to start SRS transmission at a timing of detection that the UE is located at the cell boundary, thus minimizing the SRS transmissions when not used. Alternatively, to omit a processing time for an instruction to start SRS transmission in the case where, for example, the eNB #1 5101 has a small cell radius, SRS transmission start config may be configured in advance when the UE 5105 starts communicating with the eNB #1 5101.

In the SRS transmission instruction, not a cell-dedicated parameter but at least one UE-dedicated parameter is transmitted in addition to the information by which a resource location is designated. Alternatively, for example, an ID for specifying a UE, such as a system architecture evolution (SAE) temporary mobile station identifier (S-TMSI) or an international mobile station identifier (IMSI) may be notified (for example, $n^{RS}_{ID}$=S-TMSI, $n^{RS}_{ID}$=IMSI).

Although not a cell-dedicated parameter but at least one UE-dedicated parameter is transmitted in the SRS transmission instruction, a pool of SRSs to be used in common within a specific area such as a tracking area, CoMP set, or a cluster of groups of adjacent cells managed through clustering may be prepared. In one effective approach, even when groups of adjacent cells are installed in places inaccessible to radio waves, such as eNBs installed in an underground mall and eNBs installed outdoors, cells close to each other graphically share an ID for SRS as one group. The central entity or the MME 5106 may mange IDs and notify the UE of a delivered ID through an SRS instruction via the serving cell (for example, $n^{RS}_{ID}$=within-area ID).

As a result, an SRS is shared in a specific area, thus enabling the eNB within the area to receive the SRS in advance.

In the SRS transmission instruction, not a cell-dedicated parameter but a plurality of cell-dedicated parameters may be notified simultaneously through at least one of time multiplexing, frequency multiplexing, and code multiplexing, or through a combination thereof. In this case, the eNB #2 5103 transmits SRS config including at least one cell-dedicated parameter such as a cell ID to the eNB #1 5101. The eNB #1 5101 notifies the UE 5105 of this information. The UE 5105 can thus transmit an SRS dedicated to the eNB #2 5103 simultaneously with an SRS dedicated to the eNB #1 5101.

The information that enables the identification of multiplexing of the resources used in the eNB #2 5103 may be notified together with the SRS config 5116 notified to the eNB #2 5103 by the eNB #1 5101. This enables the eNB #2 5103 to receive the SRS of the UE 5105.

If a transmission bit count decreases due to a change of the SRS transmission approach and the SRS transmission power becomes insufficient, a corresponding transmission power offset may be added.

Although the eNB #2 5103 that is a notification destination for the eNB #1 5101 is an adjacent eNB that possibly performs UL CoMP in the description above, specifically, the eNB #2 5103 may be an eNB that is an UL CoMP target or all the cells in an UL CoMP set.

Although the SRS transmission instruction to the UE is described using the example in which RRC is used, the instruction may be provided through MAC signaling or an L1/L2 control, for example, PDCCH/EPDCCH.

Downlink will be described next.

DL CoMP is discussed as in uplink. For example, joint processing JP) in which both cells perform transmissions and CS in which coordinated multipoint scheduling is performed are studied. JP is classified as joint transmission (JT) or dynamic point selection (DPS). A method involving JT and CS in combination is also studied. These methods can be used to improve a throughput at a cell edge and increase a system throughput.

Particularly in the case of time division duplex (TDD) of a signal for CoMP, a frequency is the same between uplink and downlink, and accordingly, a channel can be estimated from an uplink SRS to estimate a downlink channel. The signal can thus be used in DL CoMP.

Description will be given using an example of downlink CS during TDD. In DL CoMP, at the occurrence of data that the eNB #1 5101 wants to transmit to the UE 5105, the eNB #1 5101 transmits data to the UE 5105.

When detecting that the UE 5105 is located at a cell boundary, the eNB #1 5101 uses RRC to notify the UE 5105 of an SRS transmission instruction. According to Non-Patent Document 14 (see 5.5.1.5), the parameter $n^{RS}_{ID}$ for generating a pseudo-random number that defines an SRS signal is $N^{cell}_{ID}$, which is a value for each cell (cell ID). In the present invention, an SRS transmission instruction designates at least one UE-specific parameter. In other words, the UE 5105 transmits not an SRS signal specific to a cell but an SRS signal specific to a UE.

The eNB #1 5101 directly notifies the eNB #2 5103 adjacent to the eNB #1 that possibly performs DL CoMP of SRS config via X2. The eNB #2 starts receiving an SRS of the UE 5105 in accordance with the SRS config.

As described above, in the case of TDD, the eNB #2 that is a DL CoMP target receives an SRS of the UE before starting DL CoMP, thereby recognizing downlink communication quality. Both the eNB #1 and the eNB #2 report the uplink reception quality to the central entity 5106, thus enabling the central entity 5106 to optimally allocate resources to the two eNBs.

A delay time until the start of DL CoMP, that is, a time during which the UE measures downlink quality after an instruction for start, is not required and an immediate start of DL CoMP is enabled, thus eliminating the need for allocation of a yet-to-be-optimized frequency, time, or transmission power that occurs during the delay time.

Modifications are provided for downlink as well as for uplink.

Notification may be made via S1 (via the MME) in the SRS config notification method. Alternatively, notification may be made via the functional unit of the central entity that allocates resource of inter-eNB CoMP.

In this case, the central entity notifies the selected eNB of the eNB identifier of the eNB #1 5101. The central entity may select a plurality of eNBs.

The central entity may notify the UE 5105 of the eNB identifier of the selected eNB.

In the procedure before starting CoMP, the adjacent eNB may be notified of SRS config before notification to the UE.

Alternatively, the eNB #2 5103 may notify the adjacent eNB (eNB #1) of the use status when starting the use of an SRS of the eNB #2.

In the example in which the start of SRS transmission is judged, SRS transmission start config may be configured in advance when the UE 5105 starts communication with the eNB #1.

At least one UE-dedicated parameter included in an SRS transmission instruction may be the notification of an ID that specifies a UE, such as S-TMSI or IMS (for example, $n^{RS}_{ID}$=S-TMSI $n^{RS}_{ID}$=IMSI).

In the SRS transmission instruction, a pool of SRSs to be used in common may be prepared within a specific area, for example, a tracking area, a CoMP set, or a cluster of groups of adjacent cells managed through clustering. The central entity or the MME 5106 may mange IDs and notify the UE of a delivered ID through an SRS instruction via the serving cell (for example, $n^{RS}_{ID}$=pool ID for SRS).

As a result, an SRS is shared in a specific area, thus enabling the eNB within the area to receive an SRS in advance.

Although not a cell-dedicated parameter but at least one UE-dedicated parameter is transmitted in the SRS transmission instruction, a plurality of cell-dedicated parameters may be notified simultaneously through time multiplexing, frequency multiplexing, code multiplexing, or a combination thereof. In this case, the information that enables the identification of multiplexing of the resources used in the eNB #2 5103 may also be notified through the SRS config 5116 from the eNB #1 5101 to the eNB #2 5103.

Although the eNB #2 5103 that is a notification destination for the eNB #1 5101 is an adjacent eNB that possibly performs DL CoMP in the description above, specifically, the eNB #2 5103 may be an eNB that is a DL CoMP target or all the cells in a DL CoMP set. Alternatively, the eNB #2 5103 may be a relevant eNB within a tracking area corresponding to the management of IDs or an eNB in a cluster of groups of adjacent cells managed through clustering. A plurality of relevant eNBs in the tracking area and a plurality of eNBs in the cluster may be provided.

Although the SRS transmission instruction to the UE is described using the example in which RRC is used, the instruction may be provided through MAC signaling or an L1/L2 control signal, for example, PDCCH/EPDCCH.

When detecting that the UE 5105 is remote from the cell boundary or the vicinity of another cell, the eNB #1 5101 notifies the eNB #2 5103 of a stop of the reception of an SRS via the X2 interface 5115, the MME, or the central entity 5106.

The eNB #1 5101 may determine that the UE 5105 is not located at the cell boundary based on whether a report value of its own cell (eNB #1) that has been reported by the UE through a measurement report message, specifically, RSRP, RSRQ, or both of them are not smaller than a specific threshold.

The eNB #1 5101 may determine that the UE 5105 is remote from the vicinity of another cell based on whether a report value of another cell (eNB #2) that has been reported by the UE through a measurement report message, specifically, RSRP, RSRQ, or both of them are not greater than a specific threshold.

The eNB #1 5101 may notify the eNB #2 of a stop of the reception of an SRS when CoMP ends.

The eNB #1 5101 may notify the eNB #2 of a stop of the reception of an SRS when a parameter for SRS is designated as a cell-dedicated parameter.

Uplink control and downlink control may be performed simultaneously.

First Modification of Fifth Embodiment

Although the fifth embodiment has described the example of CoMP, the reception of an SRS in DC by an adjacent eNB eliminates a delay time after DC is started and a DC configuration is changed, that is, eliminates a time during which the UE measures the downlink quality after a start instruction. This enables an immediate start of DC, thus eliminating the allocation of a yet-to-be-optimized frequency, time, or transmission power that occurs in a delay time.

As described in Non-Patent Document 9 (see Chapter 8), several forms of DC have been studied, and the studies of architecture 1A and architecture 3C are pursued. The example of architecture 3C will be described below with reference to FIG. 27, which will be described below.

A S-GW 5217 allocates two bearers per user. A bearer 1 is a bearer for transmission from a MeNB 5218 to a UE 5220 via S1-U. In a bearer 2, a signal that has arrived at the MeNB 5218 via S1-U is separated into two portions by a PDCP processing unit. One portion of the signal is subjected to radio link control (RLC) and MAC processing by the MeNB 5218 and transmitted to the UE 5220. The other portion of the signal is processed by a SeNB 5219 and transmitted to the UE 5220.

For example, a control signal for managing mobility is applied to the bearer 1, and user packet data such a video is applied to the bearer 2. This enables the UE to continuously perform communication even while moving at high speed in the MeNB having a large cell radius. The SeNB has a small cell radius, in which a few users can use the frequency bands of the SeNB. This enables large volumes of communications.

Figure 26:
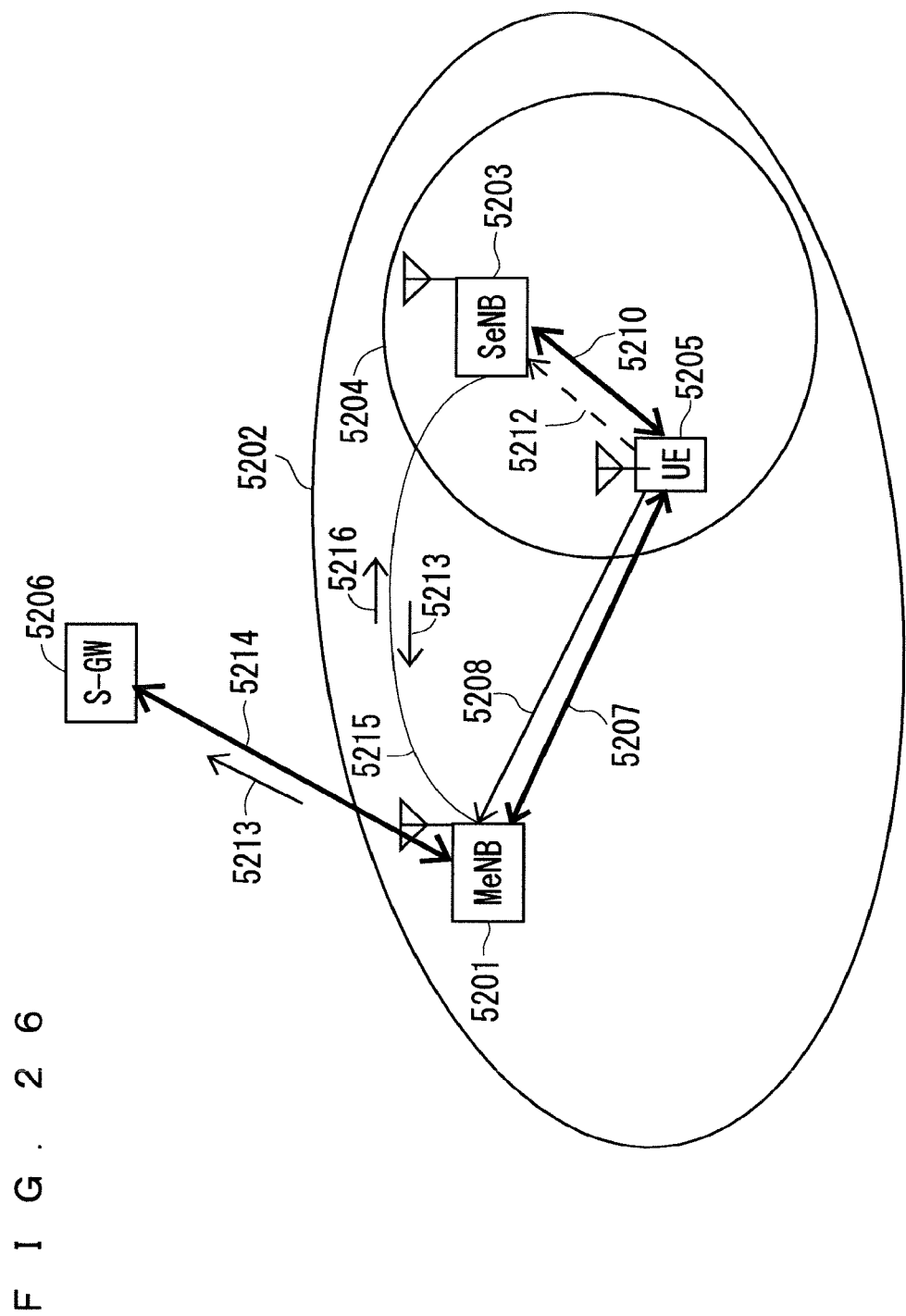
FIG. 26 shows an example of an operation of DC in a communication system of a first modification of a fifth embodiment.

FIGS. 26 and 27 show an example of the operation of DC in a communication system of a first modification of the fifth embodiment. The operation when DC is started in this modification will be described with reference to FIGS. 26 and 27.

A UE 5205 located in a communication area 5202 of a MeNB 5201 performs communication of a control signal for mobility management and user packet data via a S-GW 5206 and the MeNB 5201. When the UE 5205 enters a communication area 5204 of a SeNB 5203 and the UE 5205, the MeNB 5201, and the SeNB 5203 can perform DC, a reconfiguration to DC (SeNB addition) is performed, so that two bearers are configured as different paths.

For example, a bearer 1 is configured as a path for the S-GW (5206), an S1 (5214), the MeNB (5201), a radio propagation path (5207), and the UE (5205). A bearer 2 goes through the S-GW (5206) and the S1 (5214), and is split at the MeNB (5201). One portion of the bearer 2 is configured as a path for the MeNB (5201), the radio propagation path (5207), and the UE (5205). The other portion of the bearer 2 is configured as a path for the MeNB (5201), an X2 (5215), the SeNB (5203), a radio propagation path (5210), and the UE 5205.

Herein, if the UE 5205 does not establish synchronization with the SeNB to measure the communication quality, the UE 5205 cannot actually perform data communication. Also, the UE 5205 cannot recognize the communication quality of the radio propagation path 5210 when the bearer 2 is separated.

The eNB #1 is replaced with the MeNB and the eNB #2 is replaced with the SeNB in the same method as the method described in the fifth embodiment, thus enabling not only the MeNB during in communication but also the SeNB that is adjacent to the MeNB to receive an SRS in advance. As a result, the SeNB 5203 can transmit data immediately without waiting for a confirmation of the quality of a radio propagation path when starting DC.

The MeNB 5201 can start DC without waiting for a confirmation of the quality of the radio propagation path after determining a ratio of separation of the bearer 2 in consideration of not only a reception result of the SRS 5208 that the MeNB 5201 receives but also a reception result 5213 such as the reception quality of an SRS 5212 at the SeNB 5203, which the MeNB 5201 receives via X2 (5215).

The SeNB 5203 can also receive the SRS 5212 to accurately detect a timing difference between the MeNB 5201 and the SeNB 5203. Through notification of the SRS reception timing information of the SeNB 5203, a value of an arrival packet ordering (reordering) standby timer in an uplink PDCP in the MeNB 5201 can be set in consideration of a backhaul delay when DC is started. The SRS reception timing information may be notified together with the SRS reception result 5213.

Although it has been described that a DC start is triggered when the UE 5205, the MeNB 5201, and the SeNB 5203 are capable of DC, specifically, at least one of four conditions (1) to (4) below is required.
(1) A time when the capability of the UE 5205 corresponds to DC.
(2) A time when both the MeNB 5201 and the SeNB 5203 can each configure DC.
(3) A time when a transmission delay of an available backhaul such as X2 5215 is within a DC permissible range.
(4) A time of the detection that the UE 5205 is located within or near the coverage areas of both the MeNB 5201 and the SeNB 5203.

Although description has been given of the example of architecture 3C, also in architecture 1A, the SeNB can be notified of SRS config 5216 via the X2, S1 (MEE), or central entity to transmit data immediately without waiting for a confirmation of the quality of the radio propagation path when starting DC.

Although the addition of a SeNB has been described above, the same applies to a change of a SeNB. The MeNB notifies a target SeNB (T-SeNB) of SRS config for configuring an SRS that can be received simultaneously in advance, so that the SeNB can transmit data immediately without waiting for a confirmation of the quality of a radio propagation path when changing a SeNB.

Although the MeNB notifies the T-SeNB of SRS config in the description above, the S-SeNB that is a source may notify the T-SeNB of SRS config.

Sixth Embodiment

Figure 28:
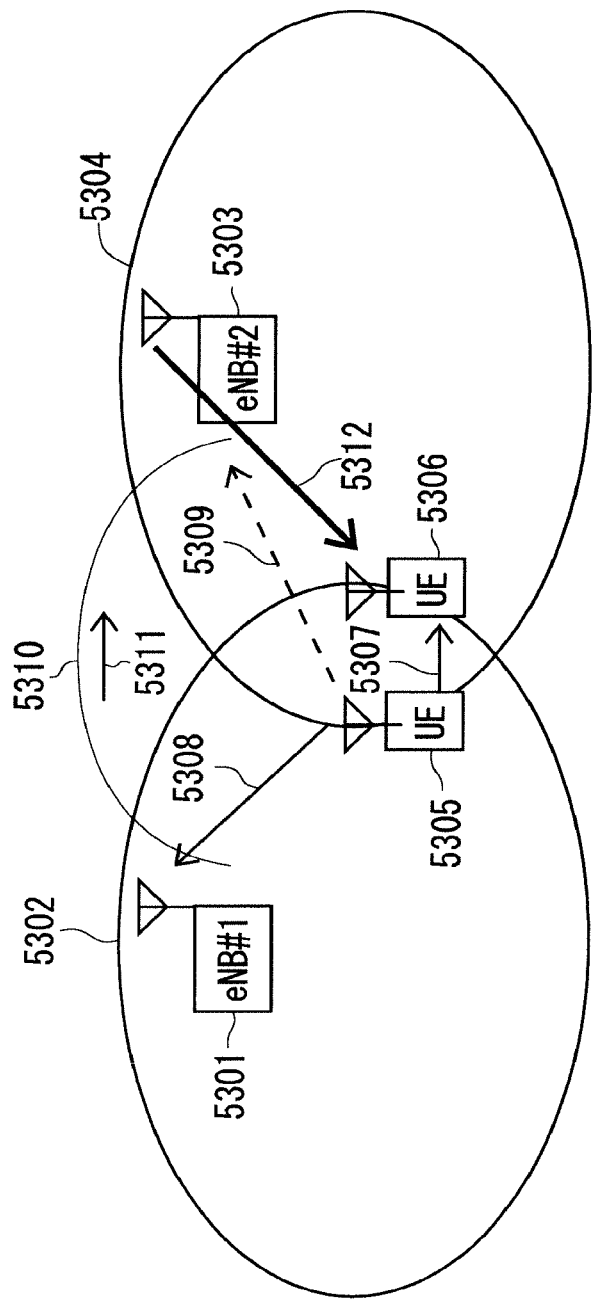
FIG. 28 shows the concept of a problem to be solved in a sixth embodiment.

A problem to be solved in a sixth embodiment will be described with reference to FIG. 28. FIG. 28 shows the concept of the problem to be solved in the sixth embodiment.

FIG. 28 shows a state in which a UE indicated by reference "5305" among user equipment devices (hereinbelow referred to as "user equipments (UEs)"), which are communication terminal devices, is located within the coverage of a cell 5302 in which the UE can transmit and receive radio waves of an e-NB #1 (hereinbelow referred to as "S-eNB") 5301, which is a radio wave base station device being a handover (HO) source. The UE 5305 performs a HO 5307 to be located within the coverage of a cell 5304 of a radio base station device (hereinbelow referred to as "T-eNB") 5303, which is a HO destination. The UE in this state is a UE 5306 indicated by reference "5306".

As described in the fifth embodiment, an SRS is a cell-specific signal in the current 3GPP (see 5.5.1.5 of Non-Patent Document 14). The T-eNB 5303 thus cannot receive an SRS of a target UE until the handover completes, and starts out late the procedure (scheduling) of allocating resources such as frequencies or timings to the respective UEs based on the reception quality.

The S-eNB 5301 measures the reception communication quality in the cell 5302, in the coverage of which the UE 5305 that is a HO source is located, and performs scheduling in the same cell. The T-eNB 5303 receives no SRS 5309 from the UE 5305 and does not perform scheduling.

The T-eNB 5303 can only receive an SRS from the UE 5306 after HO, and accordingly, cannot start accurate scheduling that reflects frequency characteristics early for the UE 5306 that has performed HO to the T-eNB 5303.

Particularly in the operation of a large number of small cells, whose radius is small, a small cell is repeatedly changed in a short period of time when the UE moves. When the T-eNB performs scheduling for the UE 5306, the UE 5306 has possibly moved to be served by another cell.

Proposed as the method of solving these problems is a communication system capable of starting scheduling by the T-eNB 5303 early by making an SRS specific not to a cell but to a UE.

Figure 29:
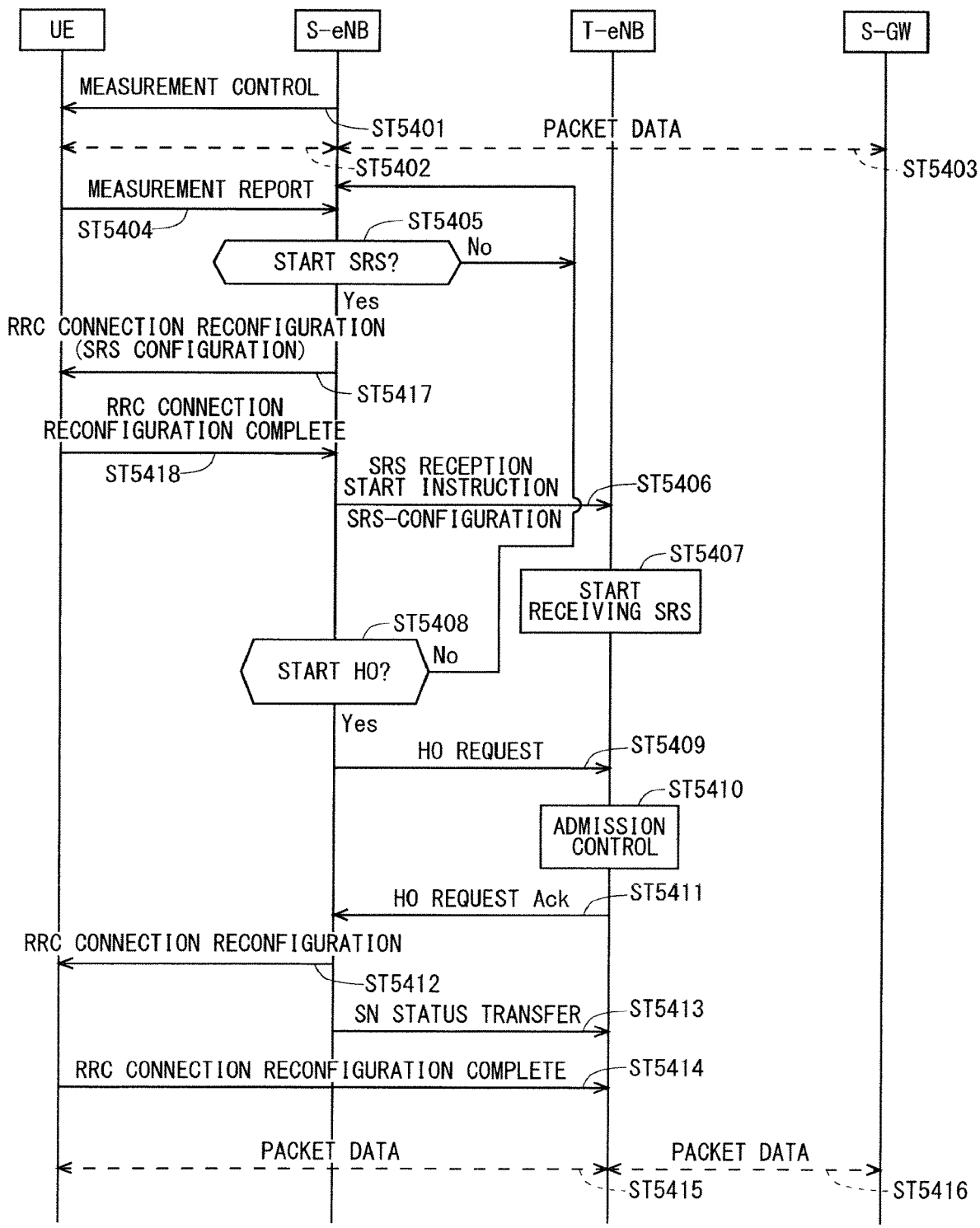
FIG. 29 shows an example of a sequence of an SRS reception process in a communication system of the sixth embodiment.

FIG. 29 shows an example of the sequence of an SRS reception process in a communication system of the sixth embodiment.

In steps ST5402 and ST5403, the UE exchanges packet data with the S-GW via the S-eNB.

In step ST5401, the S-eNB transmits a measurement control (MC) message to the UE to obtain reception quality. The UE measures the reception qualities of its own cell and the neighboring cell based on the information contained in the MC message, and in step ST5404, transmits a measurement report (MR) message to the S-eNB.

In the sequences described above, the S-eNB that has received the MR message in step ST5404 determines whether to start HO in the procedure for determining whether to perform HO in step ST5408. In this embodiment, the S-eNB determines whether to start an SRS in step ST5405 before the HO start determination in step ST5408.

If the CRS received quality (RSRP, RSRQ, or both of them) reported through the MR message of step ST5404 or another RS received quality is smaller than a threshold Th1, the S-eNB judges that the S-eNB is unlikely to perform HO to an adjacent cell and waits for an MR message of step ST5404 again.

In the determination whether to start an SRS in step ST5405, the S-eNB determines whether the reception quality of the neighboring cell, which has been reported through the MR message in step ST5404, is greater than the threshold TH1. If the reception quality is greater than the threshold TH1 (if Yes), the S-eNB judges that it possibly performs HO to the neighboring cell, and in step ST5406, transmits an SRS reception start instruction message including SRS Config to the T-eNB. Upon receipt of the SRS reception start instruction message of step ST5406, in step ST5407, the T-eNB starts receiving an SRS.

Although description has been given of the example in which the S-eNB directly notifies the T-eNB through X2 signaling, the S-eNB may notify the T-eNB via the MME through S1 signaling.

After transmitting an SRS reception start instruction in step ST5406, the S-eNB determines whether to perform HO in the HO start determination of step ST5408.

The subsequent HO sequence is the same as the current sequence.

In this embodiment, the SRS start determination of step ST5405 is provided separately from the HO start determination of step ST5408, thus enabling the reception of an SRS in step ST5407 before HO.

If the S-eNB determines "Yes" once in the SRS start determination of step ST5405 and then determines in the HO start determination of step ST5408 that HO is not to be performed, when receiving an MR message of step ST5404 again, the S-eNB may perform the SRS start determination of step ST5405 again and may or may not notify the SRS reception start instruction in step ST5406. Providing no redundant start instruction alleviates the processing load of, for example, a central processing unit (CPU). If the S-eNB determines "No" in the SRS start determination of step ST5405, the S-eNB enters the MR message standby state of step ST5404.

Figure 31:
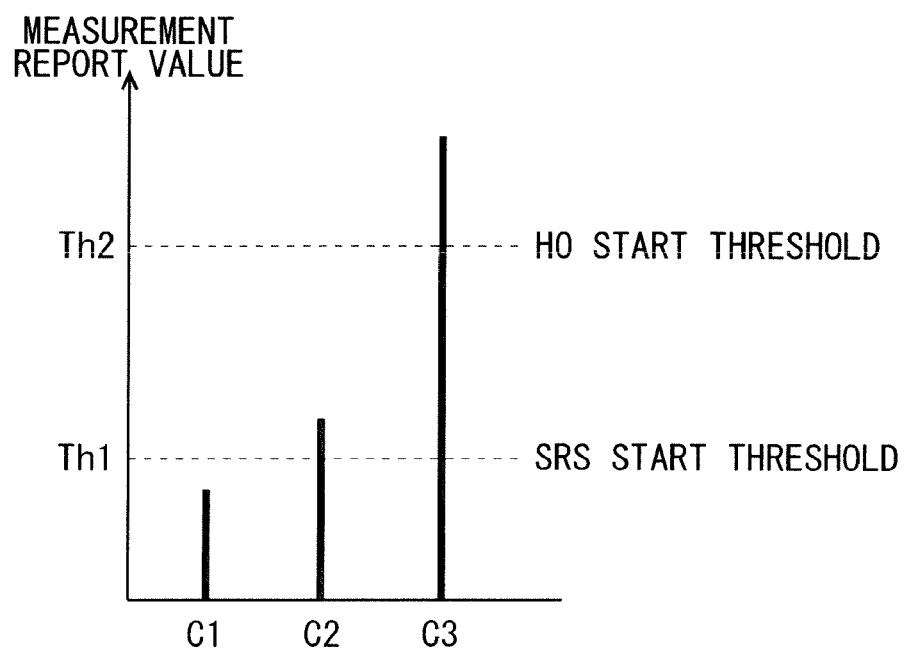
FIG. 31 is a diagram for showing a difference between an SRS reception start threshold and a HO start threshold with respect to a measurement report value.

FIG. 31 is a diagram for describing a difference between an SRS reception start threshold and a HO start threshold with respect to a measurement report value.

A threshold Th1 for starting an SRS in an embodiment of the present invention is provided apart from a threshold Th2 for starting a HO.

The S-eNB may set the threshold Th1 to a value smaller than the threshold Th2. This setting enables the T-eNB to receive an SRS before a HO, thus enabling the T-eNB to perform frequency scheduling early.

The threshold Th1 is set to a value smaller than the threshold Th2 above, the threshold Th1 and the threshold Th2 may be set to the same value (Th1=Th2). In this case, an SRS reception start instruction (including SRS config) is notified in the SRS reception start determination, and also, a HO request is notified. The SRS reception start instruction and the HO request may be provided in one message.

Although the T-eNB starts receiving an SRS later in the case where the threshold Th1 and the threshold Th2 are set to the same value (Th1=Th2) than in the case where the threshold Th1 is set to a value smaller than the threshold Th2, the T-eNB can start receiving an SRS before the HO completes (RRC Connection Reconfiguration Complete) in step ST5414. In addition, the determination procedure by the S-eNB can be alleviated more than in the case where the threshold Th1 is set to a value smaller than the threshold Th2.

When the UE 5305 moves very quickly relative to a cell size, the T-eNB that is a moving destination may not be able to perform scheduling effectively even if it can receive an SRS. In such a case, the SRS reception start instruction message, HO request message, or any other message, which is transmitted from the S-eNB 5301 to the T-eNB 5303, may include the speed information about the UE 5305, for example, the mobility state of the UE (high, medium, normal), the number of handovers or cell changes (the number of handovers or cell changes per specific time is also effective), a GPS position change (a position movement per specific time is also effective), and a time of stay in every cell, so that an SRS reception process is not performed. The UE can be restricted from transmitting an SRS 5309 while moving at high speed also when the UE is being served by the T-eNB 5303.

The trigger for performing the SRS reception start instruction described above is determined by the S-eNB 5301 based on the reception quality reported from the UE. Alternatively, the UE 5305 may determine the trigger and transmit a determination result to the S-eNB 5301, and the SeNB may then instruct a start of the reception of an SRS.

For example, the UE 5305 may include the information indicating whether the reception quality per cell is not smaller than a predetermined threshold in the MR and then notify the MR.

If the reception quality of a neighbor cell is not smaller than a predetermined threshold, the UE 5305 may include an SRS reception request indicating that the SRS should be received per cell in the MR and then notify the MR.

When the reception quality exceeds a predetermined threshold, the UE 5305 may notify that the reception quality has exceeded the predetermined threshold together with an ID for identifying a target cell, apart from the MR.

As a result, the S-eNB can reduce the load to determine the reception quality in the MR.

It has been described above that the SRS reception is started for another cell on the premise that the UE has transmitted an SRS based on a UE-dedicated parameter. The procedure in which the start of the SRS transmission by the UE is determined will now be described.

The UE consumes transmission power to transmit an SRS, and therefore, it is effective for the UE to transmit an SRS only, for example, before and after performing HO or to make the SRS transmission interval longer only, for example, before and after performing HO.

In the SRS start determination of step ST5405, the S-eNB determines whether the CRS received quality (RSRP, RSRQ, or both of them) of its own cell, which has been reported in the MR message of step ST5404, or another RS received quality is smaller than a predetermined threshold (for example, smaller than the threshold Th2), or whether the reception quality of any other cell is greater than the threshold Th1, in addition to the procedures described above. If the determination result satisfies any one or both of the above, the S-eNB judges that the UE is highly likely to perform HO to a neighboring cell and notifies the UE of a transmission instruction including SRS config.

The S-eNB may include SRS config in an RRC connection reconfiguration message of step ST5417 and then transmit the message. As a result, the UE starts transmitting an SRS or transmits an SRS more frequently.

As an example timing at which the reception of an SRS is started, the T-eNB 5303 receives the SRS 5309 immediately after receiving the SRS config 5311 of the UE 5305 and performs scheduling. Alternatively, the T-eNB 5303 may receive the SRS 5309 from the UE 5305 at least once before scheduling.

Alternatively, the T-eNB 5303 may receive an SRS from the UE 5305 at least once before transmitting HO ack.

Although described herein is the example in which the S-eNB instructs the UE to transmit an SRS through RRC, the S-eNB may instruct the transmission through MAC signaling or L1/L2 control signal (for example, PDCCH/EPDCCH).

The instruction to transmit an SRS, which is provided to the UE by the S-eNB, may be effective until an instruction to stop the transmission of an SRS is transmitted. This instruction may be an instruction to transmit an SRS periodically during a predetermined period.

If being synchronized with the T-eNB after receiving mobility control information (MCI), the UE may stop transmitting the SRS.

The sequence of HO from the S-eNB to the T-eNB shown in FIG. 29 is as follows.

In step ST5409, the S-eNB transmits a HO request to the T-eNB. In step ST5410, the T-eNB performs admission control. In step ST5411, then, the T-eNB transmits "HO Request Ack" to the S-eNB.

In step ST5412, the S-eNB that has received the Ack transmits an RRC connection reconfiguration to the UE, and in step ST5413, transmits "SN Status Transfer" to the T-eNB. In step ST5412, the UE receives an RRC connection reconfiguration to reconfigure an RRC connection, and in step ST5414, transmits RRC connection reconfiguration complete to the T-eNB as a result of the reconfiguration. This enables the UE to exchange packet data with the S-GW via the T-eNB in steps ST5415 and ST5416.

The T-eNB may stop receiving an SRS, for example, after receiving RRC connection reconfiguration complete in step ST5414. The T-eNB stops the reception similarly if HO fails.

Alternatively, the T-eNB may stop the reception at a timing at which the T-eNB receives "SN Status Transfer" from the S-eNB in step ST5413. Still alternatively, the T-eNB may stop the reception at a timing at which the T-eNB transmits "HO Request Ack" to the S-eNB in step ST5411.

Although the sequence described above is premised on that the reception of an SRS is stopped after HO completes, in consideration of a failback, the SRS may be continuously received even after HO has failed.

As the method of stopping the reception of an SRS in that case, a predetermined time is reserved with a timer provided, and then, the reception of an SRS is stopped. Whether the reception of an SRS is stopped may be determined by confirming a threshold again after the expiration of the timer. Alternatively, the reception of an SRS may be performed until the UE transmits an SRS reception stop instruction through RRC or until the serving cell instructs a stop of the reception of an SRS via X2 based on the neighbor cell search information from the UE.

Figure 30:
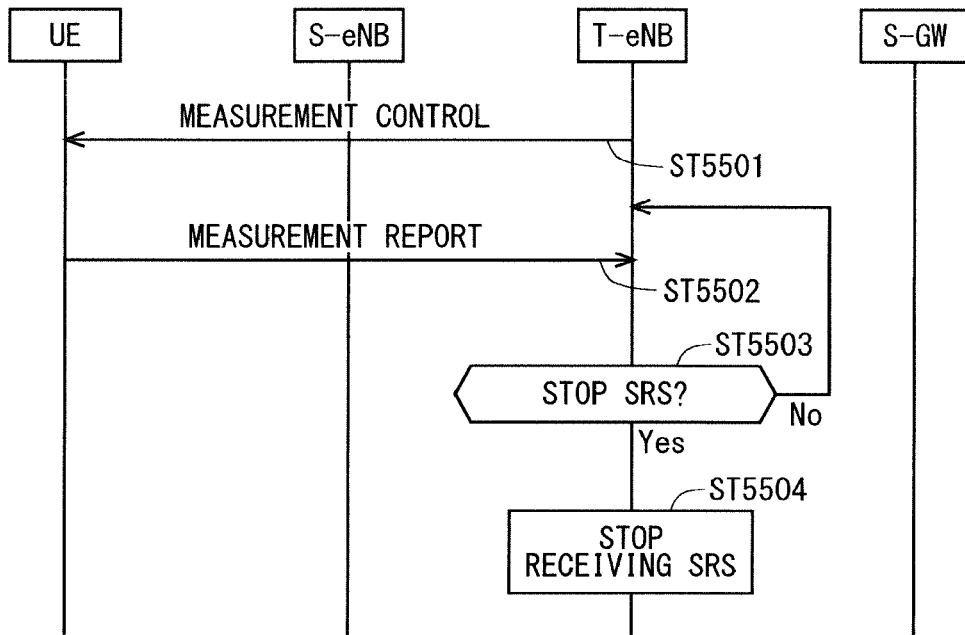
FIG. 30 shows another example of the sequence of the SRS reception process in the communication system of the sixth embodiment.

One additional threshold for determining a measurement result may be added for use in the determination of whether to instruct a stop of the reception of an SRS. A value that exceeds a threshold earlier than the start of HO to another cell may be set. The sequence in this case is shown in FIG. 30. FIG. 30 shows another example of the sequence of the SRS reception process in the communication system of the sixth embodiment.

In step ST5501, the T-eNB transmits a MC message to the UE. In step ST5502, the UE transmits a MR message. In step ST5503, the T-eNB judges whether an SRS is required, that is, whether to stop an SRS in response to the MR message of step ST5502. Specifically, the T-eNB judges whether the value of the reception quality of its own cell (T-eNB), which has been reported in the MR message of step ST5502, is smaller than a threshold Th3 or whether the value of the reception quality of the S-eNB is smaller than a predetermined threshold. The predetermined threshold is, for example, the threshold Th1. The predetermined threshold may be a threshold Th4 smaller than the threshold Th1.

If the value of the reception quality of its own cell (T-eNB), which has been reported in the MR message of step ST5502, is smaller than the threshold Th3 or if the value of the reception quality of the S-eNB falls below the predetermined threshold, the T-eNB judges to continuously receive an SRS and returns to step ST5502 to wait for the MR message of step ST5502. If the value of the reception quality of its own cell (T-eNB), which has been reported in the MR message of step ST5502, is not smaller than the threshold Th3 or if the value of the reception quality of the S-eNB is not smaller than the predetermined threshold, the T-eNB stops receiving an SRS in step ST5504.

The T-eNB may judge whether to accept HO (Handover Request Ack) based on the SRS reception result of the target UE. In that case, the T-eNB may notify that "the SRS reception result is not good" as a cause of declining the acceptance of HO.

The T-eNB performs scheduling based on the SRS reception result of the target UE.

An uplink transmission power value is adjusted by the SRS reception value (where an initial MCS is included). This is effective in the case where eNBs having different cell sizes overlap each other.

The sixth embodiment can achieve the following effects. The channels can be evaluated early for a target UE, thus enabling early scheduling to improve frequency efficiency.

Seventh Embodiment

Figure 32:
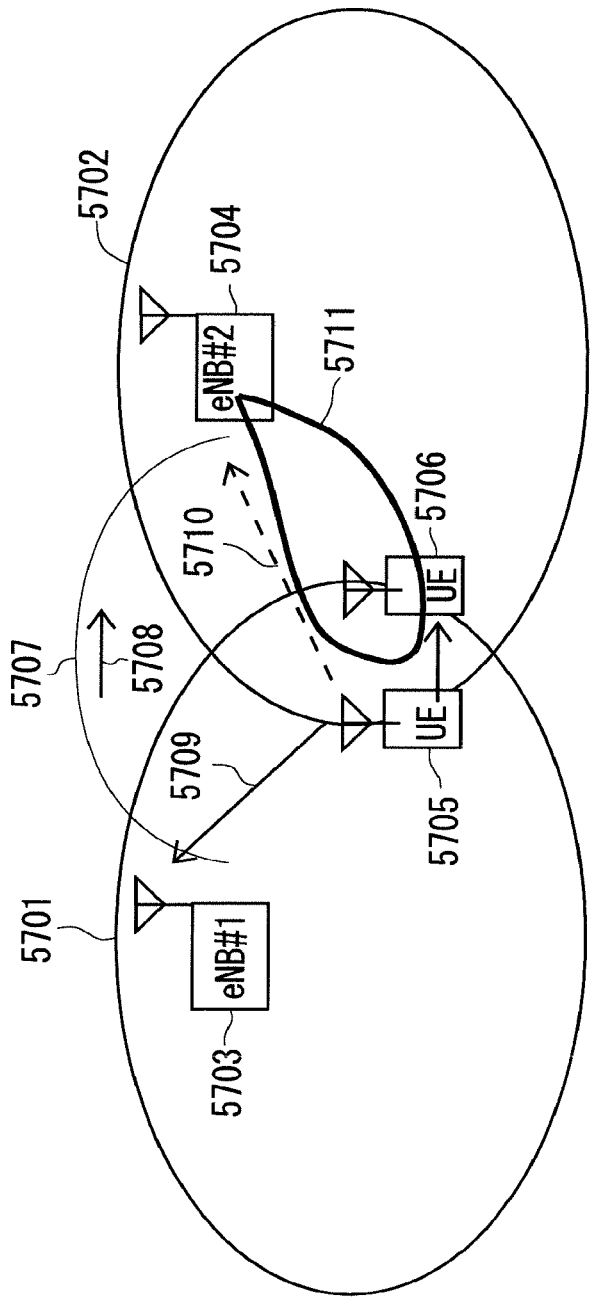
FIG. 32 shows an example of antenna control in a communication system of a seventh embodiment.

FIG. 32 shows an example of antenna control in a communication system of a seventh embodiment. This embodiment will describe an example where, if an eNB #2 5704 that is a handover destination is capable of transmission and reception (MIMO) through a plurality of antennas as shown in FIG. 32, the eNB #2 5704 is configured to receive an SRS before a handover is established and can accordingly perform antenna control such as beam formation immediately at the handover, thus leading to reductions in the transmission powers of the eNB and the UE.

A UE 5705, 5706 in communication in a communication area 5701 of an eNB #1 5703 is located at the area boundary of an eNB #1 5703 and is moving toward a communication area 5702 of an eNB #2 5704.

The eNB #2 5704 has a plurality of antennas and can control the phase and amplitude of an input signal of each antenna to form a beam 5711 whose directivity is narrowed. In 3GPP, however, an SRS is a cell-specific signal (see 5.5.1.5 of Non-Patent Document 14), and an SRS of a target UE cannot be received before a handover completes, so that a beam whose directivity is narrowed cannot be formed, as described in the fifth embodiment.

As in the fifth embodiment, thus, when detecting that the UE 5705 is located at the area boundary of the eNB #1 5703, the eNB #1 5703 instructs the UE 5705 to transmit SRSs 5709 and 5710 that can be received by a plurality of eNBs through RRC and transmits SRS config 5708 to the eNB #2 5704 via X2 5707, thus enabling the eNB #2 5704 to receive an SRS signal of the UE 5705, 5706.

The fifth embodiment or the sixth embodiment may be applied in a specific method of the above.

The eNB #2 5704 has a plurality of antennas and can control the phase and amplitude of an input signal of each antenna to form the beam 5711 whose directivity is narrowed.

Furthermore, for example, the directivity of a beam is narrowed by adjusting the phase and an amplitude value (=weighting coefficient) of an input signal of each antenna in uplink or downlink in which the training sequence SRS received power is maximized. The antenna after the weighting is used to receive a data portion other than the training sequence or perform downlink transmission, thus enabling communication using a beam whose directivity is narrowed. The eNB #2 5704 and the UE 5706 can thus reduce transmission power because they are capable of good reception due to the reduced interference powers of another eNB and another UE.

In the transmission of an SRS by the UE 5705 before HO, when the UE 5705 performs transmission using directional antennas whose directions are sequentially changed, for example, when the direction of transmission at θ (t) is changed in time, the UE 5705 before HO may include different sequence patterns in different directional antennas such that the T-eNB 5704 that is a HO destination can specify a directional antenna.

In the transmission of an SRS by the UE 5705 before HO, when the UE 5705 transmits an SRS through a plurality of directional antennas such as sector antennas, the UE 5705 before HO may include different sequence patterns in different directional antennas such that a directional antenna can be specified.

In an example of the method of determining the weighting coefficient described above, the communication area 5702 of the eNB #2 5704 is divided, and a divided portion with a maximum SRS received power value is specified per division. The divided portion with a maximum SRS received power is divided further, and a divided portion with a maximum SRS received power value is specified. In one method, the procedure above may be repeated to determine a weighting coefficient.

In TDD, where uplink and downlink share the same frequency band, this embodiment is effective for downlink transmission. In frequency division multiplex (FDD), where uplink and downlink use different frequencies, this embodiment is effective when a difference in frequency-dependent propagation characteristics is small between uplink and downlink.

Although the embodiment above has described the control of narrowing the directivity of a beam, the procedure for collectively demodulating all users through multi-user MIMO can be performed immediately after handover. The relationship among the SRS ($S_{SRS}$) that is the training sequence for all UEs, an impulse response (H) of a channel, noise (N), and a reception signal Y is represented by the expression below:

$Y = H \times S_{SRS} + N$

For example, if noise (N) is ignored as in the zero forcing (ZF) algorithm, the UE transmission data can be restored by determining an inverse matrix of H. In TDD, the uplink propagation characteristics are identical to downlink propagation characteristics. Thus, multiplexing (precoding) the transmission data by the inverse matrix of H enables the UE to receive a signal that is less affected by interference.

The eNB may have directional antennas or a group of directional antennas that cover the entire communication area (corresponding to the communication area 5702 of the eNB #2 5704), for example, isotropic receiving antennas that have no directivity in uplink reception, and may have directional beam forming in downlink transmission.

The reception antenna of the eNB may have isotropic directivity.

A neighboring eNB that is not a serving cell can receive an SRS to derive an angle of arrival (AoA). A plurality of eNBs whose locations are determined can measure the AoA to perform trilateration, thus determining the location of the UE without using a global positioning system (GPS).

Although the example using the X2 interface 5707 has been described above, the transmission may be performed by an S1 interface (via the MME) or performed via the central entity as in the fifth embodiment.

Although the description has been made in which a handover destination is an eNB, the same applies to the case where a relay node (RN) or a remote radio head (RRH) has a plurality of antennas.

In the case where the UE 5705, 5706 is mounted in, for example, a train and moves while collectively managing a plurality of users (moving relay node), the UE effectively includes a large number of antennas for beam formation.

The SRS transmission method, which will be described below, is effective for a UE including a plurality of antennas. The SRS is not subjected to beam formation and is transmitted isotropically. As a result, the eNB #1 and the eNB #2 can perform a procedure similar to that of the UE including an omni antenna alone to receive an SRS before handover and form uplink and downlink beams promptly.

It is also effective to perform beam formation in which directivity of the UE 5705 is narrowed, using a synchronization signal of an eNB that can be received by the UE 5705. An SRS is transmitted also using the beam. As a result, the transmission power of the SRS transmitted by the UE 5705 can be reduced.

The UE 5705 may fail to receive a synchronization signal, and thus, in one method, the location information about the presence of the eNB may be used to transmit a synchronization signal in the direction in which the eNB is located even when the UE 5705 cannot see the synchronization signal of the eNB.

During the transmission and reception of a plurality of frequencies by the UE 5705, the UE may transmit an SRS per frequency by both the isotropic beam and the beam whose directivity is narrowed. This enables the eNB to form uplink and downlink beams immediately.

In the case of TDD even with only one frequency available, both the isotropic beam and the directional beam can be transmitted per subframe.

In the case of FDD even with only one frequency available, both the isotropic beam and the directional beam can be transmitted per subframe as in TDD.

The use of the isotropic beam is effective in the case where the eNB is a small cell. The cell has a small radius, and thus, can stably receive an SRS even for a change of the angle of arrival.

The isotropic beam may be used in the case where the UE 5705 moves at high speed, for example, in the case of a bus traveling around the city.

In the case where a large number of UEs 5705 perform communications at high capacities, for example, in a case of a bullet train, a beam whose directivity is narrowed may be used even if the UEs 5705 move at high speed.

In FDD of the T-eNB 5704 that is a HO destination, the T-eNB 5704 receives an SRS 5710 transmitted from the UE 5705 before HO and then feedbacks the obtained terminal information to the UE 5705 through a downlink channel, so that the UE 5705 can transmit the uplink dedicated channel information to the T-eNB 5704 that is a HO destination through beam forming.

The T-eNB 5704 that is a HO destination needs to judge whether to correct a frequency after receiving the SRS 5710 transmitted from the UE 5705 before HO. If judging that it does not need to correct a frequency, the T-eNB 5704 can use the SRS Config information received via the X2 interface 5707 in the beam forming of a downlink channel.

In the case where the T-eNB 5704 that is a HO destination has a plurality of isotropic antennas such as array antennas, the T-eNB 5704 can use the SRS Config 5708 received from the S-eNB 5703 before HO via the channel 5707 to receive the SRS 5710 of the UE 5705 that is to perform HO, thus calculating propagation characteristics H.

The T-eNB 5704 that is a HO destination can use directional antennas such as a plurality of sector antennas (including the case where the equivalent directivity is formed by an array antenna) to perform precoding in which directivity is pointed to a place at which the SRS 5710 is received at high power, thus performing transmission through the beam forming 5711.

In the transmission in which the directional antennas of the T-eNB 5704 being a HO destination sequentially change their directions at the timings at which the UE 5705, 5706 transmits an SRS, the direction in which the T-eNB 5704 being a HO destination performs transmission is calculated at a time when the reception power of the SRS 5710 transmitted from the UE 5705 is maximized, thus enabling a transmission through the beam forming 5711 in which directivity is directed to the calculated direction.

Alternatively, in the transmission, the directional antennas of the T-eNB 5704 that is a HO destination may successively change their directions at multiple timings of the timing at which the UE 5705, 5706 transmits an SRS.

Alternatively, when the SRS 5710 transmitted from the UE 5705 is received at least once during a reception period in the direction in which the direction antenna of the T-eNB 5704 being a HO destination has performed transmission, the transmission through the beam forming 5711 is enabled, whose directivity is directed to the direction in which the T-eNB 5704 being a HO destination has performed transmission.

The T-eNB 5704 that is a HO destination may obtain the terminal information through a random access procedure for transmission through the beam forming 5711. The UE 5705 that is to perform HO transmits a PRACH to the T-eNB 5704 that is a HO destination. The T-eNB 5705 that is a HO destination transmits a random access response to the UE 5705.

The UE 5705 that is to perform HO notifies the T-eNB 5704 of the location information on the UE 5705 in the random access procedure. The T-eNB 5704 that is a HO destination can thus specify the location information on the UE 5705 that is to perform HO in the random access procedure to perform transmission through the beam forming 5711 whose directivity is pointed to the UE 5705.

The T-eNB 5704 that is a HO destination can receive the PRACH during a handover to calculate an angle of arrival (AoA), thus enabling the transmission through the beam forming 5711 whose directivity is pointed to the calculated angle of arrival.

Synchronization can be established by the reception of an SRS during handover, and thus, no RACH sequence may be used.

When the UE 5705 before HO moves together with another UE, when the UE 5705 is a terminal including a plurality of antennas, or when the UE 5705 functions as a repeater, the UE 5705 notifies the T-eNB 5704 being a HO destination of the location information on the UE 5705 before HO, which has been detected by the S-eNB 5703 being a HO source from the UE 5705 before HO, together with the SRS Config (configuration parameter value) 5708 via the channel 5707.

Thus, the T-eNB 5704 that is a HO destination can receive the SRS 5710 transmitted from the UE 5705 before HO to use the SRS 5710 to derive a precoding matrix, that is, derive a weighting coefficient of an antenna for beam forming. This enables the T-eNB 5704 that is a HO destination to perform a transmission through the beam forming 5711.

In this embodiment, an SRS from a terminal that is a HO source can be received also during MIMO to determine the beam directivity and the initial transmission power of the terminal, thus enabling appropriate communication from the start of HO.

The reception quality in the UE during HO can be improved, thus reducing handover failures (HOFs) and radio link failures (RLFs).

The method disclosed in this embodiment is applicable to the multi-stream beam formation.

The embodiments and modifications thereof are merely examples of the present invention and can be combined freely within the scope of the present invention. Any constitutional elements of the embodiments and the modifications thereof can be changed or omitted appropriately. The communication capability of the UE can therefore be improved also in the case where a large number of small cells in addition to a macro cell are installed and operated.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

101 CBC, 102 MME, 103 MeNB, 104 SeNB, 105 UE, 1301 coverage of macro eNB (macro cell), 1302 coverage of small eNB (small cell).

The invention claimed is:

1. A mobile communication system comprising:
a user equipment; and
a base station that performs radio communication with the user equipment,
wherein the user equipment transmits a user-equipment-specific sounding reference signal to the base station,
the base station notifies the user equipment of a user-equipment-dedicated parameter, and
the parameter is used for generating a pseudo-random number that defines the sounding reference signal.

2. The mobile communication system according to claim 1, wherein the base station notifies the user equipment of the parameter via radio resource control signaling.

3. The mobile communication system according to claim 1, wherein the sounding reference signal is used for managing a position of the user equipment.

4. A user equipment that performs radio communication with a base station, wherein the user equipment transmits a user-equipment-specific sounding reference signal to the base station,
the user equipment is notified of a user-equipment-dedicated parameter from the base station, and
the parameter is used for generating a pseudo-random number that defines the sounding reference signal.

5. A base station that performs radio communication with a user equipment, wherein the base station receives a user-equipment-specific sounding reference signal from the user equipment,
the base station notifies the user equipment of a user-equipment-dedicated parameter, and
the parameter is used for generating a pseudo-random number that defines the sounding reference signal.

* * * * *